United States Patent
Jia et al.

(10) Patent No.: US 12,192,589 B2
(45) Date of Patent: Jan. 7, 2025

(54) MULTICAST SERVICE TRANSMISSION METHOD AND APPARATUS

(71) Applicant: HUAWEI TECHNOLOGIES CO., LTD., Guangdong (CN)

(72) Inventors: Jianxin Jia, Shanghai (CN); Wenfu Wu, Shanghai (CN); Zaifeng Zong, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 127 days.

(21) Appl. No.: 17/892,119

(22) Filed: Aug. 22, 2022

(65) Prior Publication Data

US 2022/0408162 A1    Dec. 22, 2022

Related U.S. Application Data

(63) Continuation of application No. PCT/CN2021/075259, filed on Feb. 4, 2021.

(30) Foreign Application Priority Data

Feb. 21, 2020  (CN) .................. 202010107929.X

(51) Int. Cl.
*H04N 21/6405* (2011.01)
*H04N 21/266* (2011.01)
*H04N 21/6408* (2011.01)

(52) U.S. Cl.
CPC ....... *H04N 21/6405* (2013.01); *H04N 21/266* (2013.01); *H04N 21/6408* (2013.01)

(58) Field of Classification Search
None
See application file for complete search history.

(56) References Cited

U.S. PATENT DOCUMENTS

| 2012/0008525 A1 | 1/2012 | Koskinen |
| 2015/0036494 A1 | 2/2015 | Kotecha et al. |

(Continued)

FOREIGN PATENT DOCUMENTS

| CN | 1744574 A | 3/2006 |
| CN | 101030918 A | 9/2007 |

(Continued)

OTHER PUBLICATIONS

U.S. Appl. No. 62/956,836, filed Jan. 3, 2020. (Year: 2020).*

(Continued)

*Primary Examiner* — Junior O Mendoza

(57) ABSTRACT

This application provides a multicast service transmission method and apparatus, to deliver a multicast service regardless of whether there is a device supporting multicast in a system, so as to improve flexibility and reliability of the multicast service transmission. The method performed by a session management network element includes: receiving a first message or a second message, where the first message requests to add a terminal device to a multicast service, the second message is used to update a PDU session of the terminal device, and the PDU session is associated with the multicast service; and determining, based on multicast capability information of the terminal device and/or multicast capability information of an access network device, a delivery mode of the multicast service, where the access network device is an access network device currently accessed by the terminal device or a target access network device of the terminal device.

20 Claims, 15 Drawing Sheets

600

A session management network element receives a second message from an access and mobility management network element, where the second message indicates to update a PDU session of a terminal device, and the PDU session is associated with a multicast service — S610

The session management network element determines, based on multicast capability information of the terminal device and/or multicast capability information of a target access network device of the terminal device, a delivery mode of the multicast service, where the delivery mode is a unicast mode or a multicast mode, the multicast capability information of the terminal device indicates whether the terminal device supports multicast, and the multicast capability information of the target access network device indicates whether the target access network device supports multicast — S620

(56) References Cited

U.S. PATENT DOCUMENTS

| | | | |
|---|---|---|---|
| 2017/0171836 A1 | 6/2017 | Gupta et al. | |
| 2019/0394619 A1 | 12/2019 | Gholmieh et al. | |
| 2021/0136849 A1* | 5/2021 | Nimmala | H04W 76/22 |
| 2022/0124550 A1* | 4/2022 | Yang | H04W 76/12 |
| 2022/0376937 A1* | 11/2022 | Belling | H04L 67/141 |

FOREIGN PATENT DOCUMENTS

| | | | |
|---|---|---|---|
| CN | 101155053 A | 4/2008 | |
| CN | 101252529 A | 8/2008 | |
| CN | 101448201 A | 6/2009 | |
| CN | 108023736 A | 5/2018 | |
| CN | 108271083 A | 7/2018 | |
| CN | 109391909 A | 2/2019 | |
| CN | 110012437 A | 7/2019 | |
| CN | 110072258 A | 7/2019 | |
| CN | 110098942 A | 8/2019 | |
| CN | 110557724 A | 12/2019 | |
| EP | 4026387 A1 | 7/2022 | |
| EP | 4171074 A1 | 4/2023 | |
| WO | 2014185721 A1 | 11/2014 | |
| WO | 2019114938 A1 | 6/2019 | |
| WO | 2019136128 A1 | 7/2019 | |

OTHER PUBLICATIONS

3GPP TS 23.501 V16.3.0 (Dec. 2019), 3rd Generation Partnership Project; Technical Specification Group Services and System Aspects; System architecture for the 5G System (5GS); Stage 2(Release 16), 417 pages.

3GPP TS 23.502 V16.3.0 (Dec. 2019), 3rd Generation Partnership Project; Technical Specification Group Services and System Aspects; Procedures for the 5G System (5GS); Stage 2(Release 16), 558 pages.

3GPP TS 29.244 V16.2.0 (Dec. 2019)3rd Generation Partnership Project; Technical Specification Group Core Network and Terminals; Interface between the Control Plane and the User Plane Nodes; Stage 3(Release 16), total 281 pages.

3GPP TS 29.502 V16.2.0 (Dec. 2019), 3rd Generation Partnership Project; Technical Specification Group Core Network and Terminals; 5G System; Session Management Services; Stage 3(Release 16), 211 pages.

3GPP TS 38.413 V16.0.0 (Dec. 2019), 3rd Generation Partnership Project; Technical Specification Group Radio Access Network; NG-RAN; NG Application Protocol (NGAP)(Release 16), 335 pages.

\* cited by examiner

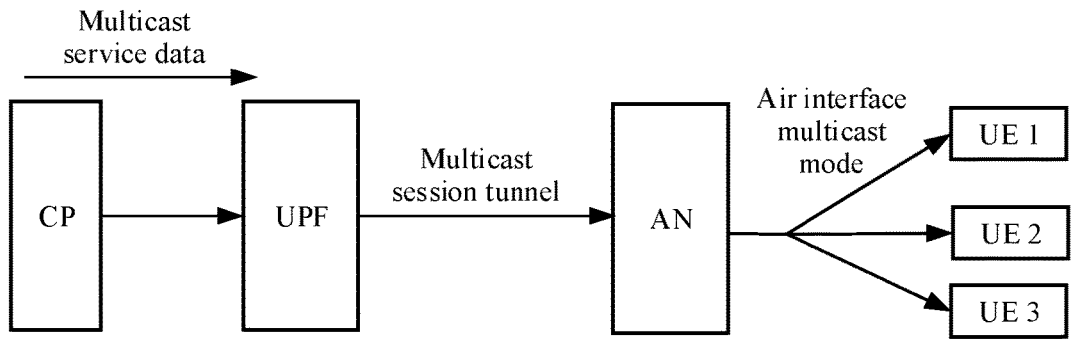

FIG. 3

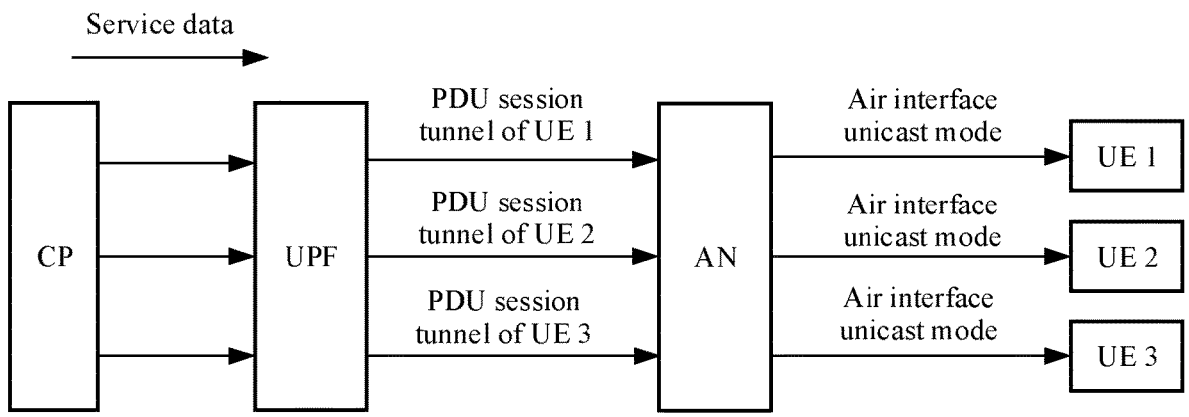

A session management network element receives a first message, where the first message is used to request to add a terminal device to a multicast service ~ S510

The session management network element determines, based on multicast capability information of the terminal device and/or multicast capability information of an access network device accessed by the terminal device, a delivery mode of the multicast service, where the delivery mode is a unicast mode or a multicast mode, the multicast capability information of the terminal device indicates whether the terminal device supports multicast, and the multicast capability information of the access network device indicates whether the access network device supports multicast ~ S520

FIG. 5

MULTICAST SERVICE TRANSMISSION METHOD AND APPARATUS

CROSS-REFERENCE TO RELATED APPLICATIONS

This application is a continuation of International Application No. PCT/CN2021/075259, filed on Feb. 4, 2021, which claims priority to Chinese Patent Application No. 202010107929.X, filed on Feb. 21, 2020. The disclosures of the aforementioned applications are hereby incorporated by reference in their entireties.

TECHNICAL FIELD

This application relates to the communication field, and more specifically, to a multicast service transmission method and apparatus in the communication field.

BACKGROUND

With development of the mobile internet, mobile high-definition video services are experiencing a surge. Users gradually change from conventionally watching hot programs on fixed televisions to watching hot programs on mobile phone terminals and the mobile internet. Therefore, video services have an increasingly strong impact on mobile networks. If transmission of the video services can be optimized through air interface multicast, the impact of video traffic on the mobile networks will be greatly reduced.

In previous generations of mobile communication technologies, for example, a 3rd generation (3G) mobile communication technology and a 4th generation (4G) mobile communication technology, it is difficult to promote a multicast solution. In an existing multicast solution, a dedicated network element and a dedicated interface that support multicast need to be added based on an existing communication architecture, and a dedicated multicast channel is further required for support. This not only increases overheads of an operator role, but also increases complexity of a terminal.

In a 5th generation (5G) mobile communication technology and another future mobile communication technology, a method needs to be urgently provided to overcome the foregoing difficulty.

SUMMARY

This application provides a multicast service transmission method and apparatus, to deliver a multicast service regardless of whether there is a device supporting multicast in a system, so as to improve flexibility and reliability of the multicast service transmission.

According to a first aspect, a multicast service transmission method is provided. The method includes: A session management network element receives a first message or a second message, where the first message is used to request to add a terminal device to a multicast service, the second message is used to update a protocol data unit PDU session of the terminal device, and the PDU session is associated with the multicast service; and the session management network element determines, based on multicast capability information of the terminal device and/or multicast capability information of an access network device, a delivery mode of the multicast service, where the multicast capability information of the terminal device indicates whether the terminal device supports multicast, the multicast capability information of the access network device indicates whether the access network device supports multicast, and the access network device is an access network device currently accessed by the terminal device or a target access network device of the terminal device.

That the access network device supports multicast means that an air interface of the access network device supports point-to-multipoint transmission. That the terminal device supports multicast means that the terminal device supports receiving of the multicast service in an air interface multicast mode.

In this embodiment of this application, when the terminal device requests to join the multicast service or requests to update the PDU session, the session management network element may determine the delivery mode of multicast service based on the multicast capability information of the terminal device and/or the multicast capability information of the access network device, to more effectively deliver the multicast service to the terminal device, so as to improve flexibility and reliability of multicast service transmission.

For example, when the terminal device initially joins the multicast service, an access and mobility management network element may send the first message to the session management network element, to request to add the terminal device to the multicast service. For example, in a scenario in which the terminal device is handed over from a source access network device to the target access network device, the access and mobility management network element may send the second message to the session management network element, to update the PDU session. It should be understood that handing over the terminal device from the source access network device to the target access network device essentially means handing over the PDU session of the terminal device from the source access network device to the target access network device. In other words, "handing over the PDU session of the terminal device" means that when the terminal device moves from the source access network device to the target access network device, to maintain service continuity, the PDU session of the terminal device may be handed over from the source access network device to the target access network device.

With reference to the first aspect, in some implementations of the first aspect, when the delivery mode is a unicast mode, the method further includes: The session management network element determines, based on multicast quality of service QoS information of the multicast service, a unicast QoS flow corresponding to a service data flow (SDF) of the multicast service; and the session management network element adds the unicast QoS flow to the protocol data unit PDU session of the terminal device, where the unicast QoS flow is used to deliver data of the multicast service.

The quality of service QoS information of the multicast service may include a QoS flow identifier (QFI) of a multicast QoS flow of the multicast service, a service data flow (SDF) corresponding to the multicast QoS flow, and a QoS parameter corresponding to the QFI of the multicast QoS flow, for example, a 5G QoS identifier (5QI) (representing a group of QoS parameters, including bandwidth, delay variation, and the like), an allocation retention priority (ARP), a guaranteed bit rate (GBR), a maximum bit rate (MBR), and QoS notification control (QNC).

If the terminal device does not support multicast and/or the access network device does not support multicast, the delivery mode of the multicast service is the unicast mode. In this case, the session management network element may map the multicast QoS flow of the multicast service to the unicast QoS flow, to add the unicast QoS flow to the PDU session, so that the multicast service is subsequently delivered to the terminal device in the unicast mode. To map the multicast QoS flow of the multicast service to the unicast QoS flow is to establish a correspondence between the multicast QoS flow and the unicast QoS flow, so that the multicast service is delivered by using the unicast QoS flow. It should be understood that, for ease of differentiation, a QFI of the unicast QoS flow determined by the session management network element cannot be the same as a QFI of an existing unicast QoS flow. A process of determining the QFI of the unicast QoS flow based on the QFI of the multicast QoS flow may be referred to as mapping. In this embodiment of this application, a correspondence between the QFI of the multicast QoS flow and the QFI of the unicast QoS flow is referred to as a first mapping relationship.

With reference to the first aspect, in some implementations of the first aspect, when the delivery mode is a unicast mode, the method further includes: The session management network element selects at least one unicast QoS flow from one or more unicast QoS flows of the PDU session of the terminal device based on QoS information of the multicast service, where the at least one unicast QoS flow is used to deliver data of the multicast service; and the session management network element sends a correspondence between a packet detection rule of the multicast service and an identifier of the at least one unicast QoS flow to a user plane function network element.

With reference to the first aspect, in some implementations of the first aspect, the correspondence is carried in an eighth message, and the eighth message is an N4 session modification request or a packet forwarding control protocol PFCP session modification request.

The correspondence may be that the eighth message includes both the packet detection rule (PDR) of the multicast service and the identifier that is of the at least one unicast QoS flow and that corresponds to the packet detection rule of the multicast service, and may be used to represent the correspondence between the packet detection rule of the multicast service and the identifier of the at least one unicast QoS flow.

With reference to the first aspect, in some implementations of the first aspect, that the session management network element adds the unicast QoS flow to the PDU session of the terminal device includes: The session management network element sends information about the multicast service and the QFI of the unicast QoS flow to the user plane network element; the session management network element determines a QoS parameter of the unicast QoS flow based on a QoS parameter of the multicast QoS flow; and the session management network element sends the QFI of the unicast QoS flow and the QoS parameter of the unicast QoS flow to the access network device.

In an implementation, the information about the multicast service may include a target address of the multicast service, and optionally, may further include at least one of a source address or port number.

In another implementation, the multicast service is sent to the current user plane network element through another user plane network element. In this case, the session management network element further sends a tunnel identifier of the another user plane network element to the current user plane network element (so that the current user plane network element is connected to the another user plane network element). In this case, the information about the multicast service may include the tunnel identifier of the another user plane network element.

With reference to the first aspect, in some implementations of the first aspect, when the delivery mode is a multicast mode, the method further includes: The session management network element sends a service identifier of the multicast service to the access network device.

If the terminal device supports multicast, and the access network device supports multicast, the delivery mode of the multicast service is the multicast mode. In this case, the session management network element may request the access network device to add the terminal device to the multicast service, to subsequently deliver the multicast service to the terminal device in the multicast mode.

With reference to the first aspect, in some implementations of the first aspect, the method further includes: The session management network element sends information about the multicast QoS flow of the multicast service to the access network device.

With reference to the first aspect, in some implementations of the first aspect, before that the session management network element sends a service identifier of the multicast service to the access network device, the method further includes: The session management network element determines that the access network device has the multicast service.

It should be understood that the access network device may have or may not have the multicast service (where the multicast service needs to be created). Therefore, in an implementation, the session management network element may first determine whether the access network device has the multicast service. If the access network device has the multicast service, the session management network element requests the access network device to add the terminal device to the multicast service. If the access network device does not have the multicast service, the session management network element may first request the access network device to create the multicast service, and after the multicast service is created, the session management network element requests the access network device to add the terminal device to the multicast service.

In another implementation, the session management network element may not perform any determining, and sends the information about the multicast QoS flow of the multicast service to the access network device when requesting the access network device to add the terminal device to the multicast service. In this way, even if the access network device has no multicast service, the access network device may create the multicast service for the terminal device based on the information about the multicast QoS flow, and then add the terminal device to the multicast service.

In embodiments of this application, the session management network element may determine, in a plurality of manners, whether the access network device has the multicast service. This is not limited in embodiments of this application.

With reference to the first aspect, in some implementations of the first aspect, that the session management network element determines that the access network device has the multicast service includes: The session management network element receives a fourth message from a unified data management network element, where the fourth message indicates that the access network device has the multicast service; and the session management network element determines, based on the fourth message, that the access network device has the multicast service.

The session management network element may determine, by using the unified data management network element, whether the access network device has the multicast service. For example, the unified data management network element may autonomously (for example, periodically) send the fourth message to the session management network element, to notify the session management network element of the information about the multicast service that the access network device has. For example, the session management network element may query the unified data management network element, and send a query message to the unified data management network element, to query whether the access network device accessed by the terminal device has the multicast service that the terminal device currently requests to join. The session management network element receives a query result (namely, the fourth message) fed back by the unified data management network element, and may determine, based on the query result, whether the access network device has the multicast service. Optionally, when the session management network element sends the query message to the unified data management network element, the unified data management network element may not feed back the query result. If the session management network element does not receive the query result within a period of time, the session management network element considers by default that the access network device does not have the multicast service (or considers by default that the access network device has the multicast service). However, this is not limited in embodiments of this application.

With reference to the first aspect, in some implementations of the first aspect, before that the session management network element sends a service identifier of the multicast service to the access network device, the method further includes: The session management network element determines that the access network device does not have the multicast service; the session management network element sends the information about the multicast QoS flow of the multicast service to the access network device; and the session management network element receives, from the access network device, indication information indicating that the multicast service corresponding to the multicast QoS flow is successfully created.

If the access network device does not have the multicast service that the terminal device requests to join, the session management network element may send the information about the multicast QoS flow of the multicast service to the access network device. The information about the multicast QoS flow may include the QFI of the multicast QoS flow and the QoS parameter of the multicast QoS flow. After receiving the information about the multicast QoS flow, the access network device may create the corresponding multicast service based on the information about the multicast QoS flow, to prepare for subsequently adding the terminal device to the multicast service.

With reference to the first aspect, in some implementations of the first aspect, the method further includes: The session management network element sends a fifth message to the unified data management network element based on the indication information, where the fifth message indicates that the access network device already has the multicast service.

When the access network device does not have the multicast service that the terminal device requests to join, and the session management network element has created the multicast service, the session management network element may notify the unified data management network element that the multicast service already exists. The fifth message may carry the identifier of the multicast service and an identifier of the access network device.

With reference to the first aspect, in some implementations of the first aspect, the method further includes: The session management network element determines the unicast QoS flow corresponding to the multicast QoS flow; and the session management network element sends the first mapping relationship to the access network device, where the first mapping relationship indicates the correspondence between the QFI of the multicast QoS flow and the QFI of the unicast QoS flow.

When the access network device supports multicast, the session management network element may also generate the mapping relationship between the QFI of the multicast QoS flow and the QFI of the unicast QoS flow, but does not need to modify the PDU session (that is, the unicast QoS flow does not need to be added to the PDU session).

This is because there is a scenario in which the access network device accessed by the terminal device supports multicast. The multicast service is delivered through a multicast session tunnel, and a unicast service is delivered through a PDU session tunnel on which the PDU session is located. However, the terminal device has mobility. Subsequently, the terminal device may move to another access network device, and the another access network device may not support multicast. To avoid a problem that transmission of the multicast service is discontinuous when the terminal device is handed over from the access network device to the another access network device because the another access network device does not support multicast, the session management network element may store the mapping relationship between the QFI of the multicast QoS flow and the QFI of the unicast QoS flow in advance, so that when learning that the another access network device to which the terminal device is to be handed over does not support multicast, the session management network element indicates the user plane network element to map the multicast service to the PDU session tunnel on which the PDU session is located, and deliver the multicast service to the terminal device, to ensure continuity of the multicast service.

With reference to the first aspect, in some implementations of the first aspect, the method further includes: The session management network element receives the multicast capability information of the terminal device and/or the multicast capability information of the access network device from the access and mobility management network element.

With reference to the first aspect, in some implementations of the first aspect, before that the session management network element receives the multicast capability information of the terminal device and/or the multicast capability information of the access network device from the access and mobility management network element, the method further includes: The session management network element sends a request message to the access and mobility management network element, where the request message is used to request the multicast capability information of the terminal device and/or the multicast capability information of the access network device.

With reference to the first aspect, in some implementations of the first aspect, before that the session management network element sends a request message to the access and mobility management network element, the method further includes: The session management network element determines that the PDU session of the terminal device supports multicast.

The session management network element may request the access and mobility management network element to send the multicast capability information of the access network device. Further, optionally, when the PDU session supports multicast, the session management network element may request the access and mobility management network element to send the multicast capability information of the terminal device and/or the multicast capability information of the access network device. Whether the PDU session supports multicast may be determined based on at least one of a DNN (for example, the multicast service can be accessed through the DNN), S-NSSAI (for example, an eMBB slice may support access to the multicast service), and multicast service indication information (for example, an identifier of the multicast service supported by the PDU session).

With reference to the first aspect, in some implementations of the first aspect, the method further includes: The session management network element sends a subscription message to the access and mobility management network element, where the subscription message is used by the mobility management network element to send the multicast capability information of the terminal device and/or the multicast capability information of the access network device to the session management network element when a multicast capability of the terminal device changes and/or a multicast capability of the access network device changes.

The multicast capability information of the terminal device and/or the multicast capability information of the access network device may be obtained by the session management network element through subscription. The session management network element sends the subscription message to the access and mobility management network element, where the subscription message is used by the mobility management network element to send the multicast capability information of the terminal device and/or the multicast capability information of the access network device to the session management network element when the capability of the terminal device changes and/or the capability of the access network device changes. Correspondingly, the access and mobility management network element receives the subscription message from the session management network element, and sends the multicast capability information of the terminal device and/or the multicast capability information of the access network device to the session management network element when the capability of the terminal device changes and/or the capability of the access network device changes. For example, when the capability of the terminal device changes, the access and mobility management network element may send the multicast capability information of the terminal device to the session management network element; when the capability of the access network device changes, the access and mobility management network element may send the multicast capability information of the access network device to the session management network element; and when both the capability of the terminal device and the capability of the access network device change, the access and mobility management network element may send the multicast capability information of the terminal device and the multicast capability information of the access network device to the session management network element.

With reference to the first aspect, in some implementations of the first aspect, that a session management network element receives a first message includes: The session management network element receives the first message from the access and mobility management network element; or the session management network element receives the first message from the user plane network element.

According to a second aspect, another multicast service transmission method is provided. The method includes: An access and mobility management network element obtains multicast capability information of a terminal device and/or multicast capability information of an access network device, where the multicast capability information of the terminal device indicates whether the terminal device supports multicast, the multicast capability information of the access network device indicates whether the access network device supports multicast, and the access network device is an access network device currently accessed by the terminal device or a target access network device of the terminal device; and the access and mobility management network element sends the multicast capability information of the terminal device and/or the multicast capability information of the access network device to a session management network element.

With reference to the second aspect, in some implementations of the second aspect, before that the access and mobility management network element sends the multicast capability information of the terminal device and/or the multicast capability information of the access network device to a session management network element, the method further includes: The access and mobility management network element determines that a PDU session of the terminal device supports multicast.

With reference to the second aspect, in some implementations of the second aspect, that the access and mobility management network element determines that a PDU session of the terminal device supports multicast includes: The access and mobility management network element receives reference information of the PDU session from the terminal device, where the reference information includes one or more of indication information indicating whether the PDU session supports multicast, a data network name DNN of the PDU session, and single network slice selection assistance information S-NSSAI of the PDU session; and the access and mobility management network element determines, based on the reference information, that the PDU session supports multicast.

With reference to the second aspect, in some implementations of the second aspect, the method further includes: The access and mobility management network element receives a request message from the session management network element, where the request message is used to request the multicast capability information of the terminal device and/or the multicast capability information of the access network device.

With reference to the second aspect, in some implementations of the second aspect, the method further includes: The access and mobility management network element receives a subscription message from the session management network element, where the subscription message is used by the mobility management network element to send the multicast capability information of the terminal device and/or the multicast capability information of the access network device to the session management network element when a multicast capability of the terminal device changes and/or a multicast capability of the access network device changes.

With reference to the second aspect, in some implementations of the second aspect, the multicast capability information of the access network device is carried in a next-generation NG establishment request message.

With reference to the second aspect, in some implementations of the second aspect, the multicast capability information of the terminal device is carried in a PDU session establishment/modification request message.

According to a third aspect, another multicast service transmission method is provided. The method includes: An access network device obtains multicast capability information of the access network device; and the access network device sends the multicast capability information of the access network device, where the multicast capability information indicates whether the access network device supports multicast.

With reference to the third aspect, in some implementations of the third aspect, that the access network device sends the multicast capability information of the access network device includes: The access network device sends the multicast capability information to an access and mobility management network element or a neighboring access network device of the access network device.

With reference to the third aspect, in some implementations of the third aspect, the method further includes: The access network device receives a handover request message from another access network device, where the handover request message includes an identifier of a PDU session of a terminal device, and the PDU session supports multicast; and the access network device sends indication information to a core network device, where the indication information indicates whether the access network device has a multicast service.

According to a fourth aspect, a multicast service transmission apparatus is provided. The apparatus is configured to perform the method according to any one of the foregoing aspects or the implementations of the foregoing aspects. The apparatus includes units configured to perform the method according to any one of the foregoing aspects or the implementations of the foregoing aspects.

In a design, the apparatus may include modules that one-to-one correspond to the methods/operations/steps/actions described in the foregoing aspects. The module may be implemented by a hardware circuit, software, or a combination of a hardware circuit and software.

In a design, the apparatus is a communication chip. The communication chip may include an input circuit or interface configured to send information or data, and an output circuit or interface configured to receive information or data.

In another design, the apparatus is a communication device. The communication device may include a transmitter configured to send information or data, and a receiver configured to receive information or data.

In another design, the apparatus is configured to perform the method according to any one of the foregoing aspects or the implementations of the foregoing aspects. The apparatus may be configured in the session management network element, or the apparatus is the session management network element.

According to a fifth aspect, another multicast service transmission apparatus is provided. The apparatus includes a processor, where the processor is coupled to a memory, the memory is configured to store a computer program, and the processor is configured to invoke the computer program from the memory and run the computer program, so that the apparatus performs the multicast service transmission method according to any one of the foregoing aspects or the implementations of the foregoing aspects.

Optionally, there are one or more processors, and there are one or more memories.

Optionally, the memory may be integrated with the processor, or the memory and the processor are separately disposed.

Optionally, the apparatus further includes a transmitter and a receiver. The transmitter and the receiver may be separately disposed, or may be integrated together to obtain a transceiver.

According to a sixth aspect, a system is provided. The system includes an apparatus configured to implement the method according to any one of the first aspect or the implementations of the first aspect, an apparatus configured to implement the method according to any one of the second aspect or the implementations of the second aspect, and an apparatus configured to implement the method according to any one of the third aspect or the implementations of the third aspect.

According to a seventh aspect, a computer program product is provided. The computer program product includes computer program code. When the computer program code is run by a computer, the computer is enabled to perform the method according to any one of the foregoing aspects or the implementations of the foregoing aspects.

According to an eighth aspect, a computer-readable medium is provided. The computer-readable medium is configured to store instructions. When the instructions are run on a computer, the computer is enabled to perform the instructions of the method according to any one of the foregoing aspects or the implementations of the foregoing aspects.

According to a ninth aspect, an embodiment of this application provides a chip system. The chip system includes one or more processors, configured to invoke, from a memory, and run instructions stored in the memory, so that the method according to any one of the foregoing aspects or the implementations of the foregoing aspects is performed. The chip system may include a chip, or may include the chip and another discrete component.

The chip system may include an input circuit or interface configured to send information or data, and an output circuit or interface configured to receive information or data.

BRIEF DESCRIPTION OF DRAWINGS

FIG. 3 is a diagram of service data transmission according to an embodiment of this application;

FIG. 4 is another diagram of service data transmission according to an embodiment of this application;

FIG. 5 is a flowchart of a multicast service transmission method according to an embodiment of this application;

DESCRIPTION OF EMBODIMENTS

Figure 1:
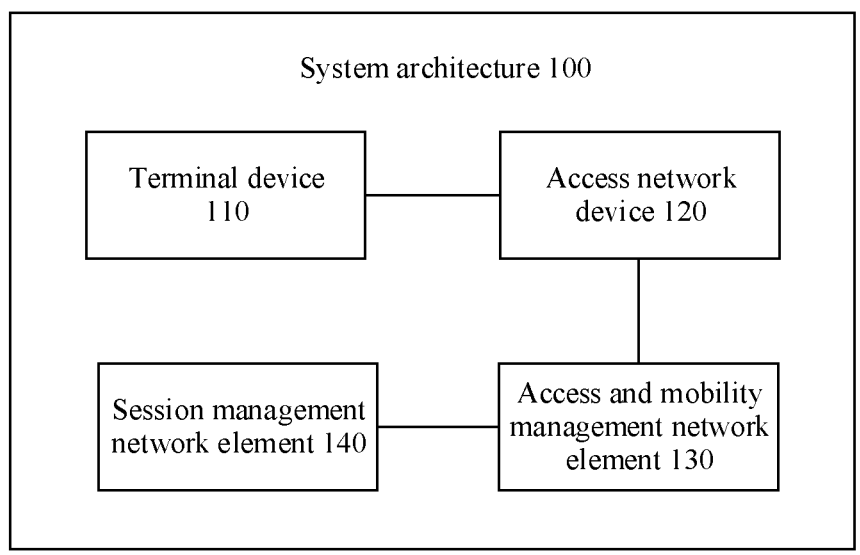
FIG. 1 is a diagram of a system architecture according to an embodiment of this application.

The following describes technical solutions in this application with reference to the accompanying drawings.

The technical solutions in embodiments of this application may be applied to various communication systems, for example, a long term evolution (LTE) system, an LTE frequency division duplex (FDD) system, an LTE time division duplex (TDD) system, a universal mobile telecommunications system (UMTS), a 5th generation (5G) system, a new radio (NR) system, or another evolved communication system.

A terminal device in embodiments of this application may also be referred to as user equipment (UE), a mobile station (MS), a mobile terminal (MT), an access terminal, a subscriber unit, a subscriber station, a mobile station, a remote station, a remote terminal, a mobile device, a user terminal, a terminal, a wireless communication device, a user agent, a user apparatus, or the like.

The terminal device may be a device that provides a voice/data connectivity for a user, for example, a handheld device having a wireless connection function or a vehicle-mounted device. Currently, some examples of the terminal device are a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote surgery, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a 5G network, or a terminal device in a future evolved public land mobile network (PLMN). This is not limited in embodiments of this application.

By way of example, and not limitation, in embodiments of this application, the terminal device may alternatively be a wearable device. The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that is directly worn or integrated into clothes or an accessory of a user. The wearable device is not only a hardware device, but is used to implement powerful functions through software support, data exchange, and cloud interaction. Generalized wearable intelligent devices include full-featured and large-size devices that can implement complete or partial functions without depending on smartphones, for example, smart watches or smart glasses, and devices that focus on only one type of application function and need to work with another device such as a smartphone, for example, various smart bands or smart accessories for monitoring physical signs.

In addition, the terminal device in embodiments of this application may alternatively be a terminal device in an internet of things (IoT) system. IoT is an important part of future information technology development. A main technical feature of the IoT is connecting a thing to a network by using a communication technology, to implement a man-machine connected and thing-thing connected intelligent network.

In addition, an access network device in embodiments of this application may be a transmission reception point (TRP), or may be an evolved NodeB (eNB or eNodeB) in an LTE system, or may be a home base station (for example, a home evolved NodeB or a home NodeB, HNB) or a baseband unit (BBU), or may be a radio controller in a cloud radio access network (CRAN) scenario. Alternatively, the access network device may be a relay station, an access point, a vehicle-mounted device, a wearable device, an access network device in a 5G network, an access network device in a future evolved public land mobile network (PLMN), or the like, may be an access point (AP) in a WLAN, or may be a gNB in a new radio (NR) system. This is not limited in embodiments of this application. In a network structure, the access network device may include a centralized unit (CU) node, a distributed unit (DU) node, a RAN device including a CU node and a DU node, or a RAN device including a CU control plane node (CU-CP node), a CU user plane node (CU-UP node), and a DU node.

In embodiments of this application, the terminal device or the access network device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems that implement service processing by using a process, for example, a Linux operating system, a Unix operating system, an Android operating system, an iOS operating system, or a Windows operating system. The application layer includes applications such as a browser, an address book, word processing software, and instant messaging software. In addition, a structure of an execution body of a method provided in embodiments of this application is not limited in embodiments of this application, provided that a program that records code of the method provided in embodiments of this application can be run to perform communication according to the method provided in embodiments of this application. For example, the method provided in embodiments of this application may be performed by a network device, or a functional module that is in the network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to: a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry instructions and/or data.

For ease of understanding embodiments of this application, a communication system applicable to embodiments of this application is first described in detail with reference to FIG. 1. As shown in FIG. 1, a system architecture 100 includes a terminal device 110, an access network device 120, an access and mobility management network element 130, and a session management network element 140.

The access and mobility management network element 130 and the session management network element 140 are core network devices. For example, the terminal device 110 may access a core network through the access network device 120, to implement data transmission. The access and mobility management function network element 130 may receive, from the access network device, a request for adding the terminal device 110 to a multicast service, and request the session management network element 140 to add the terminal device 110 to the multicast service. The session management function network element 140 may create a corresponding multicast session tunnel for the terminal device 110, and add the terminal device 110 to the multicast service, to send a data flow of the multicast service to the terminal device 110.

The system architecture 100 may be configured to perform a multicast service transmission method in embodiments of this application.

Figure 2:
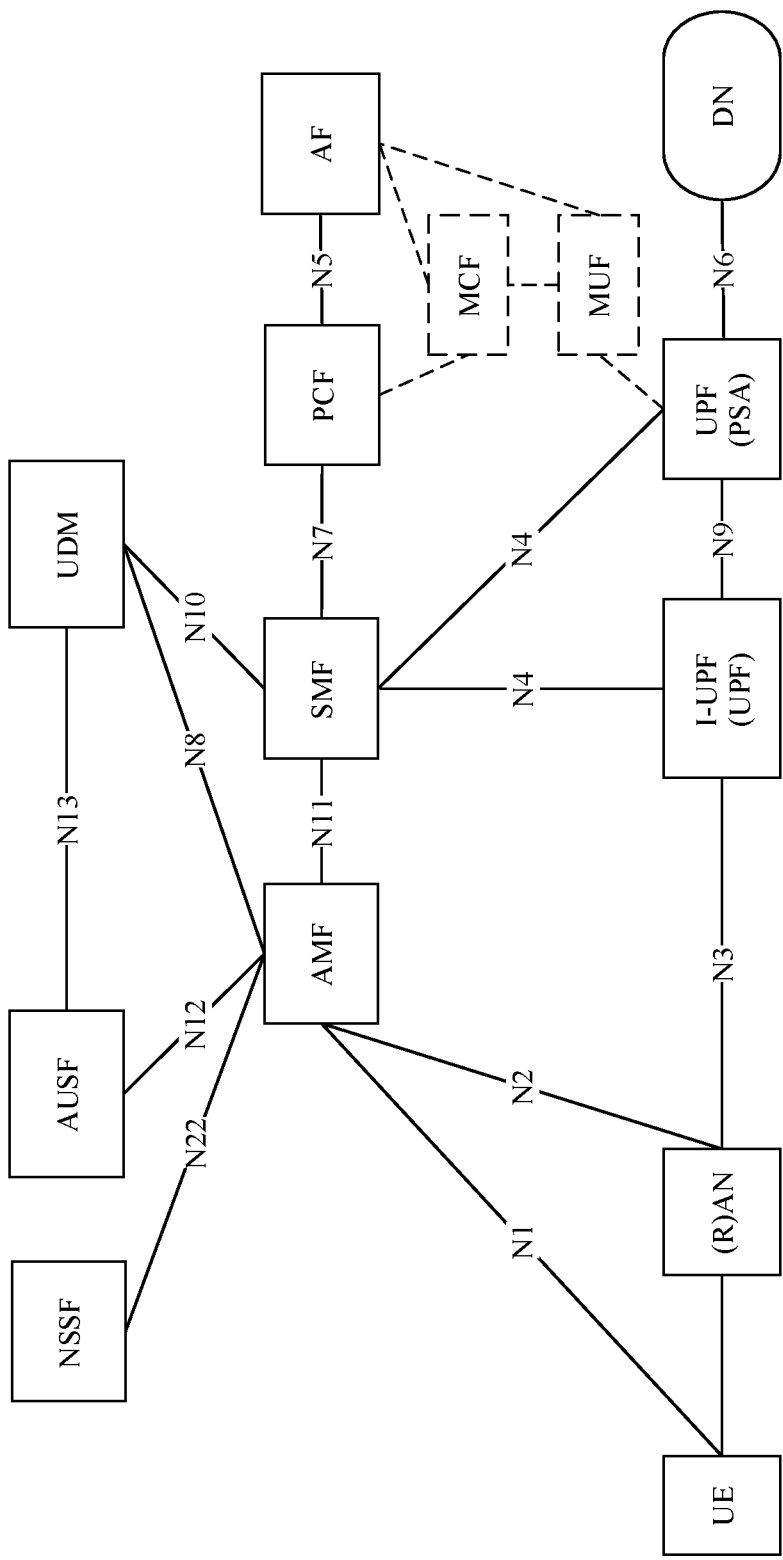
FIG. 2 is a diagram of another system architecture according to an embodiment of this application.

Because the multicast service transmission method in this application is mainly based on a 5th generation (5G) mobile communication technology and another future mobile communication technology, the following describes another system architecture, namely, a 5G system architecture, in embodiments of this application with reference to FIG. 2.

It should be noted that the multicast service solution in this application may be applied to a broadcast service.

FIG. 2 shows another system architecture 200 according to an embodiment of this application. As shown in FIG. 2, the system architecture 200 may include the following network elements:

1. User equipment UE.
2. (Radio) access network ((R)AN): The (R)AN is configured to provide a network access function for an authorized user in a specific area, and can use transmission tunnels with different quality based on user levels, service requirements, and the like. A (R)AN network element can manage radio resources and provide an access service for a terminal device, to forward a control signal and user data between the terminal device and a core network. The (R)AN may also be understood as a base station in a conventional network.

3. Access and mobility management function (AMF): The AMF is mainly used for mobility management, access management, and the like. The AMF may be configured to implement a function other than session management in functions of a mobility management entity (MME), for example, a function such as lawful interception or access authorization (or authentication).

4. Session management function (SMF): The SMF may also be referred to as a session management function network element, and is mainly configured to manage a session, assign and manage an internet protocol (IP) address of the terminal device, select a termination point that can manage a user plane function interface and a policy control and charging function interface, notify downlink data, and so on.

It should be understood that in the foregoing system architecture 100, the access network device 120 may be the RAN in FIG. 2, the access and mobility management network element 130 may be the AMF in FIG. 2, and the session management network element 140 may be the SMF in FIG. 2. This is not limited.

Optionally, the system architecture 200 may further include:

5. User plane function (UPF): The UPF may also be referred to as a user plane function, a user plane network element, or a user plane function network element, and is used for packet routing and forwarding, quality of service (QoS) processing of user plane data, or the like. The UPF is specifically classified into an intermediate-UPF (I-UPF) and an anchor-UPF (anchor-UPF, A-UPF). The I-UPF is connected to an access network RAN, the A-UPF is a UPF of a session anchor, and the A-UPF may also be referred to as a PDU session anchor (PSA).

6. Data network (DN): The DN is configured to provide a network for transmitting data, for example, an internet network. In the architecture in this embodiment of this application, the PSA accesses a remote DN, and an L-PSA may access a local DN.

7. Authentication server function (AUSF): The AUSF is mainly used for user authentication and the like.

8. Policy control function (PCF): The PCF is a unified policy framework used for guiding network behavior, and provides policy rule information and the like for a control plane function network element (for example, an AMF or SMF network element).

9. Unified data management (UDM): The UDM is used for user identifier processing, access authentication, registration, mobility management, and the like.

10. Application function (AF): The AF mainly supports interaction with a 3rd generation partnership project (3GPP) core network to provide a service, for example, affects a data routing decision or a policy control function, or provides some third-party services for a network side. The AF may be understood as a third-party server, for example, an application server in the internet, provides related service information, including providing quality of service requirement information corresponding to a service to the PCF, and delivering user plane data information of the service to a PSA-UPF. The AF may be a content provider (CP).

11. Network slice selection function (NSSF): The NSSF is used for network slice selection.

In the system architecture 200, an N1 interface is a reference point between the terminal device and the AMF; an N2 interface is a reference point between the (R)AN and the AMF, and is configured to send a non-access stratum (NAS) message and the like; an N3 interface is a reference point between the (R)AN and the I-UPF, and is configured to transmit user plane data and the like; an N4 interface is a reference point between the SMF and the I-UPF, and is configured to transmit information such as tunnel identifier information of an N3 connection, data buffer indication information, and a downlink data notification message; an N5 interface is a reference point between the PCF and the AF; an N6 interface is a reference point between the UPF and the DN, and is used to transmit user plane data and the like; an N7 interface is a reference point between the SMF and the PCF; an N8 interface is a reference point between the AMF and the UDM; an N9 interface is a reference point between UPFs; an N10 interface is a reference point between the SMF and the UDM; an N11 interface is a reference point between the AMF and the SMF; an N12 interface is a reference point between the AMF and the AUSF; and an N22 interface is a reference point between the AMF and the NSSF.

Optionally, the system architecture 200 may further include:

12. Multicast control plane function (MCF): The MCF is configured to control a multicast service. The MCF is connected to the content provider (CP), to receive information related to the multicast service (for example, descriptions of the multicast service). The MCF is connected to the PCF, to create a resource for the multicast service. It should be noted herein that in a 5G network, the MCF network element may alternatively have another name, and implements a control plane function of the multicast service.

13. Multicast user plane function (MUF): The MUF is configured to deliver data of the multicast service, that is, deliver multicast data received from the CP to the UPF. It should be noted herein that in the 5G network, the MUF network element may alternatively have another name, and implements a user plane function of the multicast service.

In the system architecture 200, the MCF may be integrated into the PCF (or the SMF), and the MUF may be integrated into the UPF. This is not limited in this embodiment of this application.

It should be understood that the foregoing system architecture 200 applied to this embodiment of this application is merely an example of a network architecture described from a perspective of a reference point architecture, and a network architecture applicable to this embodiment of this application is not limited thereto. Any network architecture that can implement functions of the foregoing network elements is applicable to this embodiment of this application.

It should be noted that names of interfaces between the foregoing network elements in FIG. 2 are only examples, and the interfaces may have other names in implementations. This is not limited in embodiments of this application.

It should be noted that names of the network elements (such as the SMF, the AF, and the UPF) included in FIG. 2 are also merely examples, and do not constitute any limitation on the functions of the network elements. In the 5G network and another future network, the foregoing network elements may alternatively have other names. This is not limited in embodiments of this application. For example, in a 6G network, some or all of the foregoing network elements may use terms in 5G, or may use other names, or the like. This is uniformly described herein. Details are not described in the following. In addition, it should be understood that names of messages (or signaling) transmitted between the foregoing network elements are merely examples, and do not constitute any limitation on functions of the messages.

To facilitate understanding of embodiments of this application, the following first briefly describes terms used in this application.

1. Multicast and Unicast

Unicast may be understood as "point to point" communication. Unicast has a plurality of meanings, which are as follows:

At a service layer, a unicast service means that service data is sent to a specific terminal device.

Unicast between network elements means that a unicast tunnel exists between a source network element and a target network element (that is, an IP address of the target network element is a unicast IP address).

For an air interface, an air interface unicast mode means that a radio access network delivers service data to a single terminal device.

At a core network service layer, unicast means delivering service data to a terminal device by using a PDU session.

In this application document, a unicast mode in delivery modes determined by an SMF means delivering data of a multicast service to a terminal device by using a PDU session.

Multicast may be referred to as "groupcast", and may be understood as "point to multi-point (PTM)" communication. Multicast has a plurality of meanings, which are as follows:

At a service layer, a multicast service means that data of the service is sent to a plurality of terminal devices.

Multicast between network elements means that a multicast tunnel exists between a source network element and a target network element (that is, an IP address of the target network element is a multicast IP address).

For an air interface, an air interface multicast mode means that a plurality of terminal devices may receive, at the same time or on a same frequency, one piece of service data sent by a radio access network.

At a core network service layer, multicast means delivering data of a multicast service to a terminal device by using a multicast session. The multicast session includes a unicast tunnel or a multicast tunnel between network elements, and an air interface radio bearer in a unicast mode or an air interface radio bearer in a multicast mode.

In embodiments of this application, a multicast mode in delivery modes determined by an SMF means delivering data of a multicast service to a terminal device by using a multicast session.

In the multicast mode, service data may be delivered to all target nodes once, or service data may be delivered only to a specific object. Therefore, in the multicast mode, point to multi-point transmission may be implemented between one sending node and multiple receiving nodes, so that a problem of low efficiency of the unicast mode is resolved.

It should be noted that a broadcast service may be sent to a terminal device by using a multicast session. This is not limited in embodiments of this application. "Multicast" in this application is a concept in a broad sense, and may include multicast or broadcast. In other words, embodiments of this application may be applied to both multicast service transmission and broadcast service transmission. "Multicast" mentioned in this application may be replaced with "multicast or broadcast".

FIG. 3 is a diagram of service data transmission according to an embodiment of this application. The diagram shown in FIG. 3 is used to deliver multicast service data. In FIG. 3, the multicast service data may be sent from a CP to UE 1, UE 2, and UE 3. A multicast service transmission path between the CP and an may include a transmission path between the CP and a UPF and a transmission path between the UPF and the AN. The transmission path between the UPF and the AN may use a tunnel to deliver the multicast service data, for example, use a tunnel according to the general tunnel protocol (GTP). Therefore, the transmission path between the UPF and the AN may be referred to as a multicast session tunnel, and the multicast session tunnel is shared by the UE 1, the UE 2, and the UE 3. On an air interface, the AN may deliver the multicast service data to the UE 1, the UE 2, and the UE 3 in a PTM manner, that is, only one piece of data needs to be sent, and all the three UEs can receive the data. In the example in FIG. 3, only one piece of multicast service data is sent on a transmission path between the CP and the UE, and the plurality of UEs may simultaneously receive the multicast service data.

FIG. 4 is another diagram of service data transmission according to an embodiment of this application. The diagram shown in FIG. 4 may be used to deliver multicast service data (in a unicast mode), and may further be used to deliver unicast service data. In FIG. 4, each of three UEs corresponds to a different PDU session. Three different pieces of service data sent by a CP may be sent to the UEs by using respective corresponding PDU sessions. A service transmission path between the CP and an may include a transmission path between the CP and a UPF and a transmission path between the UPF and the AN. The transmission path between the UPF and the AN may be referred to as a PDU session tunnel, and different PDU sessions have different PDU session tunnels. Three PDU session tunnels in this diagram correspond to the three UEs. On an air interface, the AN may separately deliver the service data to UE 1, UE 2, and UE 3 in a unicast mode, namely, a PTP manner. In the diagram, the service data of the UEs may be different (for example, target addresses are IP addresses of the UEs), and the service data of the UEs may be respectively sent to the UEs through independent transmission paths of the UEs.

In this application, both a multicast session tunnel and a PDU session tunnel are tunnels between a user plane network element (for example, a UPF) and an access network AN (for example, a base station). The multicast session tunnel may be used to transmit a multicast QoS flow of a multicast service, and the PDU session tunnel may be used to transmit a unicast QoS flow of a unicast service, and may further be used to transmit a unicast QoS flow corresponding to the multicast QoS flow of the multicast service.

It should be understood that the multicast QoS flow is transmitted between the UPF and a gNB 1, and data received by each UE may be referred to as multicast service data after being processed by a service data adaptation protocol (SDAP) layer, a packet data convergence protocol (PDCP) layer, a radio link control (RLC) layer, a media access control (MAC) layer, and a physical (PHY) layer of the gNB 1.

2. Multicast Service, Multicast Service Flow, and Multicast Quality of Service (QoS) Flow The multicast service may include one or more multicast service flows, which are indicated by information about the multicast service. The information about the multicast service includes at least description information of the multicast service. The description information of the multicast service may include description information of the one or more multicast service flows. The description information of the multicast service flow includes at least one of the following: a quality of service index (QFI) that the multicast service flow needs to have, characteristic information of the multicast service flow (such as a multicast address, a target port number, and a source address of the multicast service), a QoS requirement (such as jitter, a delay, a packet loss rate, and bandwidth) of the multicast service flow. The QoS requirement of the multicast service flow is used to establish a multicast QoS flow. One multicast session may include one or more multicast QoS flows. In other words, the multicast service may be delivered by using one or more multicast QoS flows in a multicast session tunnel on which the multicast session is located.

It should be understood that a PDU session is at a UE level, and the multicast session is at a service level. One PDU session of one UE may be associated with a plurality of multicast sessions. The PDU session of the UE may join a plurality of multicast services. One multicast service may be served by one multicast session. One multicast session includes a unicast or multicast tunnel from a data network to a core network and then to a radio access network, and a unicast or multicast air interface resource that is allocated by the radio access network and that is used to deliver the multicast service.

In addition to the description information of the multicast service, the information about the multicast service may further include information about a terminal device, for example, may include an identifier of one or more terminal devices that are allowed (or that request) to join the multicast service, and an identifier of a terminal device group.

A globally unique multicast service identifier (multicast ID, MCID) may be allocated to one multicast service, and the MCID may uniquely identify the multicast service in a PLMN. It should be understood that the English name MCID is not limited in this application, and the MCID may alternatively be replaced with another name, but a function of the MCID is to uniquely identify a multicast service. For example, the MCF shown in FIG. 2 may obtain information about a multicast service from the CP, and then send the obtained information about the multicast service to the PCF; and the PCF may generate a policy and charging control (PCC) rule based on the information about the multicast service. If the information about the multicast service may be applied to all terminal devices, the generated PCC rule may also be applied to all the terminal devices. Otherwise, the generated PCC rule may be related to one or more terminal devices related to the multicast service. Optionally, if the MCF allocates an MCID to the multicast service, the MCF may send the MCID and the information about the multicast service together to the PCF. Correspondingly, the PCC rule generated by the PCF for the multicast service may also include the MCID. Alternatively, the MCF does not allocate the MCID to the multicast service, the PCF allocates the MCID, and the PCF may send, to the MCF by using a response message, the MCID allocated to the multicast service.

Because there may be both an access network device supporting multicast and an access network device not supporting multicast, and there may be both a terminal device supporting multicast and a terminal device not supporting multicast in a network, embodiments of this application provide a multicast service transmission method, so that a multicast service can be delivered regardless of whether there is a device supporting multicast in a system, thereby improving reliability of the multicast service transmission.

In embodiments of this application, a user plane function may also be referred to as a user plane function, a user plane network element, or a user plane function network element, and the four names may be replaced with each other.

FIG. 5 is a flowchart of a multicast service transmission method 500 according to an embodiment of this application. The method 500 may be applied to the system architecture 100 shown in FIG. 1, or may be applied to the system architecture 200 shown in FIG. 2. Embodiments of this application are not limited thereto.

S510. A session management network element receives a first message.

The first message is used to request to add a terminal device to a multicast service.

The first message may be from an access and mobility management network element or a user plane function network element (for example, a UPF).

S520. The session management network element determines, based on multicast capability information of the terminal device and/or multicast capability information of an access network device accessed by the terminal device, a delivery mode of the multicast service.

The delivery mode is a unicast mode or a multicast mode. The multicast capability information of the terminal device indicates whether the terminal device supports multicast, and the multicast capability information of the access network device indicates whether the access network device supports multicast.

That the access network device supports multicast means that an air interface of the access network device supports point to multi-point transmission. That the terminal device supports multicast means that the terminal device supports receiving of the multicast service in an air interface multicast mode.

In this embodiment of this application, when the terminal device requests to join the multicast service, the session management network element may add the terminal device to the multicast service based on the multicast capability information of the terminal device and/or the multicast capability information of the access network device accessed by the terminal device, so that the multicast service is delivered to the terminal device more effectively, a delay in requesting, by the terminal device, to join the multicast service is reduced, and flexibility and reliability of the multicast service transmission is improved.

It should be understood that, when all terminal devices in a communication network support multicast, in S520, the session management network element may not reference the multicast capability information of the terminal device, but reference only the multicast capability information of the access network device, that is, determine whether the access network device accessed by the terminal device supports multicast.

When all access network devices in a communication network support multicast, in S520, the session management network element may not reference the multicast capability information of the access network device, but reference only the multicast capability information of the terminal device, that is, determine whether the terminal device supports multicast.

When there are both an access network device supporting multicast and an access network device not supporting multicast, and there are both a terminal device supporting multicast and a terminal device not supporting multicast in a communication network, in S520, the session management network element may reference the multicast capability information of the terminal device and the multicast capability information of the access network device.

Based on the multicast capability information of the terminal device and/or the multicast capability information of the access network device, step S520 may include the following two cases:

Case 1: The multicast capability information of the terminal device indicates that the terminal device does not support multicast, and/or the multicast capability information of the access network device indicates that the access network device does not support multicast.

Optionally, in an implementation of the case 1, step S520 includes: when the delivery mode is the unicast mode, the method further includes: The session management network element determines, based on multicast quality of service QoS information of the multicast service, a unicast QoS flow corresponding to the multicast service; and the session management network element adds the unicast QoS flow to a protocol data unit PDU session of the terminal device, where the unicast QoS flow is used to deliver data of the multicast service. In an implementation, that the session management network element adds the unicast QoS flow to a PDU session of the terminal device may include: The session management network element obtains QoS information of the multicast service from a multicast/broadcast session management function network element, where the QoS information of the multicast service includes a QFI of a multicast QoS flow of the multicast service, a service data flow (SDF) corresponding to the multicast QoS flow, and a QoS parameter corresponding to the QFI of the multicast QoS flow. For example, the QoS parameter may include a 5QI, an ARP, a GBR, an MBR, and QNC (QoS notification control). A QoS parameter corresponding to a unicast QoS flow whose value is the same as a value of the QoS information corresponding to the multicast QoS flow of the multicast service may be found based on the QoS information corresponding to the multicast QoS flow of the multicast service, to determine that the unicast QoS flow is the determined unicast QoS flow.

In an optional embodiment, that the session management network element adds the unicast QoS flow to a PDU session of the terminal device includes: The session management network element sends, to the user plane network element, filter information (for example, a packet detection rule (PDR)) used to identify the multicast service and a QFI of the unicast QoS flow; the session management network element determines a QoS parameter of the unicast QoS flow based on the QoS parameter of the multicast QoS flow; and the session management network element sends the QFI of the unicast QoS flow and the QoS parameter of the unicast QoS flow to a target access network device.

In an optional embodiment, that the session management network element adds the unicast QoS flow to a PDU session of the terminal device includes: The session management network element sends, to the user plane network element, an N4 session modification request or a packet forwarding control protocol (PFCP) session modification request, to add, to the mapped unicast QoS flow, a filter used to filter data of the multicast/broadcast service. That is, according to this technical solution, the mapped unicast QoS flow has been previously used to deliver service data in the PDU session. The packet detection rule (PDR) may be, for example, a filter of the multicast service. The filter is a 5-tuple, including a source address, a target address, a source port number, a target port number, and a protocol number, and may be used to identify the data of the multicast service.

In other words, if the terminal device does not support multicast and/or the access network device does not support multicast, the delivery mode of the multicast service is the unicast mode. In this case, the session management network element maps the multicast QoS flow of the multicast service to the unicast QoS flow, to add the unicast QoS flow to the PDU session, so that the multicast service is subsequently delivered to the terminal device in the unicast mode.

To map the multicast QoS flow of the multicast service to the unicast QoS flow is to establish a correspondence between the multicast QoS flow and the unicast QoS flow, so that the multicast service is delivered by using the unicast QoS flow.

It should be understood that, for ease of differentiation, a QFI of the unicast QoS flow determined by the session management network element is different from a QFI of an existing unicast QoS flow. For example, it is assumed that a value that may be used for the QFI of the unicast QoS flow is (10-64). If the terminal device already has two unicast services, for example, Youku Video and WeChat, where YoukuVideo includes three unicast QoS flows (QFI=12, QFI=13, and QFI=16), and WeChat includes two unicast QoS flows (QFI=11 and QFI=12). In this case, the two unicast services correspond to four unicast QoS flows in total (QFI=11, QFI=12, QFI=13, and QFI=16). Therefore, there are still 50 available QFI values for the QFI of the unicast QoS flow, and the SMF may determine that the QFI of the unicast QoS flow corresponding to the multicast QoS flow is an unused QFI. A process of determining the QFI of the unicast QoS flow based on the QFI of the multicast QoS flow may be referred to as mapping. In this embodiment of this application, a correspondence between the QFI of the multicast QoS flow and the QFI of the unicast QoS flow is referred to as a first mapping relationship. During implementation, one multicast QoS flow may be mapped to as one unicast QoS flow, or a plurality of multicast QoS flows may be mapped to as one unicast QoS flow. How to perform mapping is not limited in embodiments of this application.

In an implementation, that the session management network element adds the unicast QoS flow to a PDU session of the terminal device may include: The session management network element obtains QoS information of a service data flow (SDF) of the multicast service from a multicast/broadcast session management function network element. For example, the QoS information may include a 5QI, an ARP, a GBR, an MBR, and QNC (QoS notification control). A QoS parameter corresponding to a unicast QoS flow whose value is the same as a value of the QoS information corresponding to the service data flow SDF of the multicast service may be found based on the QoS information corresponding to the service data flow SDF of the multicast service, to determine that the unicast QoS flow is the determined unicast QoS flow. The session management network element sends, to the user plane network element, filter information (for example, a packet detection rule (PDR)) used to identify the multicast service, information about the multicast service, and a QFI of the unicast QoS flow; the session management network element determines a QoS parameter of the unicast QoS flow based on a QoS parameter of a multicast QoS flow; and the session management network element sends the QFI of the unicast QoS flow and the QoS parameter of the unicast QoS flow to the access network device. The packet detection rule (PDR) may be, for example, a filter of the multicast service. The filter is a 5-tuple, including a source address, a target address, a source port number, a target port number, and a protocol number, and may be used to identify data of the multicast service.

In another implementation, that the session management network element adds the unicast QoS flow to a PDU session of the terminal device includes:

The session management network element selects at least one unicast QoS flow from one or more unicast QoS flows of the PDU session of the terminal device based on QoS information of the multicast service, where the at least one unicast QoS flow is used to deliver data of the multicast service, and the unicast QoS flow is an existing QoS flow; and the session management network element sends a correspondence between a packet detection rule of the multicast service and an identifier of the at least one unicast QoS flow to the user plane function network element.

The correspondence may be carried in an eighth message, and the eighth message is an N4 session modification request message or a PFCP session modification request.

For example, the correspondence may be that the eighth message includes both the packet detection rule of the multicast service and the identifier that is of the at least one unicast QoS flow and that corresponds to the packet detection rule of the multicast service, and may be used to represent the correspondence between the packet detection rule of the multicast service and the identifier of the at least one unicast QoS flow. The session management network element sends the N4 session modification request or the PFCP session modification request to the user plane network element. The N4 session modification request or the PFCP session modification request message includes both the packet detection rule of the multicast service and the identifier that is of the at least one unicast QoS flow and that corresponds to the packet detection rule of the multicast service, and may be used to represent the correspondence between the packet detection rule of the multicast service and the identifier of the at least one unicast QoS flow.

The packet detection rule may be, for example, a filter of the multicast service. The filter is a 5-tuple, including a source address, a target address, a source port number, a target port number, and a protocol number, and may be used to identify data of the multicast service.

The information about the multicast service is information about a multicast service corresponding to a multicast QoS flow mapped to the unicast QoS flow. For example, when determining a QoS parameter corresponding to the unicast QoS flow, the session management network element may determine the QoS parameter based on QoS parameters of all multicast QoS flows mapped to the unicast QoS flow. However, this is not limited in embodiments of this application.

Further, the session management network element may further indicate the user plane network element to deliver a packet of the multicast service through a PDU session tunnel. The user plane network element may identify the packet of the multicast service based on the information about the multicast service, and deliver the packet of the multicast service to a downlink node (for example, a radio access network) through the PDU session tunnel. In addition, the user plane network element may determine, based on the information about the multicast service and a QFI of the unicast QoS flow, a QFI corresponding to the packet, and deliver, to the downlink node, the packet carrying the QFI of the unicast QoS flow corresponding to the packet. The QFI corresponding to the packet may be determined by the session management network element based on a QoS requirement of the multicast service. For example, the SMF may obtain the QoS requirement (for example, bandwidth, a delay, and jitter) related to the multicast service from a PCF, and the SMF may determine the QFI based on the QoS requirement. For example, the SMF may determine a QFI of a picture included in the multicast service as 1, and determine a QFI of a voice included in the multicast service as 3. Optionally, the QFI of the unicast QoS flow may be included in a packet header of the general packet radio service tunneling protocol-user plane (GTP-U), and is used as a field of the packet header of the GTP-U.

In an implementation, the information about the multicast service may include a target address of the multicast service, and may further include at least one of a source address or port number.

In another implementation, the multicast service is sent to the current user plane network element through another user plane network element. In this case, the session management network element further sends a tunnel identifier of the another user plane network element to the current user plane network element (so that the current user plane network element is connected to the another user plane network element). In this case, the information about the multicast service may include the tunnel identifier of the another user plane network element.

Case 2: Only the multicast capability information of the terminal device is referenced (by default, the access network device supports multicast), where the multicast capability information of the terminal device indicates that the terminal device supports multicast;

only the multicast capability information of the access network device is referenced (by default, the terminal device supports multicast), where the multicast capability information of the access network device indicates that the access network device supports multicast; or the multicast capability information of the terminal device and the multicast capability information of the access network device are referenced, where the multicast capability information of the terminal device indicates that the terminal device supports multicast, and the multicast capability information of the access network device indicates that the access network device supports multicast.

Optionally, in an implementation of the case 2, step S520 includes: when the delivery mode is the multicast mode, the method further includes: The session management network element sends a third message to the access network device, where the third message is used to request to add the terminal device to the multicast service.

The third message may include a service identifier of the multicast service, which may also be referred to as identification information of the multicast service, for example but not limited to, may be any one of the following, or may be one or a combination of the following: an identifier of the multicast/broadcast service, a name of the multicast/broadcast service, a multicast/broadcast address of the multicast/broadcast service, a multicast/broadcast IP address of the multicast/broadcast service, a temporary mobile group identity (TMGI) corresponding to the multicast/broadcast service, and a multicast/broadcast service session address of the multicast/broadcast service.

It may be understood that the service identifier of the multicast service may alternatively be carried in another message, for example, N1N2 information transfer (Namf_Communication_N1N2Message Transfer). The N1N2 information transfer shown in S806 and/or S814 in FIG. 8A and FIG. 8B and S906 and/or S914 in FIG. 9A and FIG. 9B is sent to the AMF, and then the AMF sends the service identifier of the multicast service to the access network device by using another message. The another message may alternatively be an N2 message. For example, the N2 message may be an N2 PDU session request, a PDU session resource setup request, or a PDU session resource modify request.

Correspondingly, the access network device receives the third message from the session management network element. If current air interface resources are sufficient, the access network device may deliver corresponding radio bearer configuration information to the terminal device, and the terminal device may perform access stratum receiving configuration based on the radio bearer configuration information, and then may receive data of the multicast service, that is, the terminal device successfully joins the multicast service. If air interface resources are insufficient and a radio bearer cannot be configured, the access network device cannot deliver radio bearer configuration information to the terminal device, that is, the terminal device cannot join the multicast service. It should be understood that a radio bearer configuration may be identified by a data radio bearer (DRB) ID, and corresponds to an entire set of radio access stratum configurations.

It should be noted that the radio bearer configuration information may be replaced with radio resource configuration information, and the radio bearer configuration may be replaced with a radio resource configuration. A radio resource may include a radio bearer, and the radio resource configuration information may include the radio bearer configuration information. This is not limited.

If the terminal device supports multicast, and the access network device supports multicast, the delivery mode of the multicast service is the multicast mode. In this case, the session management network element may request the access network device to add the terminal device to the multicast service, to subsequently deliver the multicast service to the terminal device in the multicast mode.

Optionally, in a first implementation, before that the session management network element sends a third message to the access network device, the method further includes: The session management network element determines that the access network device has the multicast service. In other words, the access network device has established a multicast session of the multicast service, the access network device has participated in transmission of the multicast service, or the access network device has joined the multicast service.

The multicast session of the multicast service may be a multicast session used to deliver the multicast service.

It should be understood that the access network device may have the multicast service or may not have the multicast service. Therefore, the session management network element may first determine whether the access network device has the multicast service. If the access network device has the multicast service, the session management network element sends the third message to request the access network device to add the terminal device to the multicast service. If the access network device does not have the multicast service, the session management network element may first request the access network device to create a multicast session of the multicast service. After the multicast session is created, the session management network element sends the third message to request the access network device to add the terminal device to the multicast service.

Optionally, in a second implementation, the session management network element may not determine whether the access network device has the multicast service, but sends information about a multicast QoS flow of the multicast service to the access network device when requesting the access network device to add the terminal device to the multicast service. In this way, even if the access network device has no multicast service, the access network device may create a multicast session of the multicast service for the terminal device based on the information about the multicast QoS flow, and then add the terminal device to the multicast service.

In embodiments of this application, the session management network element may determine, in a plurality of manners, whether the access network device has the multicast service. This is not limited.

In an optional implementation, that the session management network element determines that the access network device has the multicast service includes: The session management network element receives a fourth message from a unified data management network element, where the fourth message indicates that the access network device has the multicast service; and the session management network element determines, based on the fourth message, that the access network device has the multicast service.

For example, the unified data management network element may autonomously (for example, periodically) send the fourth message to the session management network element, to notify the session management network element of the information about the multicast service that the access network device has.

For example, the session management network element may query the unified data management network element, and send a query message to the unified data management network element, to query whether the access network device accessed by the terminal device has the multicast service that the terminal device currently requests to join. The session management network element receives a query result (namely, the fourth message) fed back by the unified data management network element, and may determine, based on the query result, whether the access network device has the multicast service. Optionally, when the session management network element sends the query message to the unified data management network element, the unified data management network element may not feed back the query result. If the session management network element does not receive the query result within a period of time, the session management network element considers by default that the access network device does not have the multicast service (or considers by default that the access network device has the multicast service). However, this is not limited in embodiments of this application.

Optionally, in a third implementation, before that the session management network element sends a third message to the access network device, the method further includes: The session management network element determines that the access network device does not have the multicast service; the session management network element sends information about a multicast QoS flow of the multicast service to the access network device; and the session management network element receives, from the access network device, indication information indicating that a radio bearer corresponding to the multicast QoS flow is successfully created.

If the access network device does not have the multicast service that the terminal device requests to join, the session management network element may send the information about the multicast QoS flow of the multicast service to the access network device. The information about the multicast QoS flow may include a QFI of the multicast QoS flow and a QoS parameter of the multicast QoS flow. After receiving the information about the multicast QoS flow, the access network device may create the corresponding multicast service based on the information about the multicast QoS flow, to prepare for subsequently adding the terminal device to the multicast service.

In an optional embodiment, the method further includes: The session management network element sends a fifth message to the unified data management network element based on the indication information, where the fifth message indicates that the access network device already has the multicast service.

For example, when the access network device does not have the multicast service that the terminal device requests to join, and the session management network element has created the multicast service, the session management network element may notify the unified data management network element that the access network device already has the multicast service. The fifth message may carry the identifier of the multicast service and an identifier of the access network device.

With reference to the implementation of the case 2, the method may further include: The session management network element determines a unicast QoS flow corresponding to the multicast QoS flow; and the session management network element sends a first mapping relationship to the access network device, where the first mapping relationship indicates a correspondence between the QFI of the multicast QoS flow and a QFI of the unicast QoS flow.

It should be noted that when the terminal device and the access network device support multicast, the session management network element may also generate the mapping relationship between the QFI of the multicast QoS flow and the QFI of the unicast QoS flow, but does not need to modify a PDU session (that is, the unicast QoS flow does not need to be added to the PDU session). This is because there is a scenario in which the access network device accessed by the terminal device supports multicast. The multicast service is delivered through a multicast session tunnel, and a unicast service is delivered through a PDU session tunnel on which the PDU session is located. However, the terminal device has mobility. Subsequently, the terminal device may move to another access network device, and the another access network device may not support multicast. To avoid a problem that transmission of the multicast service is discontinuous when the terminal device is handed over from the access network device to the another access network device because the another access network device does not support multicast, the session management network element may store the mapping relationship between the QFI of the multicast QoS flow and the QFI of the unicast QoS flow in advance, so that when learning that the another access network device to which the terminal device is to be handed over does not support multicast, the session management network element indicates the user plane network element to map the multicast service to the PDU session tunnel on which the PDU session is located, and deliver the multicast service to the terminal device, to ensure continuity of the multicast service.

The session management network element determines the delivery mode of the multicast service based on the multicast capability information of the terminal device and/or the multicast capability information of the access network device accessed by the terminal device. Therefore, the session management network element needs to obtain the multicast capability information of the terminal device and/or the multicast capability information of the access network device. In this embodiment of this application, the session management network element may obtain the multicast capability information of the terminal device and/or the multicast capability information of the access network device in a plurality of manners. The following plurality of implementations may be included.

In a first optional embodiment, the method may further include: The access and mobility management network element sends the multicast capability information of the terminal device and/or the multicast capability information of the access network device to the session management network element. Correspondingly, the session management network element receives the multicast capability information of the terminal device and/or the multicast capability information of the access network device from the access and mobility management network element.

In a second optional embodiment, the method may further include: The access and mobility management network element determines whether the protocol data unit PDU session of the terminal device supports multicast; and when the PDU session supports multicast, the access and mobility management network element sends the multicast capability information of the terminal device and/or the multicast capability information of the access network device to the session management network element. Correspondingly, the session management network element receives the multicast capability information of the terminal device and/or the multicast capability information of the access network device from the access and mobility management network element.

Optionally, that the access and mobility management network element determines that the PDU session of the terminal device supports multicast includes: The access and mobility management network element receives reference information of the PDU session from the terminal device, where the reference information includes one or more of indication information indicating whether the PDU session supports multicast, a data network name DNN of the PDU session, and single network slice selection assistance information S-NSSAI of the PDU session; and the access and mobility management network element determines, based on the reference information, that the PDU session supports multicast.

In a third optional embodiment, the method may further include: The session management network element sends a request message to the access and mobility management network element, where the request message is used to request the multicast capability information of the terminal device and/or the multicast capability information of the access network device. Correspondingly, the access and mobility management network element receives the request message from the session management network element, and sends the multicast capability information of the terminal device and/or the multicast capability information of the access network device to the session management network element based on the request message.

In a fourth optional embodiment, the method further includes: The session management network element sends a subscription message to the access and mobility management network element, where the subscription message is used by the mobility management network element to send the multicast capability information of the terminal device and/or the multicast capability information of the access network device to the session management network element when the multicast capability of the terminal device changes and/or the multicast capability of the access network device changes. Correspondingly, the access and mobility management network element receives the subscription message from the session management network element, and sends the multicast capability information of the terminal device or the multicast capability information of the access network device to the session management network element when the capability of the terminal device changes and/or the capability of the access network device changes.

The multicast capability information of the terminal device and/or the multicast capability information of the access network device may be obtained by the session management network element through subscription. The session management network element sends the subscription message to the access and mobility management network element, where the subscription message is used by the mobility management network element to send the multicast capability information of the terminal device and/or the multicast capability information of the access network device to the session management network element when a multicast capability of the terminal device changes and/or a multicast capability of the access network device changes. For example, when the capability of the terminal device changes, the access and mobility management network element may send the multicast capability information of the terminal device to the session management network element; when the capability of the access network device changes, the access and mobility management network element may send the multicast capability information of the access network device to the session management network element; and when both the capability of the access network device and the capability of the terminal device change, the access and mobility management network element may send the multicast capability information of the access network device and the multicast capability information of the terminal device to the session management network element.

It should be understood that, when only the multicast capability information of the terminal device is referenced, the session management network element may obtain only the multicast capability information of the terminal device. When only the multicast capability information of the access network device is referenced, the session management network element may obtain only the multicast capability information of the access network device. When both the multicast capability information of the terminal device and the multicast capability information of the access network device are referenced, the session management network element may simultaneously obtain the multicast capability information of the terminal device and the multicast capability information of the access network device, or may separately obtain the multicast capability information of the terminal device and the multicast capability information of the access network device. This is not limited in embodiments of this application. For example, the multicast capability information of the terminal device may be actively sent by the access and mobility management network element to the session management network element. The session management network element requests the access and mobility management network element to send the multicast capability information of the access network device. Alternatively, for example, the multicast capability information of the access network device may be actively sent by the access and mobility management network element to the session management network element. The session management network element requests the access and mobility management network element to send the multicast capability information of the terminal device.

Figure 6:
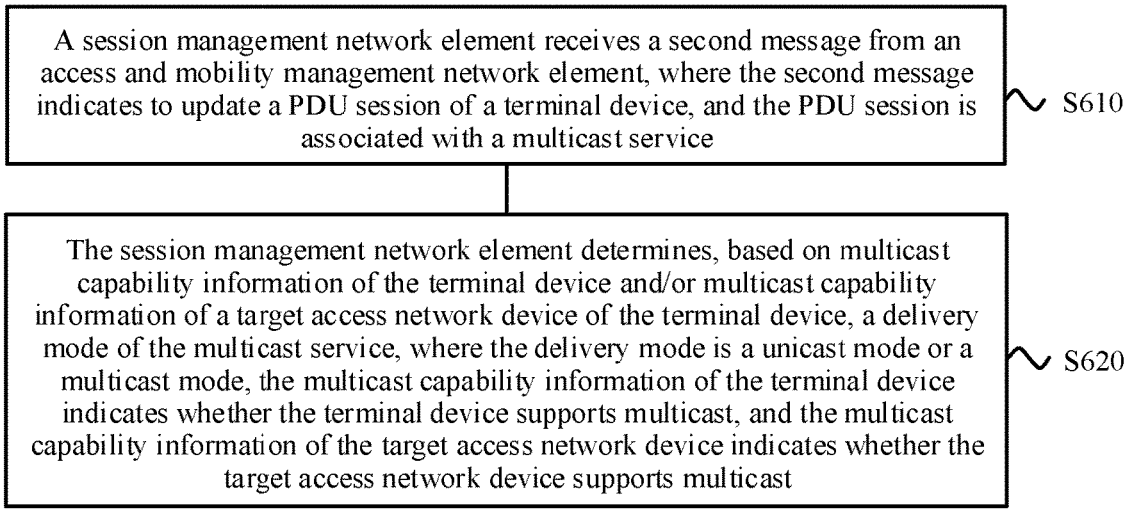
FIG. 6 is another flowchart of a multicast service transmission method according to an embodiment of this application.

FIG. 6 is a flowchart of a multicast service transmission method 600 according to an embodiment of this application. The method 600 may be applied to the system architecture 100 shown in FIG. 1, or may be applied to the system architecture 200 shown in FIG. 2. Embodiments of this application are not limited thereto.

S610. An access and mobility management network element sends a second message to a session management network element, and correspondingly, the session management network element receives the second message from the access and mobility management network element.

The second message is used to update a PDU session of a terminal device, and the PDU session is associated with a multicast service. For example, the second message may be a Nsmf_PDUSession_UpdateSMContext Request message.

S620. The session management network element determines, based on multicast capability information of the terminal device and/or multicast capability information of a target access network device of the terminal device, a delivery mode of the multicast service.

The delivery mode is a unicast mode or a multicast mode. The multicast capability information of the terminal device indicates whether the terminal device supports multicast, and the multicast capability information of the target access network device indicates whether the target access network device supports multicast.

For example, in a scenario in which the terminal device is handed over from a source access network device to the target access network device, the access and mobility management network element may send the second message to the session management network element, to update the PDU session. It should be understood that handing over the terminal device from the source access network device to the target access network device may be handing over the PDU session of the terminal device from the source access network device to the target access network device. In other words, "handing over the PDU session of the terminal device" means that when the terminal device moves from the source access network device to the target access network device, to maintain service continuity, the PDU session of the terminal device is handed over from the source access network device to the target access network device.

In this embodiment of this application, that the PDU session is associated with the multicast service may be understood as that a context of the PDU session is associated with the multicast service. At the source access network device, the terminal device may request to join the multicast service through a user plane or a control plane of the PDU session. Optionally, the terminal device may associate the PDU session with the multicast service by storing an identifier of the multicast service in the context of the PDU session. For example, if the terminal device joins through the user plane of the PDU session to watch CCTV 1, the PDU session is associated with one multicast service. If the terminal device also joins to watch CCTV 10, the PDU session is further associated with one multicast service.

In this embodiment of this application, when the terminal device is handed over from the source access network device supporting a multicast function to the target access network device, the session management network element may determine, based on the multicast capability information of the target access network device, a delivery mode of the multicast service after the handover. Regardless of whether the target access network device supports multicast, the multicast service and a unicast service of the terminal device at the source access network device may not be interrupted due to the handover. This ensures the service continuity of the terminal device, reduces a packet loss in a handover procedure, and reduces a handover delay.

It should be understood that, before the PDU session is handed over, if both the terminal device and the source access network device support multicast, the multicast service associated with the PDU session may be delivered to the terminal device through a multicast tunnel, in other words, the delivery mode of the multicast service is the multicast mode. If the terminal device does not support multicast or the source access network device does not support multicast, a multicast QoS flow of the multicast service associated with the PDU session may be mapped to a unicast QoS flow of the PDU session, and sent to the terminal device through a PDU session tunnel, in other words, the delivery mode of the multicast service is the unicast mode. After the PDU session is handed over, the session management network element may re-determine the delivery mode of the multicast service based on the multicast capability information of the terminal device and/or the multicast capability information of the target access network device. Therefore, a method for determining the delivery mode of the multicast service in this embodiment of this application is similar to the method 500, provided that the access network device in the method 500 may be replaced with the target access network device. For details, refer to the method 500. Details are not described herein again.

In an optional embodiment, the method further includes: When the PDU session is handed over from the source access network device to the target access network device, the session management network element may determine a unicast QoS flow based on the multicast QoS flow of the multicast service, add the unicast QoS flow to the PDU session, and send the unicast QoS flow through the PDU session tunnel. In other words, after the PDU session is handed over to the target access network device, the multicast service associated with the PDU session is sent in the unicast mode. For descriptions about adding, by the session management network element, the unicast QoS flow to the PDU session, refer to the descriptions about adding, by the session management network element, the unicast QoS flow to the PDU session of the terminal device in S520. For brevity, details are not described herein again in this application.

The session management network element sends a correspondence between a packet detection rule of the multicast service and an identifier of at least one unicast QoS flow to a user plane function network element. The correspondence is carried in an eighth message, and the eighth message is an N4 session modification request message or a PFCP session modification request. The correspondence may be that the eighth message includes both the packet detection rule of the multicast service and the identifier that is of the at least one unicast QoS flow and that corresponds to the packet detection rule of the multicast service, and may be used to represent the correspondence between the packet detection rule of the multicast service and the identifier of the at least one unicast QoS flow. The session management network element sends the N4 session modification request or the PFCP session modification request to the user plane network element. The N4 session modification request or the PFCP session modification request message includes both the packet detection rule of the multicast service and the identifier that is of the at least one unicast QoS flow and that corresponds to the packet detection rule of the multicast service, and may be used to represent the correspondence between the packet detection rule of the multicast service and the identifier of the at least one unicast QoS flow. The packet detection rule may be, for example, a filter of the multicast service. The filter is a 5-tuple, including a source address, a target address, a source port number, a target port number, and a protocol number, and may be used to identify data of the multicast service. For example, after receiving the second message, the session management network element may determine, based on the second message, that the to-be-handed-over PDU session is associated with the multicast service, and then determine a QoS requirement of the multicast service based on the identifier of the multicast service, to determine the multicast QoS flow of the multicast service, and then obtain the unicast QoS flow corresponding to the multicast QoS flow.

In an optional embodiment, that the session management network element adds the unicast QoS flow to the PDU session of the terminal device includes: The session management network element sends, to the user plane network element, filter information of the multicast service (for example, the packet detection rule (PDR)) and a QFI of the unicast QoS flow; the session management network element determines a QoS parameter of the unicast QoS flow based on a QoS parameter of the multicast QoS flow; and the session management network element sends the QFI of the unicast QoS flow and the QoS parameter of the unicast QoS flow to the target access network device.

In an optional embodiment, that the session management network element adds the unicast QoS flow to the PDU session of the terminal device includes: The session management network element sends, to the user plane network element, the N4 session modification request or the PFCP session modification request, to add, to the mapped unicast QoS flow, a filter used to filter the multicast/broadcast service. That is, according to this technical solution, the mapped unicast QoS flow has been previously used to deliver service data in the PDU session.

Information about the multicast service is information about a multicast service corresponding to a multicast QoS flow mapped to the unicast QoS flow. The unicast QoS flow is determined based on QoS parameters of all multicast QoS flows mapped to the unicast QoS flow.

In an optional embodiment, before that the session management network element determines the unicast QoS flow corresponding to the multicast QoS flow, the method further includes: The session management network element determines that the terminal device does not support multicast and/or the target access network device does not support multicast.

It should be understood that the session management network element may map the multicast QoS flow to the unicast QoS flow when the terminal device does not support multicast and/or the target access network device does not support multicast, or may directly map the multicast QoS flow to the unicast QoS flow without performing determining. After the terminal device accesses the target access network device, the session management network element performs determining based on the multicast capability information of the terminal device and/or the multicast capability information of the target access network device. When the target access network device supports multicast, the session management network element may restore the multicast QoS flow mapped to the unicast QoS flow to the multicast QoS flow, and deliver the multicast QoS flow through a multicast session tunnel of the target access network device. When the target access network device does not support multicast, the session management network element may still deliver, in the unicast mode, the unicast QoS flow corresponding to the multicast QoS flow to the terminal device through the PDU session tunnel of the target access network device.

It should be understood that the session management network element first maps the multicast QoS flow to the unicast QoS flow because the terminal device requests both the unicast service and the multicast service when accessing the source access network device. The unicast service is delivered through the PDU session tunnel, and the multicast service is delivered through the multicast session tunnel. Therefore, the service continuity of the terminal device can be ensured. The service continuity includes continuity of the unicast service and continuity of the multicast service. However, because the terminal device is handed over from the source access network device to the target access network device, if the multicast QoS flow in the multicast session tunnel of the source access network device is not first mapped to the unicast QoS flow in the PDU session tunnel on which the PDU session at the source access network device is located, and the target access network device does not support multicast (in other words, the multicast session tunnel cannot be established) after the handover, the multicast service of the terminal device is interrupted, and the service continuity cannot be maintained. Therefore, to ensure the service continuity of the terminal device, the multicast QoS flow may be first mapped to the unicast QoS flow at the source access network device (in other words, before the terminal device is handed over to the target access network device), to perform unicast handover. Then, after learning of the multicast capability information of the target access network device in a handover procedure, the session management network element may perform an operation depending on whether the target access network device supports multicast, to add the terminal device to the multicast service in an appropriate manner at the target access network device.

In an optional embodiment, if the session management network element directly maps the multicast QoS flow to the unicast QoS flow without performing determining before the handover, after the terminal device accesses the target access network device, the session management network element may perform determining based on the multicast capability information of the terminal device and/or the multicast capability information of the target access network device. In this case, if the session management network element determines that the delivery mode of the multicast service may be the multicast mode, the method further includes: The session management network element sends a sixth message to the user plane network element, where the sixth message indicates to delete the unicast QoS flow in the PDU session; and the session management network element sends a seventh message to the target access network device, where the seventh message indicates to release a radio bearer corresponding to the unicast QoS flow.

Correspondingly, the user plane network element receives the sixth message, and deletes the unicast QoS flow in the PDU session. The target access network device receives the seventh message, and releases the radio bearer corresponding to the unicast QoS flow.

Herein, the unicast QoS flow is the unicast QoS flow to which the multicast QoS flow is mapped.

Because the target access network device supports multicast, the multicast service may be delivered to the terminal device through the multicast session tunnel. The session management network element may restore the multicast QoS flow mapped to the unicast QoS flow to the multicast QoS flow, that is, delete the unicast QoS flow and the corresponding radio bearer.

It should be understood that in the method 600 and the method 500 in this application, only the scenarios are different, and procedures such as determining, by the session management network element, the delivery mode of the multicast service, requesting to add the terminal device to the multicast service, and obtaining the multicast capability information of the terminal device and/or the multicast capability information of the access network device are similar, provided that the access network device in the method 500 may be replaced with the target access network device. For details, refer to the method 500. Details are not described herein again.

In this embodiment of this application, the second message may carry the multicast capability information of the terminal device and/or the multicast capability information of the target access network device. However, this is not limited in embodiments of this application.

Optionally, the method further includes: The target access network device sends multicast/broadcast capability information of the target access network device to an AMF.

The target access network device may send the multicast/broadcast capability information of the target access network device to the AMF by using an N2 path switch request/path switch request.

In an implementation, after receiving a handover confirm from the terminal device, the target access network device sends the N2 path switch request/path switch request. The N2 path switch request/path switch request carries the multicast/broadcast capability information of the target access network device.

In another implementation, the target access network device may locally obtain the capability information of the target access network device, and send the multicast/broadcast capability information of the target access network device to the AMF.

In another implementation, the target access network device may obtain the capability information of the target access network device from an operation, administration, and maintenance (OAM), and send the multicast/broadcast capability information of the target access network device to the AMF.

Figure 7:
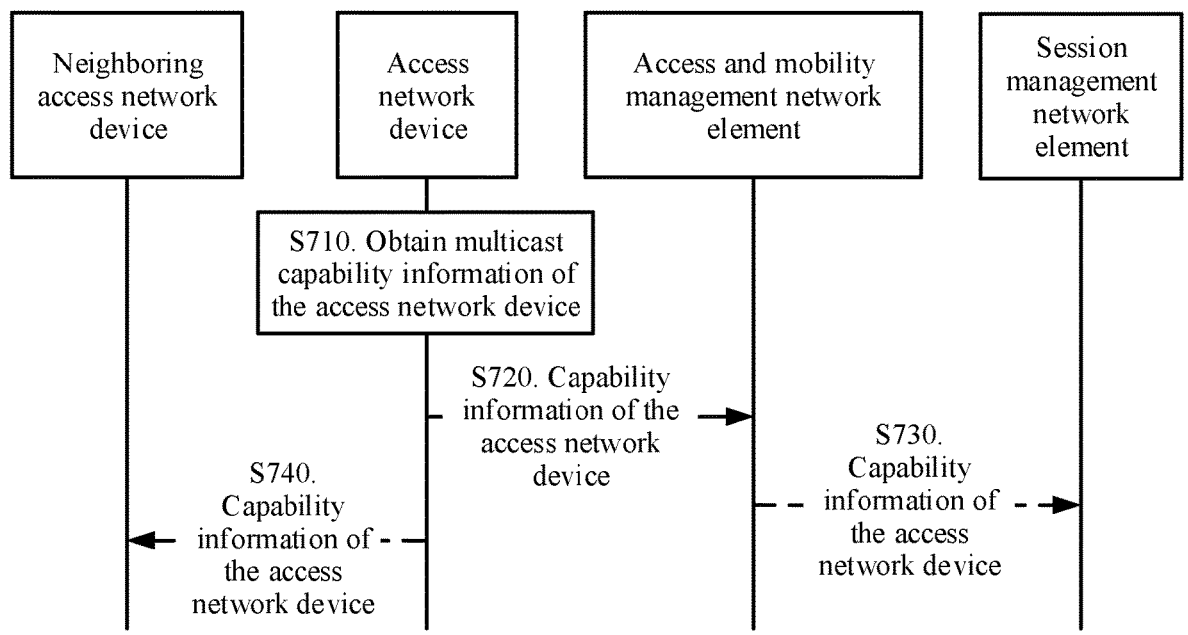
FIG. 7 is another flowchart of a multicast service transmission method according to an embodiment of this application.

FIG. 7 is a flowchart of a multicast service transmission method 700 according to an embodiment of this application. The method 700 may be applied to the system architecture 100 shown in FIG. 1, or may be applied to the system architecture 200 shown in FIG. 2. Embodiments of this application are not limited thereto.

S710. An access network device obtains multicast capability information of the access network device.

S720. The access network device sends the multicast capability information of the access network device, where the multicast capability information of the access network device indicates whether the access network device supports multicast.

In this embodiment of this application, that the access network device supports multicast means that the access network device supports establishment of a multicast session tunnel between the access network device and a UPF, and the access network device supports PTM transmission on an air interface.

In an optional embodiment, the access network device may send the multicast capability information of the access network device to an access and mobility management network element, and correspondingly, the access and mobility management network element may receive the multicast capability information of the access network device. For example, the access network device may add the multicast capability information of the access network device as an information element to a next-generation (NG) establishment request message, and report the NG establishment request message to the access and mobility management network element. The NG establishment request message herein is one piece of signaling. The signaling is used by the access network device to request, after the access network device is powered on, to establish a connection to the access and mobility management network element. The signaling may include one or more information elements. In a design, that the access network device adds the multicast capability information of the access network device as an information element to an NG establishment request message means that the access network device adds, based on an existing information element included in the current NG establishment request message, the multicast capability information of the access network device as a new information element to the NG establishment request message. However, it should be understood that the access network device may alternatively send the multicast capability information to the access and mobility management network element by using another message. This is not limited in embodiments of this application. In the foregoing manner, the access and mobility management network element may collect multicast capability information of access network devices (which may include the access network devices shown in FIG. 1 and FIG. 2 and a plurality of other access network devices). It should be understood that the NG establishment procedure is a procedure in an existing protocol, and may be used by the access and mobility management network element to collect information related to the access network device after the access network device is powered on. Therefore, the NG establishment procedure in this embodiment of this application may be improved based on an existing procedure, and is backward compatible and easily implemented.

In the foregoing method, optionally, the access and mobility management network element may send the multicast capability information of the access network device to a session management network element, so that the session management network element determines, based on the multicast capability information of the access network device, whether the access network device supports multicast.

In an optional embodiment, the access network device may send the multicast capability information of the access network device to a neighboring access network device of the access network device. For example, in a handover scenario, a terminal device may be handed over from a source access network device to a target access network device, and there is an Xn connection between the source access network device and the target access network device. Therefore, the target access network device may send multicast capability information of the target access network device to the source access network device through the Xn connection, so that the source access network device learns of whether the target access network device supports multicast. In an implementation, when the target access network device supports multicast, the target access network device may send the multicast capability information to the source access network device. When the target access network device does not support multicast, the target access network device may not send any information. If the source access network device receives no information, it is considered by default that the target access network device does not support multicast.

In an optional embodiment, the method further includes: The access network device receives a handover request message from another access network device, where the handover request message includes an identifier of a protocol data unit PDU session of the terminal device, and the PDU session is associated with a multicast service; and the access network device sends indication information to a core network device, where the indication information indicates whether the access network device has the multicast service.

The access network device may be used as a target access network device in a handover scenario. If the terminal device is handed over from a source access network device to the target access network device, the target access network device may send indication information to the core network device, to indicate whether the target access network device has a multicast service that the terminal device requests to access. In this embodiment, the core network device may determine, by using the target access network device, whether the multicast service exists, and does not need to query a unified data management network element.

In an optional example, the method further includes: The terminal device obtains multicast capability information of the terminal device; and the terminal device sends the multicast capability information of the terminal device, where the multicast capability information of the terminal device indicates whether the terminal device supports multicast.

In this embodiment of this application, that the terminal device supports multicast means that the terminal device supports receiving of the multicast service by using a multicast session, or the terminal device supports receiving of the multicast service in an air interface multicast mode.

In an optional example, the terminal device may send the multicast capability information of the terminal device. Correspondingly, the access and mobility management network element may receive a non-access stratum (NAS) message sent by the terminal device.

Optionally, the multicast capability information of the terminal device may be carried in a PDU session establishment/modification request message, and the PDU session establishment/modification request message is sent by the terminal device to the access and mobility management network element.

For example, the terminal device may include the multicast capability information of the terminal device as an information element in an information element 5GSM core network capability of the PDU session establishment/modification request (for example, PDU Session Establishment Request) message, and report the multicast capability information of the terminal device to the access and mobility management network element. It should be understood that the PDU session establishment/modification request message herein is one piece of NAS signaling. When the terminal device requests to establish/modify a PDU session, the signaling is sent by the terminal device to the session management network element through the access and mobility management network element. The signaling may include one or more information elements. The 5GSM core network capability is one of the information elements, and the information element further includes some sub-information elements. In a design, that the terminal device includes the multicast capability information of the terminal device as an information element in an information element 5GSM core network capability of the PDU session establishment request message means that the terminal device adds, based on an existing information element included in the current 5GSM core network capability, the multicast capability information of the terminal device as a new sub-information element to the information element. However, it should be understood that the terminal device may alternatively send the multicast capability information of the terminal device to the access and mobility management network element by using another message. This is not limited in embodiments of this application.

Optionally, after the access and mobility management network element receives the PDU session establishment/modification request message from the terminal device, the access and mobility management network element may report the multicast capability information of the terminal device to the session management network element. In an implementation, the access and mobility management network element may send the capability information of the terminal device by using a create context request message (for example, an Nsmf_PDUSession_CreateSMContext Request). The create context request message is sent by the access and mobility management network element to the session management network element after the access and mobility management network element receives the PDU session establishment/modification request message. It should be understood that the create context request message is one piece of signaling, and the signaling may include one or more information elements. The 5GSM core network capability is one of the information elements, and the information element further includes some sub-information elements. The multicast capability information of the terminal device may be further included in the 5GSM core network capability. However, it should be understood that the access and mobility management network element may alternatively send the multicast capability information of the terminal device to the session management network element by using another message. This is not limited in embodiments of this application.

For ease of understanding, the following describes embodiments of this application in detail with reference to FIG. 8A to FIG. 15 by using the network elements in FIG. 2 as an example.

Figure 8A:
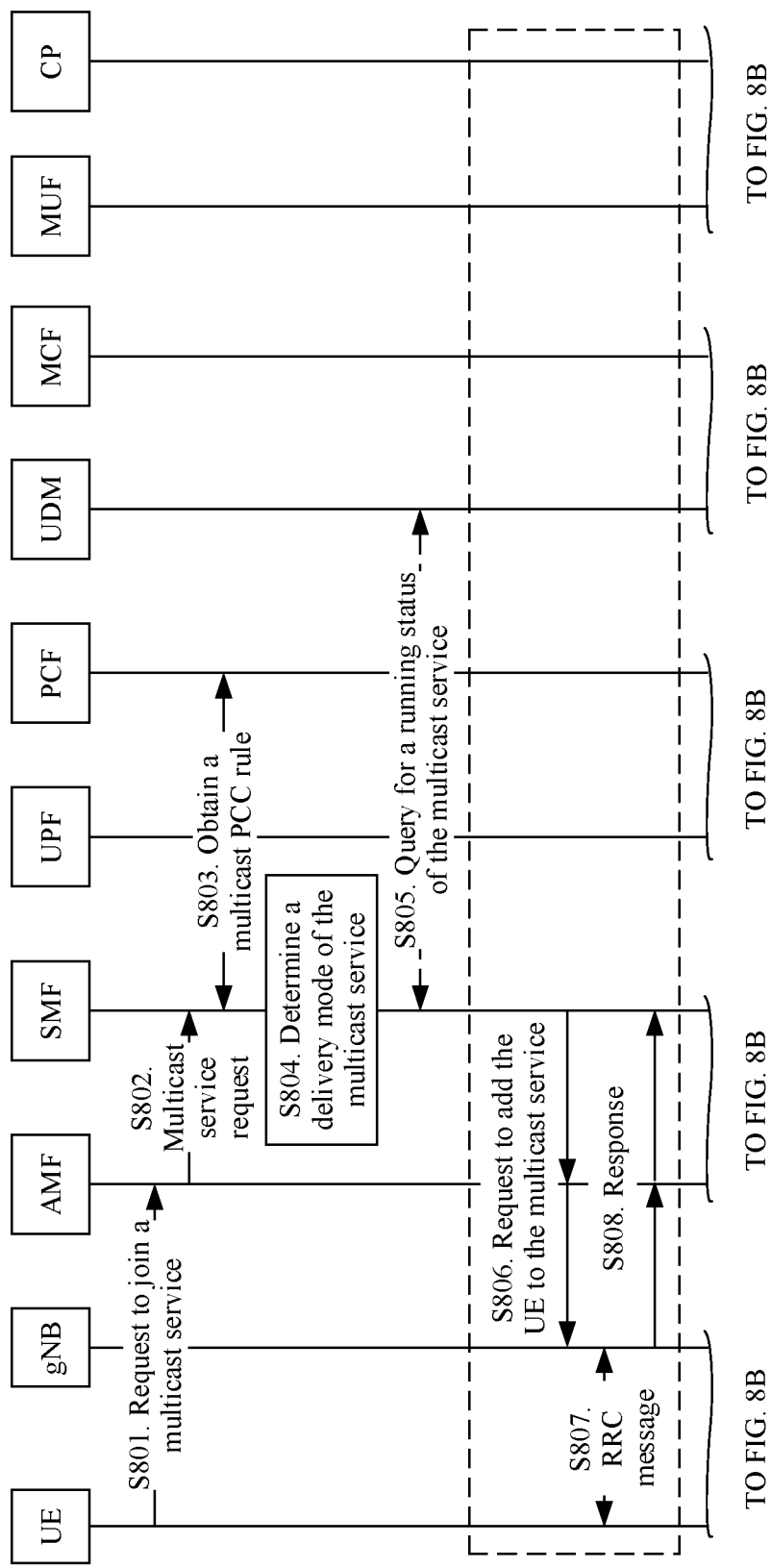
FIG. 8A and FIG. 8B are another flowchart of a multicast service transmission method according to an embodiment of this application.
Figure 8B:
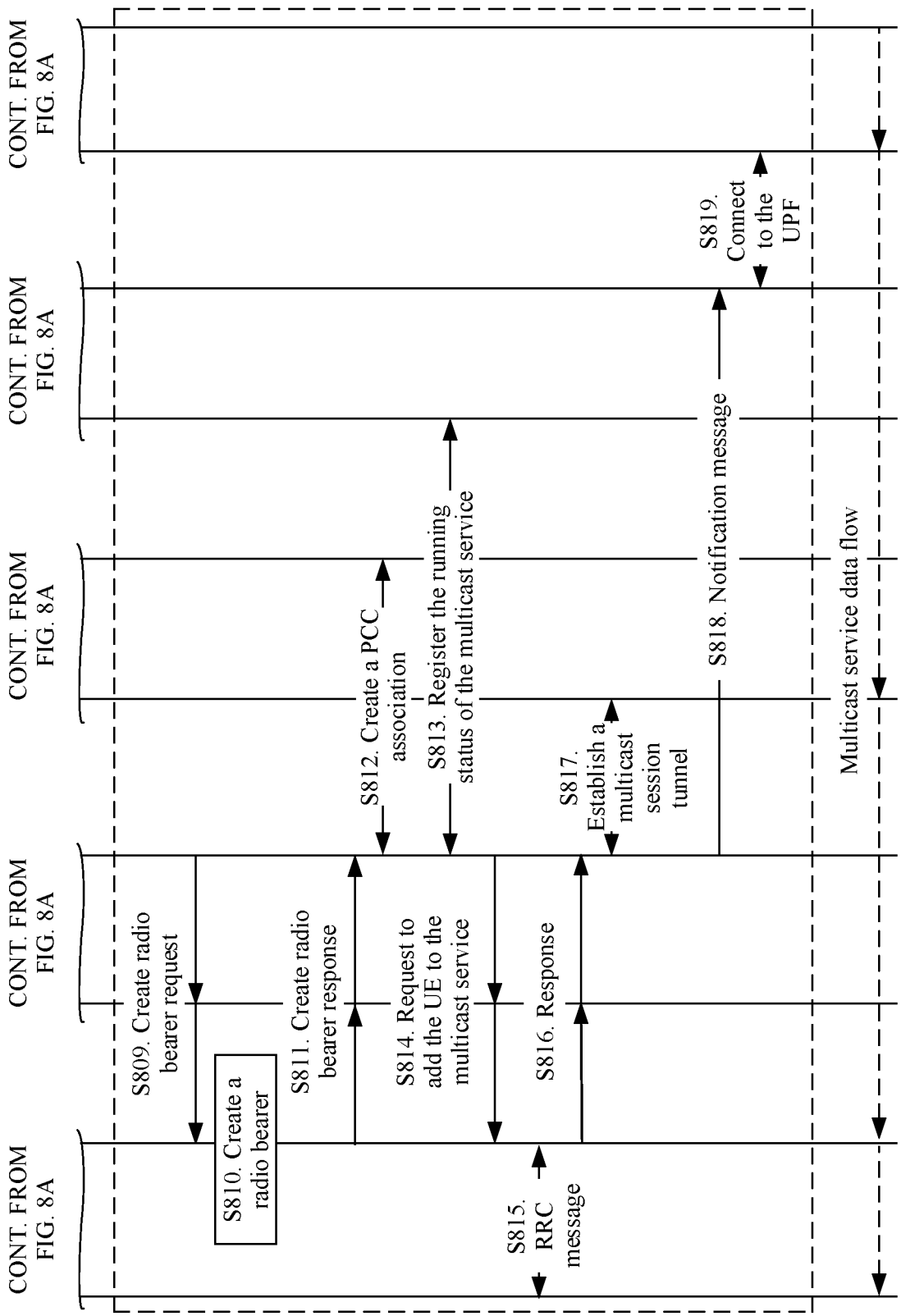
Figure 9A:
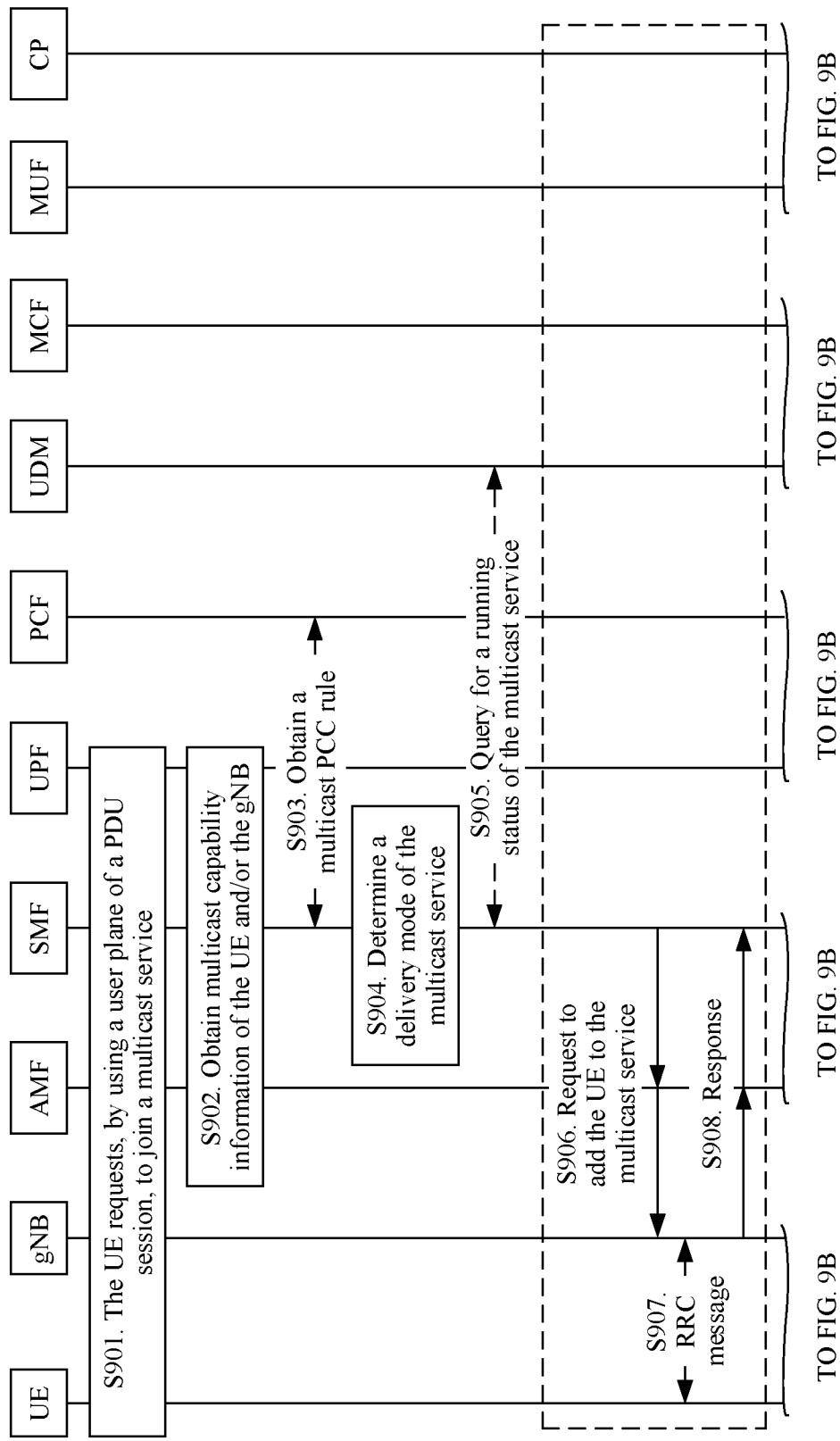
FIG. 9A and FIG. 9B are another flowchart of a multicast service transmission method according to an embodiment of this application.
Figure 9B:
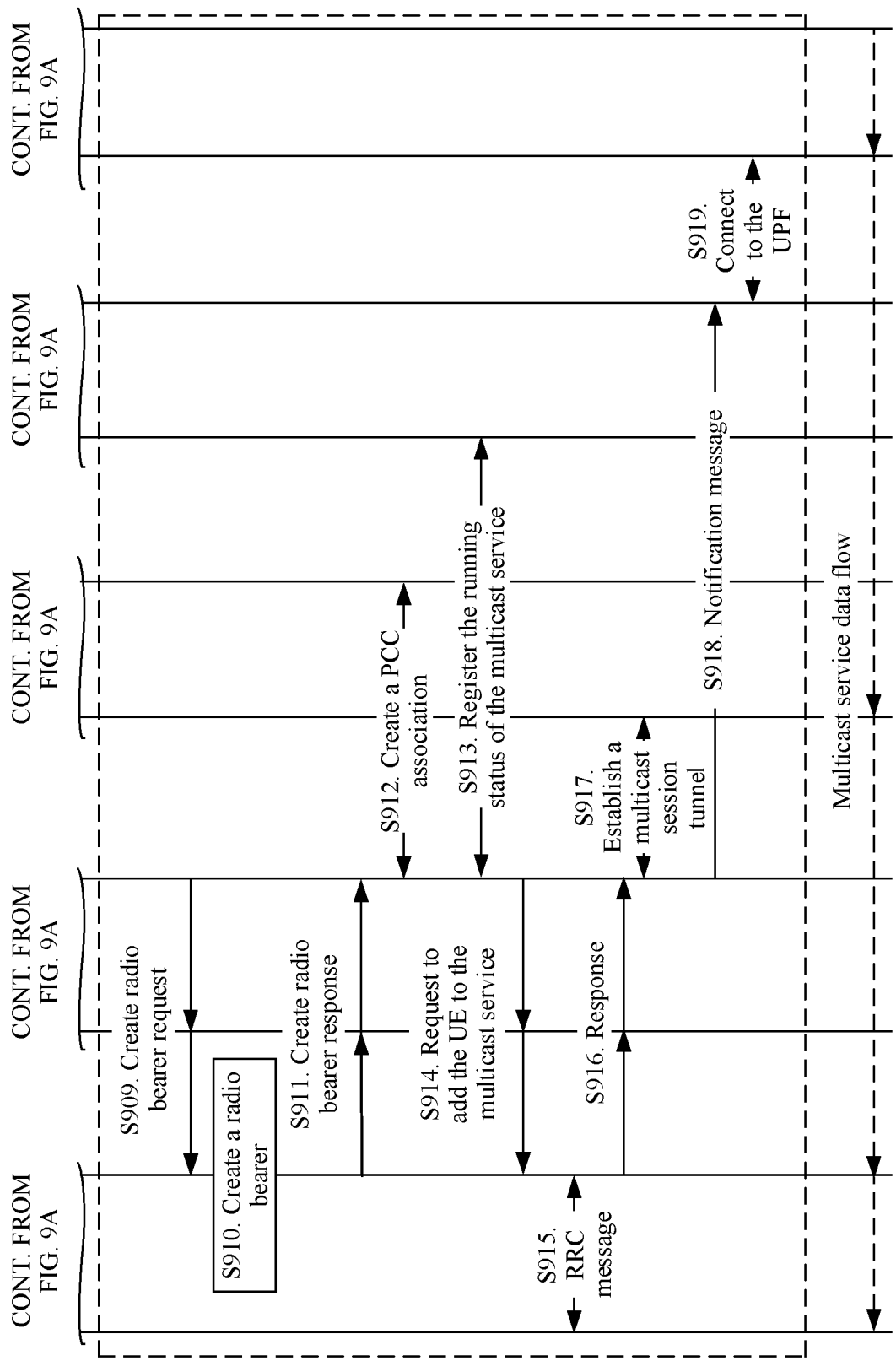

FIG. 8A and FIG. 8B are another flowchart of a multicast service transmission method 800 according to an embodiment of this application. The method 800 may be applied to the system architecture 200 shown in FIG. 2.

In this embodiment, it is assumed that an MCF already obtains information about a multicast service from a CP.

S801. UE sends, to an AMF, a message for requesting to join the multicast service. Correspondingly, the AMF receives the message.

For example, the UE may send, to the AMF by using a non-access stratum (NAS) message, the request for joining the multicast service. In an implementation, if the UE has obtained an MCID of the multicast service (for example, the CP may deliver the information about the multicast service through an application layer, where the information includes the MCID of the multicast service), the UE may send the MCID of the multicast service to identify the multicast service. In another implementation, the UE may send information about a multicast address and an optional source address of the multicast service to identify the multicast service (for example, the CP may deliver the information about the multicast service through the application layer, where the information includes the multicast address and the optional source address of the multicast service).

Optionally, the message sent by the UE for requesting to join the multicast service includes an indication indicating that the UE supports a multicast capability.

S802. After receiving the message sent by the UE for requesting to join the multicast service, the AMF sends, to an SMF, multicast capability information of the UE and multicast capability information of a gNB accessed by the UE.

The AMF further sends, to the SMF, the message that is of the UE and that is for requesting to join the multicast service.

Optionally, before the AMF sends the multicast capability information of the gNB to the SMF, the AMF obtains the multicast capability information of the gNB accessed by the UE. Optionally, the multicast capability information of the gNB is reported by the gNB to the AMF when the gNB is powered on. For details, refer to the method 700.

S803. The SMF obtains a PCC rule related to the multicast service.

If the SMF already has the information about the multicast service locally, the SMF may not need to send the request message to a PCF. If the SMF does not have the information about the multicast service locally, the SMF may send the request message to the PCF, and obtain the PCC rule of the multicast service through the PCF.

In addition, in an implementation, if the message sent by the UE for requesting to join the multicast service carries the MCID of the multicast service, the SMF may send the MCID to the PCF, so that the PCF obtains, based on the MCID, the PCC rule corresponding to the multicast service. In another implementation, if the message sent by the UE for requesting to join the multicast service carries the information about the multicast address and the optional source address, the SMF may send the information about the multicast address and the optional source address to the PCF, so that the PCF obtains, based on the information about the multicast address and the optional source address, the PCC rule corresponding to the multicast service.

The PCF may send a feedback message to the SMF, where the feedback message may include the PCC rule of the multicast service. In this embodiment of this application, the PCC rule of the multicast service may include at least one of the following: the MCID, description information of one or more multicast service flows, and QoS information of each multicast service flow (used to generate a multicast QoS flow). The description information of the multicast service flow may include at least one of the following: a source address and a target address of the multicast service flow, a 5QI of the multicast service flow (representing a group of QoS parameters, including bandwidth, delay variation, and the like), and a QoS parameter of the multicast service.

S804. The SMF may determine a delivery mode of the multicast service. The SMF may determine, based on the multicast capability information of the UE and/or the multicast capability information of the gNB, to deliver the multicast service in a multicast mode or deliver the multicast service in a unicast mode.

The SMF determines whether both the UE and the gNB support multicast. The following separately provides descriptions based on two cases: The UE and/or the gNB do/does not support multicast, and both the UE and the gNB support multicast.

Case 1: If the UE does not support multicast, and/or the gNB does not support multicast, S805 to S819 are not performed.

If the multicast capability information of the UE indicates that the UE does not support multicast, and/or the multicast capability information of the gNB indicates that the gNB does not support multicast, the SMF determines that the delivery mode of the multicast service is the unicast mode. The SMF determines to deliver the multicast service to the UE through a tunnel of a PDU session. In this case, the SMF maps the multicast service flow of the multicast service to a unicast QoS flow in the PDU session, to deliver the multicast service to the UE by using the unicast QoS flow.

The SMF may determine the one or more multicast service flows (including the QoS information and a QFI of the multicast service flow) of the multicast service according to the PCC rule. Then, the SMF allocates, in a range of the PDU session of the UE, a QFI of a corresponding unicast QoS flow to the multicast QoS flow corresponding to the multicast service flow, where the QFI that is of the unicast QoS flow and that is allocated by the SMF to the multicast QoS flow is a QFI that is not used by another unicast QoS flow in the current PDU session, and the allocation is also referred to as "mapping the multicast QoS flow to the unicast QoS flow in the PDU session" in this embodiment of this application. The QFI is a quality of service index, and is used to describe a group of quality of service. It should be noted that, as described above, the QFI that is of the unicast QoS flow and that is allocated by the SMF to the multicast QoS flow is different from a QFI of another unicast QoS flow of the PDU session (in other words, the allocated QFI is unique in the PDU session of the UE), so that the SMF can distinguish between the unicast QoS flow of the corresponding multicast service and a common unicast QoS flow.

After the SMF allocates the QFI of the unicast QoS flow corresponding to the multicast QoS flow to the multicast QoS flow, the SMF needs to modify the PDU session of the UE, so that the multicast QoS flow can be delivered to the UE by using the PDU session. For example, the SMF may send the information about the multicast service and the QFI of the unicast QoS flow to a UPF, so that the UPF modifies a parameter, to map the multicast QoS flow to the PDU session tunnel of the PDU session for transmission in a unicast QoS flow manner. The multicast service information may include a packet detection rule (PDR). It should be understood that the PDR is a set of filters. Each filter is a 5-tuple, including the source address, a target address, a source port number, a target port number, and a protocol number of the service, and is used to filter application data. The SMF may determine, based on the QoS parameter of the multicast QoS flow, a QoS parameter of the unicast QoS flow corresponding to the multicast QoS flow, and then send the QFI of the unicast QoS flow and the QoS parameter of the unicast QoS flow to the gNB, so that the gNB prepares a radio bearer (data radio bearer, DRB) based on the QoS parameter.

Case 2: Both the UE and the gNB support multicast, and S805 to S819 are performed.

If the multicast capability information of the UE indicates that the UE supports multicast, and the multicast capability information of the gNB indicates that the gNB supports multicast, the SMF determines that the delivery mode of the multicast service is the multicast mode. In this case, a multicast session tunnel may be established between the gNB and the UPF, and the gNB delivers a multicast service to the UE in a PTM manner.

Optionally, when the gNB supports multicast, the SMF may generate a mapping relationship between a QFI of the multicast QoS flow and the QFI of the unicast QoS flow in the PDU session of the UE in the manner in the case 1, and send the mapping relationship to the gNB, so that the gNB stores the mapping relationship. Optionally, the SMF may further store the mapping relationship.

This is because in a current scenario, the gNB accessed by the UE supports multicast. The multicast service is delivered through the multicast session tunnel, and a unicast service is delivered through the PDU session tunnel on which the PDU session is located. However, the UE has mobility, the UE may subsequently move to another gNB, and the another gNB may not support multicast. To avoid a problem that transmission of the multicast service is discontinuous when the UE is handed over from the gNB to another gNB because the another gNB does not support multicast, the SMF may store the mapping relationship between the QFI of the multicast QoS flow and the QFI of the unicast QoS flow in advance, so that when learning that the another gNB to which the UE is to be handed over does not support multicast, the SMF indicates the UPF (where the PDR and the mapping relationship are sent to the UPF) to map the multicast service to the PDU session tunnel on which the PDU session is located and deliver the multicast service to the UE, to ensure the continuity of multicast service. It should be understood that the PDR is sent for filtering, to sift out application service flows that arrive at the UPF and that belong to the multicast service. Further, for the multicast service flows, mapped QFIs are added differentially (for example, audio, an images, and a text in the multicast service may have different QFIs), so as to form different unicast QoS flows (that is, all the unicast QFIs are mapped from multicast QFIs).

S805. The SMF sends a query message to a UDM, to query whether the gNB has the multicast service that the UE currently requests to join. After the query, the UDM returns a query result to the SMF.

The query message may include an identifier of the gNB and an identifier of the multicast service. The UDM determines, based on the query message provided by the SMF, whether the gNB has the multicast service, and feeds back the query result to the SMF. The SMF may learn, based on the query result, whether the gNB has the multicast service. The identifier of the multicast service may also be referred to as identification information of the multicast service, for example but not limited to, may be any one of the following, or may be one or a combination of the following: an identifier of the multicast/broadcast service, a name of the multicast/broadcast service, a multicast/broadcast address of the multicast/broadcast service, a multicast/broadcast IP address of the multicast/broadcast service, a temporary mobile group identity (TMGI) corresponding to the multicast/broadcast service, and a multicast/broadcast service session address of the multicast/broadcast service.

It may be understood that the service identifier of the multicast service may alternatively be carried in another message, for example, in N1N2 information transfer (Namf_Communication_N1N2Message Transfer). The N1N2 information transfer shown in S806 and/or S814 in FIG. 8A and FIG. 8B and N1N2 information transfer shown in S906 and/or S914 in FIG. 9A and FIG. 9B are transferred to the AMF, and then the AMF sends the service identifier of the multicast service to an access network device by using another message. The another message may alternatively be an N2 message. For example, the N2 message may be an N2 PDU session request, a PDU session resource setup request, or a PDU session resource modify request.

In an implementation, if the multicast service already exists, S806 to S808 are performed. The SMF only needs to send, to the gNB, a request for adding the UE to the multicast service. The following steps are performed.

S806. The SMF sends a request message to the gNB to request to add the UE to the multicast service. The gNB receives the request message, and adds the UE to the multicast service based on the request message. The request message is forwarded by the AMF.

The request message sent by the SMF may carry the identifier of the multicast service, and the request message may be sent by using signaling related to the PDU session. The gNB receives the request message, and stores the identifier of the multicast service in a context of the PDU session. In other words, the PDU session is associated with the multicast service, or the PDU session includes the multicast service.

Optionally, the request message may further carry the mapping relationship between the QFI of the multicast QoS flow and the QFI of the unicast QoS flow. In an implementation, the gNB may store the mapping relationship in the context of the PDU session of the UE.

Optionally, because the request message is forwarded by the AMF, the AMF may store information included in the request message, the mapping relationship between the QFI of the multicast QoS flow and the QFI of the unicast QoS flow, and whether the PDU session of the handed over UE is associated with the multicast service.

Optionally, the request message may further include a NAS message sent by the gNB to the UE. The NAS message carries the mapping relationship between the QFI of the multicast QoS flow and the QFI of the unicast QoS flow and an identifier of the PDU session associated with the multicast service.

S807. The gNB sends an RRC message to the UE, where the RRC message may include radio configuration information required for the UE to access a base station. Correspondingly, the UE receives the RRC message, and performs radio configuration based on the RRC message delivered by the gNB, so that the UE can subsequently receive the multicast service.

S808. The gNB sends a response message to the SMF. Correspondingly, the SMF may receive the response message.

For example, the response message may be an N2 response message, and the N2 response message is sent to the SMF through the AMF. In the N2 response message, the gNB indicates, to the SMF, whether the UE is successfully added to the multicast service. If the UE is not successfully added to the multicast service, the gNB may send a cause value to the SMF.

It should be understood that if the gNB successfully adds the UE to the multicast service, S817 to S819 continue to be performed; otherwise, this procedure ends.

In another implementation, if the multicast service does not exist, S809 to S816 are performed, the multicast service is first created and run, and then the UE is added to the multicast service. The following steps are performed:

S809. The SMF sends a create radio bearer request to the gNB, to request the gNB to allocate a radio resource to the multicast service (that is, request the gNB to create the radio bearer for the multicast service). Correspondingly, the gNB receives the create radio bearer request.

For example, the create radio bearer request may be an N2 request message, and the N2 request message includes the QFI of the multicast service flow and the QoS parameter of the multicast service flow of the multicast service. The N2 request message may be sent to the gNB through the AMF. Optionally, because the N2 request message is forwarded by the AMF, the AMF may store content carried in the N2 request message, for example, the identifier of the multicast service.

S810. The gNB creates the radio bearer related to the multicast service.

After receiving the create radio bearer request message, the gNB may create a context of the multicast service, store the QoS information and the QFI of the multicast service flow related to the multicast service, and prepare the radio bearer for the multicast service. In addition, the gNB may further allocate a downlink tunnel address to the multicast service. The downlink tunnel address is used by the gNB to connect to the UPF to receive downlink multicast data of the multicast service.

S811. The gNB sends a create radio bearer response to the SMF. Correspondingly, the SMF receives the create radio bearer response.

For example, the create radio bearer response may be an N2 response message. Optionally, the response message may include the downlink tunnel address allocated by the gNB to the multicast service.

It should be understood that if the radio bearer of the multicast service fails to be created, the gNB may add a cause of the creation failure to the create radio bearer response, for example, radio resources of the gNB are insufficient.

S812. The SMF creates a PCC association with the PCF, where the PCC association is used to update the PCC rule for the multicast service.

S813. The SMF sends a registration message to the UDM, to register running status information of the multicast service. The SMF notifies the UDM that the multicast service has run or is ready to run immediately in the gNB. Correspondingly, the UDM receives the registration message, and updates a running status of the multicast service.

For example, the registration message may include the identifier of the gNB, the identifier of the multicast service, and a running status identifier allocated by the SMF to the multicast service. Optionally, the registration message may further include an identifier of the SMF.

S814. The SMF sends a request message to the gNB to request to add the UE to the multicast service. The gNB receives the request message, and adds the UE to the multicast service based on the request message. The request message is forwarded by the AMF.

S814 is the same as S806. Details are not described herein again. It should be understood that S814 and S809 may be simultaneously performed. When requesting the gNB to add the UE to the multicast service, the SMF requests the gNB to create the radio bearer for the multicast service. Alternatively, S809 is performed first, and then S814 is performed. This is not limited in embodiments of this application.

S815. The gNB sends an RRC message to the UE, where the RRC message may include radio configuration information required for the UE to access the base station. Correspondingly, the UE receives the RRC message, and performs radio configuration based on the RRC message delivered by the gNB, so that the UE can subsequently receive the multicast service. S815 is the same as S807.

S816. The gNB sends a response message to the SMF. Correspondingly, the SMF receives the response message.

For example, the response message may be an N2 response message, and the N2 response message is sent to the SMF through the AMF. In the N2 response message, the gNB indicates, to the SMF, whether the UE is successfully added to the multicast service. If the UE is not successfully added to the multicast service, the gNB may send a cause value to the SMF.

S817. The SMF sends a tunnel establishment request to the UPF, to request the UPF to establish a multicast session tunnel. Correspondingly, the UPF receives the tunnel establishment request, and establishes the multicast session tunnel.

For example, in S810, the gNB allocates the downlink tunnel address of the gNB to the multicast service, and the SMF sends the downlink tunnel address to the UPF, to establish the multicast session tunnel between the UPF and the gNB. The multicast session tunnel is used to deliver data of the multicast service.

Optionally, if the UPF receives the data of the multicast service from an MUF, and a tunnel between the UPF and the MUF has not been established, the UPF allocates a downlink tunnel address used to connect to the MUF, to establish the tunnel between the UPF and the MUF. It should be understood that the tunnel between the UPF and the MUF is a data plane tunnel.

S818. The SMF sends a notification message to the MCF, where the notification message carries the downlink tunnel address of the UPF, to establish the tunnel between the MUF and the UPF. Correspondingly, the MCF receives the notification message.

To identify the multicast service, the notification message may further carry the identification information of the multicast service. For example, the identification information of the multicast service may be the MCID allocated by the MCF, or the identification information of the multicast service may include the multicast address, the target port number, the source address, and the like of the multicast service. The MCF may store the identification information, and may use the identification information to identify the multicast service when updating the multicast service subsequently. Optionally, the notification message may further carry the identifier of the gNB, and the MCF may store the identifier of the gNB.

S819. After receiving the notification message, the MCF may request the MUF to establish the tunnel between the MUF and the UPF. The MCF sends the downlink tunnel address of the UPF to the MUF. The downlink tunnel address is used by the MUF to connect to the UPF, so that the MUF delivers downlink data of the multicast service to the UPF through the tunnel.

It should be understood that the tunnel between the MUF and the UPF may be a unicast tunnel (that is, an IP address of the UPF is a unicast address) or a multicast tunnel (that is, the IP address of the UPF is a groupcast IP address). This is not limited in embodiments of this application. The foregoing "multicast session tunnel" is a tunnel between the gNB and the nearest-hop UPF of the gNB. The tunnel may be a unicast tunnel (that is, the IP address of the UPF is the unicast address) or a groupcast tunnel (that is, the IP address of the UPF is the groupcast IP address). However, regardless of whether the multicast session tunnel is the unicast tunnel or the groupcast tunnel, after receiving data in the multicast session tunnel, the gNB may deliver the data to the UE in the PTM manner or a PTP manner. For the PDU session tunnel, after receiving data in the PDU session tunnel, the gNB may deliver the data to the UE only in the PTP manner.

According to the multicast service transmission method in this embodiment of this application, when the UE requests to join the multicast service for the first time, it can be ensured that a core network device determines the delivery mode of the multicast service based on the multicast capability information of the UE and/or the multicast capability information of the gNB accessed by the UE, so that the multicast service is delivered to the UE more effectively, a delay in requesting, by the UE, to join the multicast service is reduced, and reliability of the multicast service transmission is improved.

FIG. 9A and FIG. 9B are another flowchart of a multicast service transmission method 900 according to an embodiment of this application. The method 900 may be applied to the system architecture 200 shown in FIG. 2.

S901. UE requests to join a multicast service by using an internet group management protocol (IGMP) join request. In this case, the IGMP join message is sent to an SMF through a UPF, to request to join the multicast service.

For example, the IGMP join message may carry a multicast address and an optional source address of the multicast service that the UE requests to join, to identify the multicast service. The IGMP join message may be sent by using a user plane of an established PDU session. The UE sends the IGMP join message to a gNB, the gNB sends the IGMP join message to the UPF, the UPF sends the IGMP join message to the SMF, and the SMF receives the IGMP join message and learns that the UE requests to join the multicast service.

S902. The SMF obtains multicast capability information of UE and/or multicast capability information of a gNB.

A sequence of S902 and S901 is not limited in this embodiment of this application, and the step may be implemented in the following plurality of manners.

When the PDU session is established, the UE may send the multicast capability information of the UE to the SMF. For example, the UE adds the multicast capability information of the UE to a PDU session establishment request NAS message. Alternatively, the UE may send new multicast capability information of the UE to the SMF by using a PDU session modification request (a NAS message).

In an implementation, when the PDU session is established, an AMF may directly send the multicast capability information of the UE and/or multicast capability information of a base station (which may include the gNB accessed by the UE in this embodiment) to the SMF without performing any determining; or the AMF may selectively send the multicast capability information of the UE and/or the multicast capability information of the base station to the SMF. For example, when the PDU session is established, the AMF may determine, based on at least one of a DNN (for example, the multicast service can be accessed through the DNN), S-NSSAI (for example, an EMBB slice may support access to the multicast service), and multicast service indication information (for example, an identifier of the multicast service supported by the PDU session), whether to send the multicast capability information of the UE and/or the multicast capability information of the gNB to the SMF. If the established PDU session supports multicast, the AMF may send the multicast capability information of the UE and/or the multicast capability information of the base station to the SMF. Otherwise, the AMF does not send the multicast capability information of the UE and/or the multicast capability information of the base station.

In another implementation, the SMF may subscribe to the multicast capability information of the UE and/or the multicast capability information of the base station from the AMF. The SMF may subscribe to the multicast capability information of the UE and/or the multicast capability information of the base station from the AMF in advance based on an attribute of the PDU session (that is, whether the PDU session supports multicast). Therefore, the SMF may receive the multicast capability information of the UE and/or the multicast capability information of the base station that are/is sent by the AMF. For example, if the PDU session supports multicast, the SMF sends a subscription message to the AMF.

In still another implementation, the SMF may query the AMF for a capability of the UE and/or a capability of the base station. When receiving the request for joining the multicast service from the UE, the SMF may query the AMF for the multicast capability information of the UE and/or multicast capability information of the base station accessed by the UE. In this embodiment of this application, after S901, the SMF may perform a query step, and query the AMF about whether the UE supports multicast and/or whether the gNB supports multicast.

Optionally, before the AMF sends the multicast capability information of the UE and/or the multicast capability information of the gNB to the SMF, the AMF may obtain the multicast capability information of the UE and/or the multicast capability information of the gNB accessed by the UE. Optionally, the multicast capability information of the gNB may be reported by the gNB to the AMF when the gNB is powered on, and the multicast capability information of the UE may be reported to the AMF when the UE sends the PDU session establishment/modification request to the AMF.

Subsequent steps S903 to S919 are similar to S803 to S819. Details are not described herein again.

According to the multicast service transmission method in this embodiment of this application, when the UE requests to join the multicast service for the first time, it can be ensured that the SMF determines a delivery mode of the multicast service based on the multicast capability information of the UE and/or the multicast capability information of the gNB accessed by the UE, so that the multicast service is delivered to the UE more effectively, a delay in requesting, by the UE, to join the multicast service is reduced, and reliability of the multicast service transmission is improved.

It should be understood that a difference between the method 800 and the method 900 lies in that, in the method 800, the UE requests, by using the NAS message, to join the multicast service, that is, the SMF receives, from the AMF, the message for requesting to join the multicast service. However, in the method 900, the UE requests to join the multicast service by using the IGMP join message of the user plane of the PDU session, that is, the SMF receives, from the UPF, the message for requesting to join the multicast service.

Figure 10:
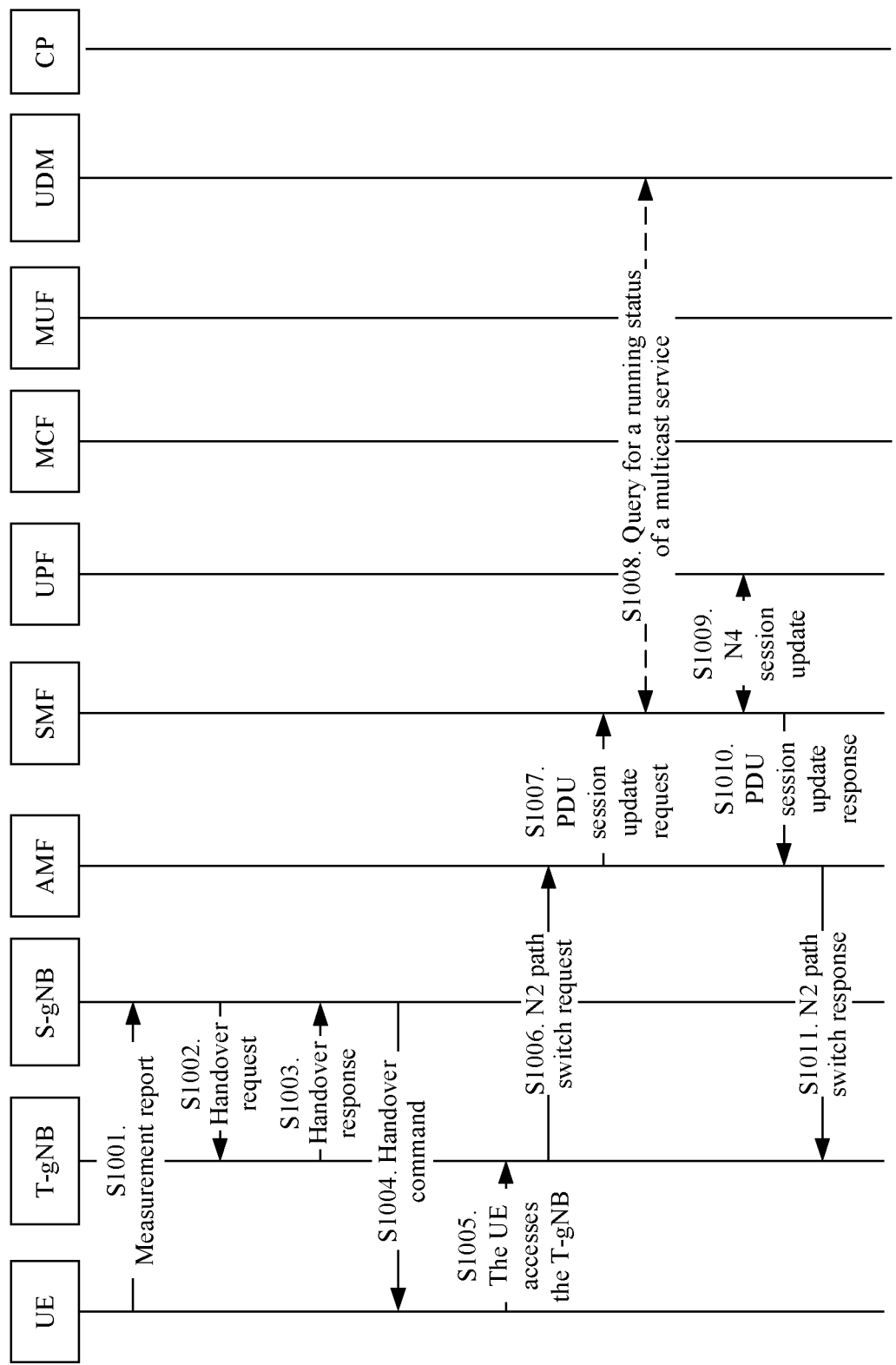
FIG. 10 is another flowchart of a multicast service transmission method according to an embodiment of this application.

FIG. 10 is another flowchart of a multicast service transmission method 1000 according to an embodiment of this application. The method 1000 may be applied to the system architecture 200 shown in FIG. 2. It should be understood that in this embodiment, a case in which UE support multicast is considered by default, and only a capability of a T-gNB is used for discussion. However, in another implementation, an SMF may alternatively perform comprehensive determining based on multicast capability information of the UE and/or multicast capability information of the T-gNB. For a specific method, refer to the foregoing embodiment. Details are not described herein again.

In the method 1000, the UE is handed over from a source access network device (referred to as an S-gNB in this embodiment) to a target access network device (the T-gNB).

Optionally, the S-gNB may learn of the multicast capability information of the T-gNB. When there is an Xn connection between the S-gNB and the T-gNB, the T-gNB may send the multicast capability information of the T-gNB to the S-gNB through an Xn interface. For example, when the T-gNB supports multicast, the T-gNB may send the multicast capability information to the S-gNB. When the T-gNB does not support multicast, the T-gNB does not send the multicast capability information. Therefore, if the S-gNB does not receive the multicast capability information sent by the T-gNB, it may be considered by default that the T-gNB does not support multicast.

S1001. The UE sends a measurement report to the S-gNB, where the measurement report indicates a result of measuring a signal of a neighboring cell by the UE. Correspondingly, the S-gNB receives the measurement report, and determines, based on the measurement report, to hand over the UE to the T-gNB.

S1002. The S-gNB sends a handover request to the T-gNB, to request to hand over the UE to the T-gNB. Correspondingly, the T-gNB receives the handover request.

The handover request may include information about a PDU session of the to-be-handed-over UE and information about a multicast service associated with the PDU session. The information about the PDU session may include an identifier of the PDU session and QoS information of a unicast QoS flow of a unicast service associated with the PDU session. The QoS information of the unicast QoS flow may include a QFI and a QoS parameter of the unicast QoS flow. In this embodiment of this application, if the PDU session of the current to-be-handed-over UE is associated with the multicast service, the S-gNB may map a multicast QoS flow to a unicast QoS flow based on a mapping relationship between a QFI of the multicast QoS flow and a QFI of the unicast QoS flow. In this case, in addition to the unicast QoS flow of the existing unicast service, a unicast QoS flow associated with the PDU session further includes the unicast QoS flow to which the multicast QoS flow is mapped.

It should be understood that the S-gNB may obtain the mapping relationship between the multicast QoS flow and the unicast QoS flow in the following manner: When adding the UE to a multicast service, the S-gNB may obtain a mapping relationship between a multicast QoS flow and a unicast QoS flow of the multicast service from the SMF. The mapping relationship may include a QFI of a multicast QoS flow and a QFI of a unicast QoS flow corresponding to the multicast QoS flow. The QFI of the unicast QoS flow corresponding to the multicast QoS flow is different from a QFI of another unicast QoS flow in the PDU session of the UE. In addition, if the UE joins a plurality of multicast services, QFIs of unicast QoS flows corresponding to multicast QoS flows of different multicast services are different, to distinguish between a unicast QoS flow to which a multicast QoS flow of a current multicast service is mapped and a unicast QoS flow to which a multicast QoS flow of another multicast service is mapped.

Optionally, the handover request may further include an identifier of a service flow that the S-gNB expects to forward through a forwarding tunnel. For example, if a multicast QoS flow is forwarded through the forwarding tunnel, the S-gNB may add a QFI of a unicast QoS flow corresponding to the multicast QoS flow to the handover request. A reason why the service flow is forwarded through the forwarding tunnel is that after the S-gNB sends a handover command to the UE in subsequent S1004, the UE is disconnected from the S-gNB until the UE accesses the T-gNB in a next step. Therefore, the UE temporarily cannot receive data in this period of time by using the S-gNB. Because the UE has not accessed the T-gNB, the data in this period of time is forwarded to the T-gNB through the forwarding tunnel for buffering, and is delivered to the UE after the UE accesses the T-gNB. The forwarding tunnel is a logical tunnel between the S-gNB and the T-gNB, and the logical tunnel is established based on a physical connection between the S-gNB and the T-gNB.

It should be noted that, in this embodiment of this application, when the S-gNB sends the handover request to the T-gNB, the SMF first maps the multicast QoS flow of the ongoing multicast service that is associated with the PDU session of the to-be-handed-over UE and that is of the S-gNB to the unicast QoS flow. After the UE accesses the T-gNB, the SMF performs determining based on the multicast capability information of the T-gNB. When the T-gNB supports multicast, the SMF may restore the multicast QoS flow mapped to the unicast QoS flow to the multicast QoS flow, and deliver the multicast QoS flow through a multicast session tunnel of the T-gNB. When the T-gNB does not support multicast, the SMF may still deliver the unicast QoS flow corresponding to the multicast QoS flow to the UE through a PDU session tunnel of the T-gNB in a unicast mode.

It should be understood that, in this embodiment of this application, the SMF first maps the multicast QoS flow of the ongoing multicast service that is associated with the PDU session of the to-be-handed-over UE and that is of the S-gNB to the unicast QoS flow. This is because the UE requests both the unicast service and the multicast service when accessing the S-gNB. The unicast service is delivered in the PDU session tunnel, and the multicast service is delivered in the multicast session tunnel, so that service continuity of the UE can be ensured. The service continuity includes continuity of the unicast service and continuity of the multicast service. However, because the UE is handed over from the S-gNB to the T-gNB, if the multicast QoS flow in the multicast session tunnel of the S-gNB is not first mapped to the unicast QoS flow in the PDU session tunnel on which the PDU session at the S-gNB is located, and the T-gNB does not support multicast (in other words, the multicast session tunnel cannot be established) after the handover, the multicast service of the UE is interrupted, and the service continuity cannot be maintained. Therefore, to ensure the service continuity of the UE, the multicast QoS flow is first mapped to the unicast QoS flow at the S-gNB (that is, before the UE is handed over to the T-gNB), and unicast handover is performed. Then, after learning of the multicast capability information of the T-gNB in a handover procedure, the SMF may perform an operation depending on whether the T-gNB supports multicast, to add the UE to the multicast service at the T-gNB in an appropriate manner (that is, the multicast service of the UE is handed over from the S-gNB to the T-gNB).

S1003. The T-gNB prepares a radio resource for the UE, and sends a handover response to the S-gNB. Correspondingly, the S-gNB receives the handover response.

The T-gNB prepares the radio resource for the UE based on service flow description information received from the S-gNB. Because the S-gNB receives only unicast service flow description information (including the unicast QoS flow that is of the unicast service and that is mapped from the multicast QoS flow of the multicast service), the T-gNB may allocate a unicast resource to each unicast QoS flow. After preparing the radio resource, the T-gNB may send the handover response to the S-gNB. The T-gNB may send, to the S-gNB, information relayed to the UE through the S-gNB. For example, the T-gNB may send radio bearer configuration information of the T-gNB to the UE through the S-gNB. If the handover request includes the identifier of the service flow that the S-gNB expects to forward through the forwarding tunnel, and the T-gNB supports data forwarding, the T-gNB allocates a forwarding tunnel identifier (where the identifier is used by the T-gNB to connect to the S-gNB), and sends the forwarding tunnel identifier to the S-gNB in the handover response, to establish a forwarding tunnel from the S-gNB to the T-gNB for the PDU session of the UE. Optionally, the T-gNB may further notify the S-gNB of unicast QoS flows that are in the PDU session and that support forwarding. The T-gNB may send QFI identifiers of the unicast QoS flows to the S-gNB.

S1004. The S-gNB sends the handover command to the UE. Correspondingly, the UE receives the handover command.

If the T-gNB sends the radio bearer configuration information to the UE, the S-gNB may add the radio bearer configuration information to the handover command. In this case, the S-gNB stops delivering any downlink data to the UE, and for a unicast QoS flow supporting data forwarding, the S-gNB may deliver data corresponding to the unicast QoS flow to the T-gNB through the forwarding tunnel.

S1005. The UE accesses the T-gNB. The UE accesses the T-gNB based on the radio bearer configuration information sent by the T-gNB. The T-gNB delivers the forwarded data received from the S-gNB to the UE.

S1006. The T-gNB sends an N2 path switch request to an AMF. Correspondingly, the AMF receives the N2 path switch request.

For example, the N2 path switch request may include QFIs (including the QFI that is of the unicast QoS flow to which the multicast QoS flow is mapped and that is in the S-gNB) of unicast QoS flows that are successfully handed over and that fail to be handed over in the PDU session. Optionally, the QFI may be encapsulated in an N2 SM information. Optionally, the N2 path switch request may further include indication information indicating whether the T-gNB has the multicast service associated with the PDU session of the UE.

S1007. The AMF sends a PDU session update request to the SMF. Correspondingly, the SMF receives the PDU session update request.

Optionally, the PDU session update request may include information included in the N2 path switch request. Optionally, if the N2 path switch request includes the indication information indicating whether the T-gNB has the multicast service, the PDU session update request may further include the indication information indicating whether the T-gNB has the multicast service. The SMF may determine, based on the indication information, whether the T-gNB has the multicast service associated with the PDU session of the to-be-handed-over UE.

In this step, the SMF determines, by using the multicast capability information of the T-gNB, whether the T-gNB supports multicast. The multicast capability information may be carried in the PDU session update request. Optionally, the SMF may obtain the multicast capability information of the T-gNB mainly in one of the following three manners:

1. The AMF adds, as an information element, the collected multicast capability information of the T-gNB to the PDU session update request sent by the AMF to the SMF.

2. The AMF may selectively send the multicast capability information of the T-gNB to the SMF based on determining of the AMF. If the PDU session of the UE supports multicast, the AMF sends the multicast capability information of the T-gNB to the SMF. If the PDU session of the UE does not support multicast, the AMF may not send the multicast capability information of the T-gNB. The AMF may learn, when the UE requests to join the multicast service, whether the PDU session of the UE supports multicast (for details, refer to the method 800 or 900).

3. The AMF may send the multicast capability information of the T-gNB to the SMF as required based on subscription of the SMF.

After receiving the multicast capability information that is of the T-gNB and that is sent by the AMF, the SMF may first check whether the T-gNB supports multicast. If the T-gNB does not support multicast, S1011 to S1013 may be performed. If the T-gNB supports multicast, S1010 to S1013 may be performed.

If the T-gNB supports multicast and the T-gNB has the multicast service associated with the PDU session of the UE, when S1011 to S1013 described below are performed, the SMF may further send a request message to the T-gNB to request to add the UE to the multicast service. Alternatively, after completing this handover procedure, the SMF may request the T-gNB to add the UE to the multicast service. Alternatively, the SMF may request, at any time after receiving the PDU session update request, the T-gNB to add the UE to the multicast service. This is not limited in embodiments of this application. For a method for adding the UE to the multicast service by the T-gNB, refer to the foregoing method 800. Details are not described herein again.

Optionally, after adding the UE to the multicast service, the SMF may delete a PDR defined for the multicast service associated with the PDU session of the UE, and delete the mapping relationship between a multicast QoS flow and a unicast QoS flow.

S1008. The SMF sends a query request to a UDM, to query whether the T-gNB has the multicast service associated with the PDU session of the UE. Correspondingly, the UDM receives the query request.

When the T-gNB supports multicast, and the SMF requests the T-gNB to add the UE to the multicast service, the SMF may first query, by using the UDM, whether the T-gNB has the multicast service. If the T-gNB does not have the multicast service, when S1011 to S1013 described below are performed, the SMF further interacts with a UPF and the T-gNB to complete establishment of the multicast service, and adds the UE to the multicast service. For a procedure, refer to the method 800. Details are not described herein again. If the T-gNB already has the multicast service, when S1011 to S1013 described below are performed, the SMF may further send a request message to the T-gNB to request to add the UE to the multicast service; or the SMF may request, after completing this handover procedure, the T-gNB to add the UE to the multicast service; or the SMF may request, at any time after determining that the T-gNB has the multicast service, the T-gNB to add the UE to the multicast service. This is not limited in embodiments of this application. After adding the UE to the multicast service, the SMF may delete the PDR defined for the multicast service associated with the PDU session of the UE, and delete the mapping relationship between a multicast QoS flow and a unicast QoS flow.

S1009. The SMF sends an N4 session update request to the UPF, to indicate the UPF to map the multicast QoS flow of the multicast service to the unicast QoS flow of the unicast service based on the mapping relationship, so that the UPF can send the multicast QoS flow to the T-gNB through the PDU session tunnel of the PDU session.

It should be understood that when the UE joins the multicast service, the SMF already stores the mapping relationship between a QFI of the multicast QoS flow and a QFI of the unicast QoS flow. For an operation, refer to the method 800. Details are not described herein again.

S1010. The SMF sends a PDU session update response to the AMF.

S1011. The AMF sends an N2 path switch response to the T-gNB.

It should be noted that the radio bearer configuration information may be replaced with radio resource configuration information, and the radio bearer configuration may be replaced with a radio resource configuration. A radio resource may include a radio bearer, and the radio resource configuration information may include the radio bearer configuration information. This is not limited.

According to the multicast service transmission method in this embodiment of this application, when the UE is handed over from the S-gNB supporting a multicast function to the T-gNB, regardless of whether the T-gNB supports multicast, it can be ensured that the multicast service and the unicast service of the UE at the S-gNB can be not interrupted due to the handover. This ensures the service continuity of the UE, and can reduce a packet loss in a handover procedure, thereby reducing a handover delay. In addition, the handover procedure in this embodiment of this application is improved based on an existing procedure, and only determining of a multicast capability of the gNB and determining of whether the T-gNB has the multicast service associated with the PDU session of the UE need to be added, so that backward compatibility can be implemented and implementation is easy.

Figure 11:
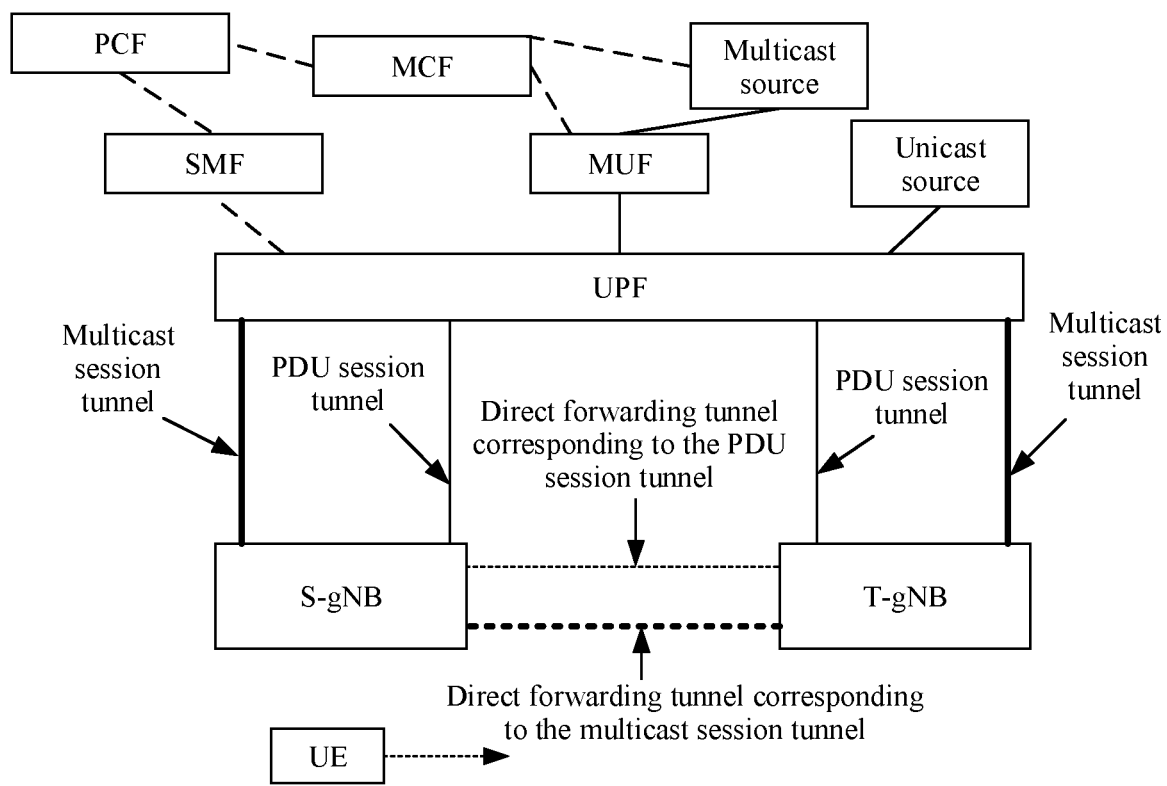
FIG. 11 is a diagram of tunnels for multicast service transmission according to an embodiment of this application.
Figure 12:
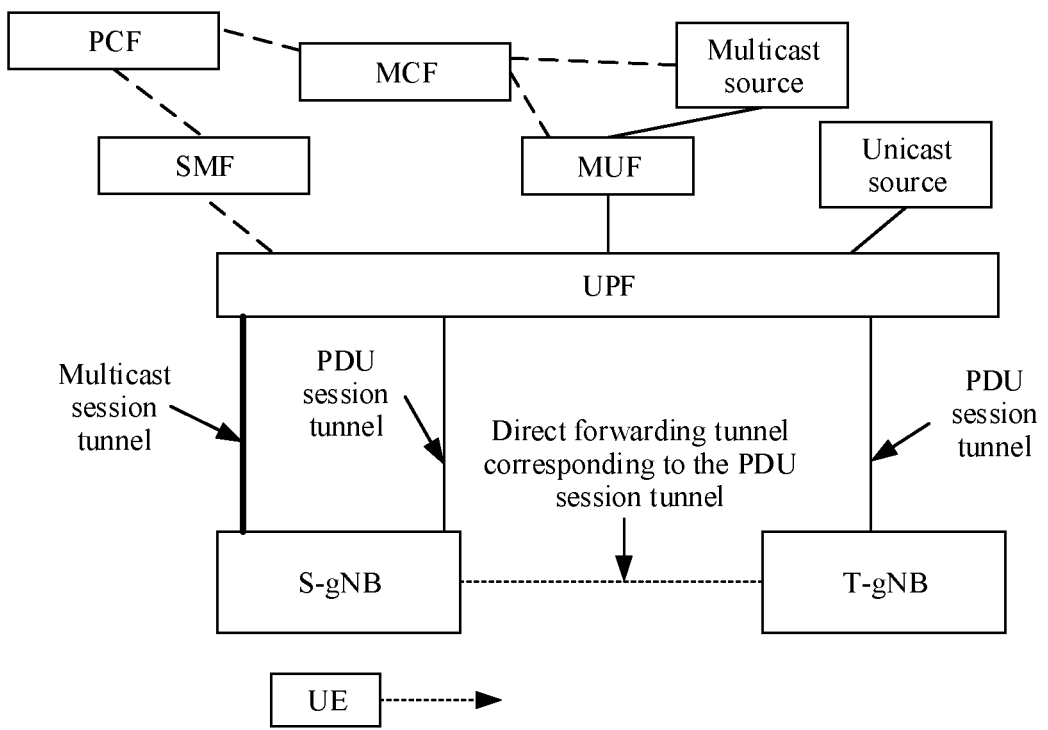
FIG. 12 is another diagram of tunnels for multicast service transmission according to an embodiment of this application.

FIG. 11 and FIG. 12 each are a diagram of tunnels for multicast service transmission according to an embodiment of this application. For a multicast service associated with a PDU session of UE at an S-gNB, multicast network elements serving the multicast service of the S-gNB are an MCF (a control plane) and an MUF (a user plane). In this case, the MUF may be connected to a UPF on which the PDU session of the UE is located. A T-gNB in FIG. 11 supports multicast, and a T-gNB in FIG. 12 does not support multicast. In FIG. 11, because the T-gNB supports multicast, a multicast session tunnel between a UPF and the T-gNB can be established by using the foregoing method, and the multicast service can be delivered to the UE through the multicast session tunnel. In FIG. 12, because the T-gNB does not support multicast, only a PDU session tunnel exists between the UPF and the T-gNB. A multicast QoS flow is mapped to a unicast QoS flow, and the multicast service is delivered through the PDU session tunnel.

Figure 13:
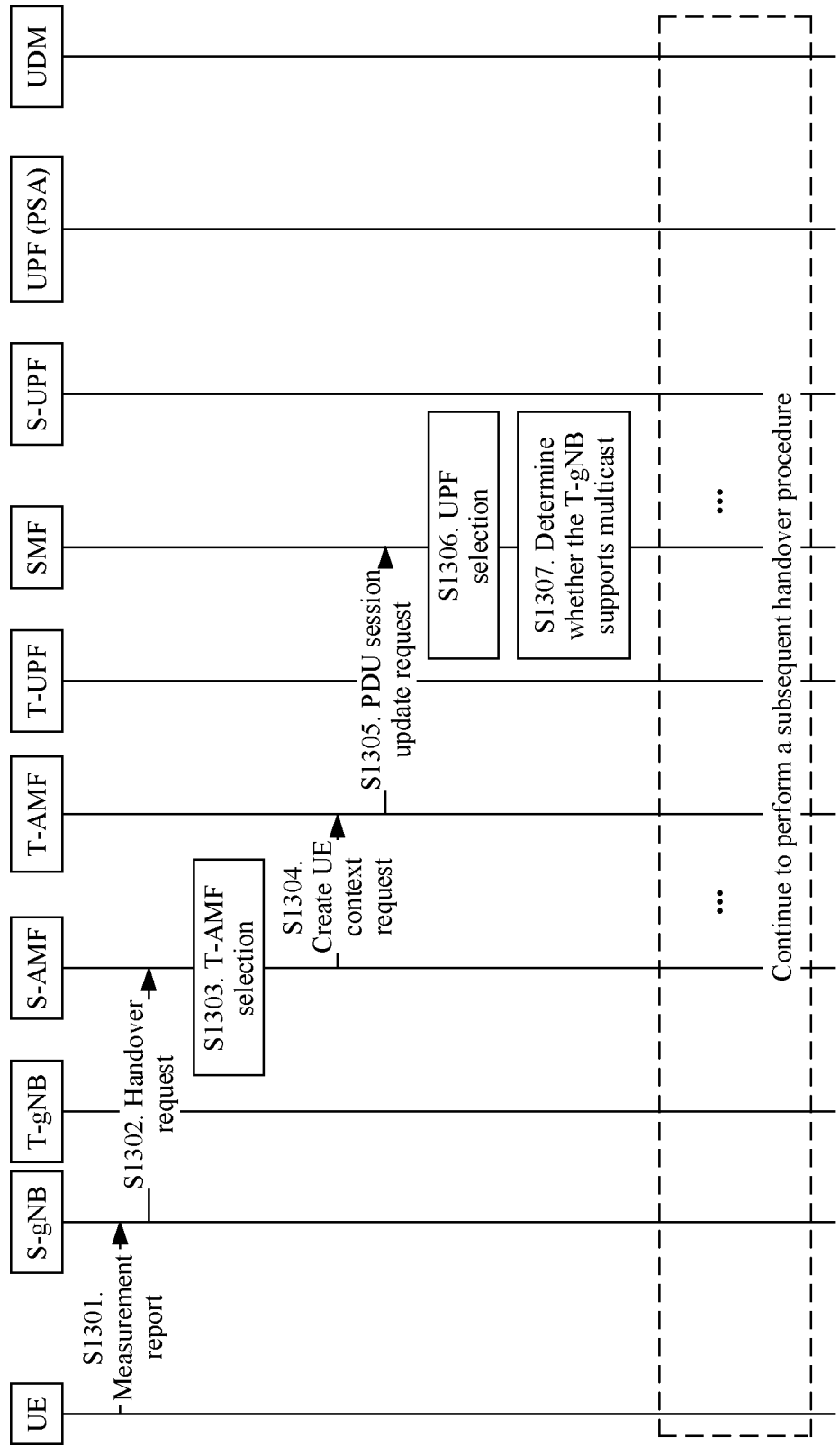
FIG. 13 is another flowchart of a multicast service transmission method according to an embodiment of this application.

FIG. 13 is another flowchart of a multicast service transmission method 1300 according to an embodiment of this application. The method 1300 may be applied to the system architecture 200 shown in FIG. 2. It should be understood that in this embodiment, a case in which UE support multicast is considered by default, and only a capability of a T-gNB is used for discussion. However, in another implementation, an SMF may alternatively perform comprehensive determining based on multicast capability information of the UE and/or multicast capability information of the T-gNB. For a method, refer to the foregoing embodiment. Details are not described herein again.

In the method 1300, the UE is handed over from a source access network device (referred to as an S-gNB in this embodiment) to a target access network device (the T-gNB), and both an AMF and a UPF are handed over. In other words, network elements that serve the S-gNB are an S-AMF and an S-UPF, and network elements that serve the T-gNB are a T-AMF and a T-UPF.

S1301. The UE sends a measurement report to the S-gNB, where the measurement report indicates a signal measurement result of the UE. Correspondingly, the S-gNB receives the measurement report, and determines, based on the measurement report, to hand over the UE to the T-gNB.

S1302. The S-gNB sends a handover request to the S-AMF, where the S-AMF is connected to the S-gNB. Correspondingly, the S-AMF receives the handover request.

For example, the handover request may include information about a PDU session of the UE, and the information about the PDU session includes an identifier of the PDU session and QoS information corresponding to a unicast service flow included in the PDU session. The QoS information corresponding to the unicast service flow may include a QFI and a QoS parameter. If the PDU session of the current to-be-handed-over UE is associated with a multicast service, the S-gNB may map a multicast QoS flow to a unicast QoS flow based on a mapping relationship between a QFI of the multicast QoS flow and a QFI of the unicast QoS flow.

It should be noted that, in this embodiment of this application, when the S-gNB sends the handover request to the T-gNB, the SMF first maps the multicast QoS flow of the ongoing multicast service that is associated with the PDU session of the to-be-handed-over UE and that is of the S-gNB to the unicast QoS flow. After the UE accesses the T-gNB, the SMF performs determining based on the multicast capability information of the T-gNB. When the T-gNB supports multicast, the SMF may restore the multicast QoS flow mapped to the unicast QoS flow to the multicast QoS flow, and deliver the multicast QoS flow through a multicast session tunnel of the T-gNB. When the T-gNB does not support multicast, the SMF may still deliver the unicast QoS flow corresponding to the multicast QoS flow to the UE through a PDU session tunnel of the T-gNB in a unicast mode. For descriptions of this point, refer to the foregoing method 1000. Details are not described herein again.

If the PDU session of the current to-be-handed-over UE is associated with the multicast service, the S-gNB learns of the multicast capability information of the T-gNB. In an implementation, the S-gNB may obtain, through an Xn connection to the T-gNB, the multicast capability information of the T-gNB and information indicating whether the T-gNB has the multicast service associated with the PDU session of the UE. Therefore, in this case, the handover request sent by the S-gNB to the S-AMF may further include the multicast capability information of the T-gNB and the information indicating whether the T-gNB has the multicast service associated with the PDU session of the UE.

S1303. The S-AMF may select the T-AMF based on an identifier (ID) of a target cell, and the T-AMF is connected to the T-gNB.

S1304. The S-AMF sends a create UE context request to the T-AMF. Correspondingly, the T-AMF receives the create UE context request.

For example, the create UE context request may include context information of the UE and the information about the PDU session of the UE that are stored in the S-AMF. The information about the PDU session may include information such as the identifier of the PDU session, a DNN, and S-NSSAI.

Optionally, the create UE context request may further include the information carried in the handover request in S1302.

Optionally, if the S-AMF stores information about an association between the PDU session and the multicast service when the UE joins the multicast service for the first time, the S-AMF may further send the association information to the T-AMF.

S1305. The T-AMF sends a PDU session update request to the SMF. Correspondingly, the SMF receives the PDU session update request.

The PDU session update request may carry the multicast capability information of the T-gNB. The T-AMF may send the multicast capability information of the T-gNB to the SMF by using additional signaling. This is not limited in embodiments of this application. For example, the T-AMF may send the multicast capability information of the T-gNB to the SMF. Alternatively, the T-AMF may selectively send the multicast capability information of the T-gNB to the SMF depending on whether the PDU session is associated with the multicast service. Alternatively, the SMF subscribes to a change notification of the multicast capability information of the T-gNB from the T-AMF; and when the multicast capability information of the T-gNB changes (for example, the T-gNB upgrades from "does not support multicast" to "support multicast"), the T-AMF may send the multicast capability information of the T-gNB to the SMF.

S1306. The SMF determines whether to perform UPF reselection.

S1307. The SMF determines whether the T-gNB supports multicast.

In an implementation, the S-gNB has obtained, through the Xn connection to the T-gNB, the multicast capability information of the T-gNB and the information indicating whether the T-gNB has the multicast service associated with the PDU session of the UE. In this case, the S-gNB may transfer the information to the SMF, and the SMF may learn of whether the T-gNB supports multicast and whether the T-gNB has the multicast service associated with the PDU session of the UE.

In another implementation, the SMF may determine, based on the multicast capability information that is of the T-gNB and that is sent by the T-AMF, whether the T-gNB supports multicast.

If the T-gNB does not support multicast, the SMF maps the multicast QoS flow to a unicast QoS flow, and hands over the unicast QoS flow and another unicast QoS flow to the T-gNB. For a subsequent handover procedure, refer to a conventional technology (for example, an N2 handover procedure in 3GPP TS 23.502). Details are not described herein.

If the T-gNB supports multicast, the SMF may determine whether the T-gNB has the multicast service associated with the PDU session of the UE.

If the T-gNB has the multicast service, the handover procedure in the existing 3GPP TS 23.502 continues to be performed, so that the unicast service flow included in the PDU session of the UE is handed over to the T-gNB. After the handover procedure ends, or at any moment in an ongoing process of the handover procedure, the SMF may request the T-gNB to add the UE to the multicast service. Because the T-gNB supports multicast and the T-gNB has the multicast service, the SMF may request the T-gNB to add the UE to the multicast service when a unicast service is handed over or after the unicast handover ends.

If the T-gNB does not have the multicast service, the SMF may continue to hand over the unicast service flow to the T-gNB according to the handover procedure in 3GPP TS 23.502. In addition, the SMF may further perform one of the following operations:

In an implementation, because the T-gNB does not have the multicast service and the multicast service has been mapped, at the S-gNB, to the PDU session tunnel on which the PDU session is located, the multicast service may still be delivered through the PDU session tunnel of the T-gNB. In other words, the SMF still maps, to a unicast QoS flow, a multicast QoS flow sent by a multicast service source to the T-gNB, and hands over the unicast QoS flow and another unicast QoS flow to the T-gNB together. For details, refer to the descriptions when the T-gNB does not support multicast.

In another implementation, when handing over the unicast service, the SMF may request the T-UPF to establish the multicast session tunnel to the T-gNB, run the multicast service at the T-gNB, and then request the T-gNB to add the UE to the multicast service. For example, when receiving a request message from the T-AMF, the SMF may request the T-UPF and the T-gNB to create the multicast session tunnel and run the multicast service. Alternatively, after the unicast service is handed over, the SMF may request the T-UPF and the T-gNB to create the multicast session tunnel and run the associated multicast service, and then request the T-gNB to add the UE to the multicast service.

After S1307, a subsequent handover procedure may continue. Refer to 3GPP TS23.502. Details are not described herein again. TS is short for technical specification, and 23.502 is a version number of the technical specification.

According to the multicast service transmission method in this embodiment of this application, when the UE is handed over from the S-gNB supporting a multicast function to the T-gNB, regardless of whether the T-gNB supports multicast, it can be ensured that the multicast service and the unicast service of the UE at the S-gNB can be not interrupted due to the handover. This ensures the service continuity of the UE, and can reduce a packet loss in a handover procedure, thereby reducing a handover delay. In addition, the handover procedure in this embodiment of this application is improved based on an existing procedure, and only determining of a multicast capability of the gNB and determining of whether the T-gNB has the multicast service associated with the PDU session of the UE need to be added, so that backward compatibility can be implemented and implementation is easy.

Figure 14:
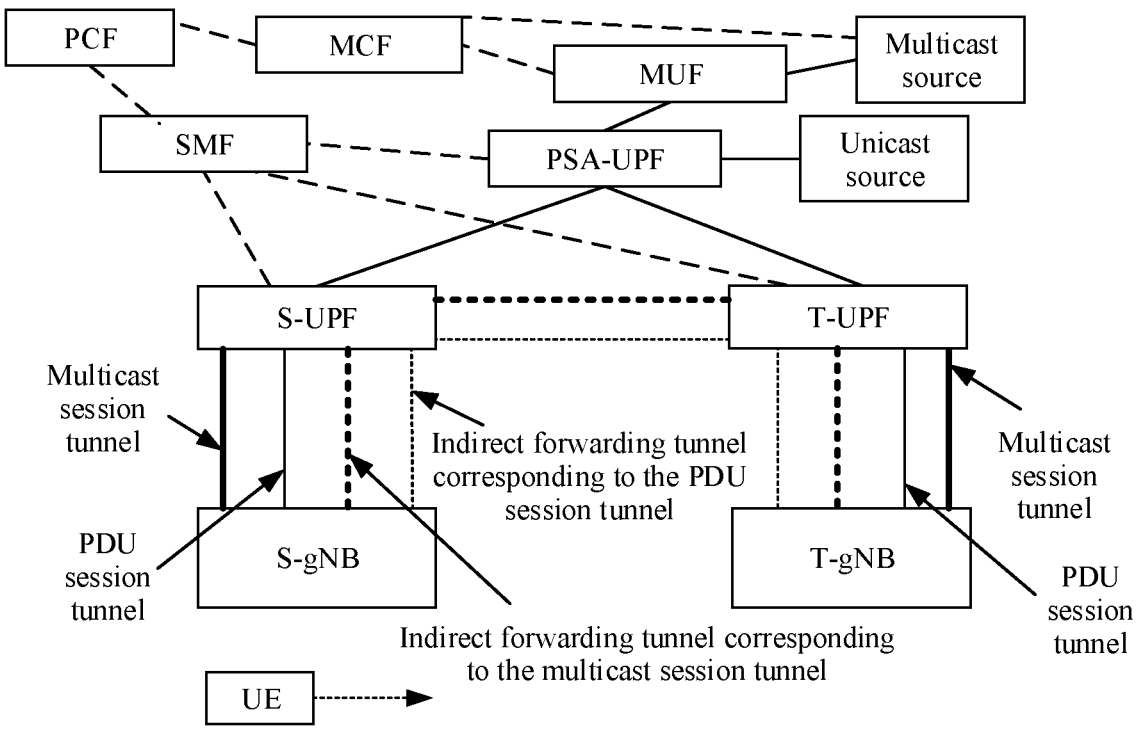
FIG. 14 is another diagram of tunnels for multicast service transmission according to an embodiment of this application.
Figure 15:
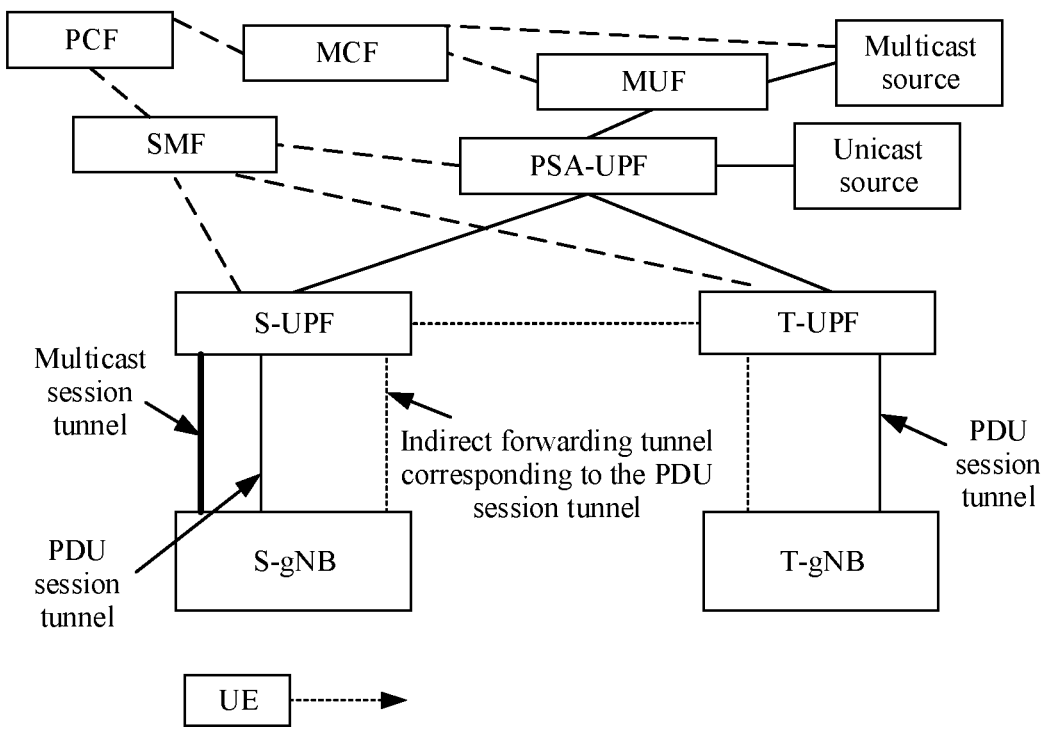
FIG. 15 is another diagram of tunnels for multicast service transmission according to an embodiment of this application.

FIG. 14 and FIG. 15 each are a diagram of tunnels for multicast service transmission according to an embodiment of this application. For a multicast service associated with a PDU session of UE at an S-gNB, multicast network elements serving the multicast service of the S-gNB are an MCF (a control plane) and an MUF (a user plane). In this case, the MUF may be connected to an anchor UPF (PSA-UPF) in which the PDU session of the UE is located. The anchor UPF is separately connected to an S-UPF and a T-UPF. The S-UPF is connected to the S-gNB, and the T-UPF is connected to a T-gNB. An indirect forwarding tunnel may be formed between the S-gNB and the S-UPF and between the T-UPF and the T-gNB. A T-gNB in FIG. 14 supports multicast, and a T-gNB in FIG. 15 does not support multicast. In FIG. 14, because the T-gNB supports multicast, a multicast session tunnel between the UPF and the T-gNB can be established by using the foregoing method, and the multicast service can be delivered to the UE through the multicast session tunnel. In FIG. 15, because the T-gNB does not support multicast, only a PDU session tunnel exists between a UPF and the T-gNB. A multicast QoS flow is mapped to a unicast QoS flow, and the multicast service is delivered through the PDU session tunnel.

Figure 16:
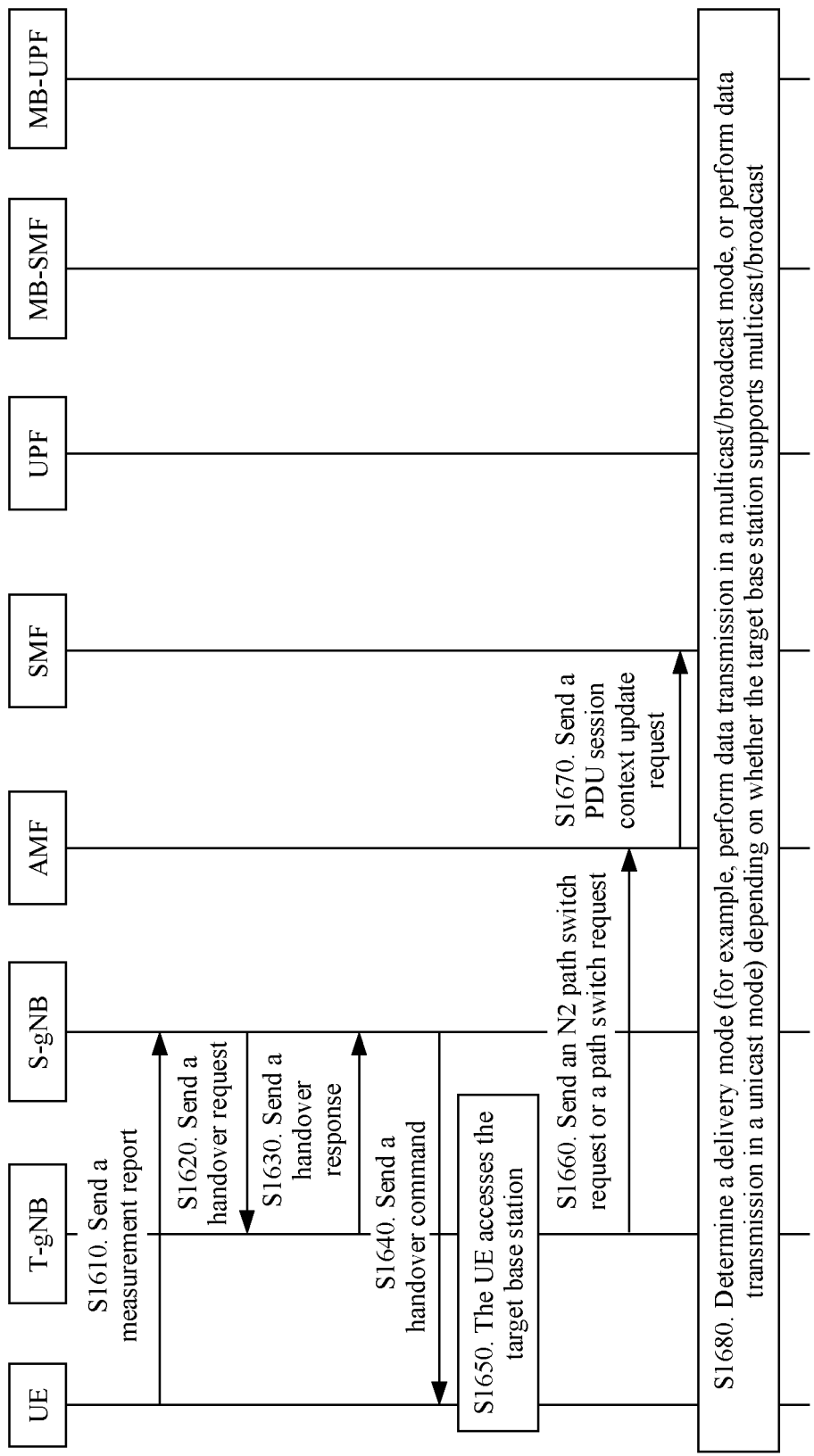
FIG. 16 is another flowchart of a multicast service transmission method according to an embodiment of this application.

FIG. 16 is another flowchart of a multicast service transmission method 1600 according to an embodiment of this application. As shown in FIG. 16:

S1610. UE sends a measurement report to a source base station.

For example, the measurement report includes signal measurement strengths of a plurality of (for example, eight) surrounding cells.

Therefore, the source base station may determine a target base station of the UE based on the measurement report. For example, the source base station may determine a target cell having a strongest signal strength as a target cell to which the UE needs to be handed over, and further determine a base station of the target cell as the target base station.

S1620. The source base station sends a handover request to the target base station.

The handover request may include information about a PDU session of the to-be-handed-over UE.

The information about the PDU session may include an identifier of the PDU session and QoS information that corresponds to a service and that is included in the PDU session. The service may include a unicast service and/or a multicast service.

In an implementation, if the source base station supports multicast/broadcast, and the PDU session of the to-be-handed-over UE is associated with a multicast/broadcast service (in other words, the UE joins the multicast/broadcast service at the source base station), the information about the PDU session may further include QoS information that is of the multicast/broadcast service and that corresponds to the associated multicast/broadcast service.

The QoS information that is of the service and that is included in the PDU session may include a QFI of a unicast QoS flow corresponding to the unicast service and QoS parameter information corresponding to the QFI of the unicast QoS flow, and/or a QFI of a multicast/broadcast QoS flow corresponding to the multicast/broadcast service and QoS parameter information corresponding to the QFI of the multicast/broadcast QoS flow.

For example, in a scenario in which the service includes only the unicast service, the QoS information that is of the service and that is included in the PDU session includes the QFI of the unicast QoS flow corresponding to the unicast service, and the QoS parameter information corresponding to the QFI of the unicast QoS flow.

In a scenario in which the service includes only the multicast/broadcast service, the QoS information that is of the service and that is included in the PDU session includes the QFI of the multicast/broadcast QoS flow, a QFI of a unicast QoS flow corresponding to the QFI of the multicast/broadcast QoS flow (for example, a QFI of a mapped unicast QoS flow), and the QoS parameter information corresponding to the QFI of the multicast/broadcast QoS flow.

In a scenario in which the service includes the unicast service and the multicast/broadcast service, the QoS information that is of the service and that is included in the PDU session includes the QFI of the unicast QoS flow (including a QFI of a unicast QoS flow corresponding to the QFI of the multicast/broadcast QoS flow (for example, a QFI of a mapped unicast QoS flow)), the QoS parameter information corresponding to the QFI of the unicast QoS flow, the QFI of the multicast/broadcast QoS flow, and the QoS parameter information corresponding to the QFI of the multicast/broadcast QoS flow.

In an example, a QoS parameter corresponding to the QFI of the unicast QoS flow may be used by the base station to configure an air interface resource, and the QoS parameter corresponding to the unicast QFI may be indexed by using a 5QI.

In this application, QoS parameter information corresponding to the QFI of the unicast QoS flow corresponding to the multicast/broadcast service may include the QFI of the unicast QoS flow corresponding to the QFI of the multicast/broadcast QoS flow, and a QoS parameter corresponding to the QFI of the unicast QoS flow corresponding to the QFI of the multicast/broadcast QoS flow.

The unicast QFI corresponding to the multicast QFI may be understood as a unicast QFI to which the multicast QFI is mapped.

In an example, the handover request further includes a QFI suggested by the source base station for forwarding through a forwarding tunnel and forwarding tunnel identification information generated by the source base station. For example, if the unicast QoS flow included in the service of the PDU session may be forwarded through the forwarding tunnel corresponding to the PDU session, the handover request includes the unicast QFI corresponding to the unicast QoS flow.

For another example, if a first QoS flow in the PDU session is used to deliver data of the multicast/broadcast service, and the first QoS flow can be forwarded, the handover request includes a unicast QFI corresponding to the first QoS flow. The unicast QFI may also be understood as a QFI of a unicast QoS flow to which the QFI of the multicast/broadcast QoS flow is mapped or a QFI of a unicast QoS flow that corresponds to the QFI of the multicast/broadcast QoS flow.

S1630. The target base station configures a radio resource for the UE based on the handover request.

S1630 may include: The target base station prepares or configures the radio resource for the UE based on the information that is about the PDU session and that is in the handover request. For example, the radio resource is prepared or configured for the UE based on the QoS information, that is of the service and that is included in the PDU session, in the information about the PDU session.

For example, the radio resource may include a radio resource used to deliver data of the PDU session. The radio resource used to deliver the data of the PDU session may include a radio resource used to deliver the data of the multicast/broadcast service.

For the radio resource used to deliver the data of the PDU session, the target base station may determine a quantity of data radio bearers (DRBs) and a mapping relationship between a QFI and a DRB based on a QoS parameter corresponding to a QFI of each unicast QoS flow (for example, including the QFI of the unicast QoS flow to which the multicast QoS flow is mapped). In addition, the target base station may further determine, based on a QoS parameter corresponding to a QFI to which each DRB is mapped, a configuration parameter corresponding to the DRB (for example, whether a PDCP layer corresponding to the DRB is encrypted, whether a radio link control (RLC) layer uses an acknowledged mode or an unacknowledged mode, configurations of a logical channel, a transmission channel, and a physical channel, and a modulation and coding scheme). Finally, the target base station creates a corresponding DRB.

Optionally, after S1630, the method further includes: The target base station sends a handover request acknowledgment (handover request ACK) to the source base station.

The handover request response may include configuration information of the radio resource used to deliver the data of the PDU session.

The configuration information of the radio resource may be configuration information of a data radio bearer, for example, a configuration parameter corresponding to the foregoing DRB.

Further, the source base station sends the configuration information of the radio resource from the target base station to the UE. This may be implemented by using step S1640.

The configuration information of the radio resource may be used by the UE to access the target base station in S1650, and after accessing the target base station, the UE receives data (for example, the data of a multicast/broadcast service) that is of the service and that is included in the PDU session.

S1640. The source base station sends a handover command to the UE.

The handover command may carry the configuration information of the radio resource.

S1650. The UE sends a handover confirm to the target base station.

The UE may send the handover confirm to the target base station based on the configuration information of the radio resource.

Further, the UE may receive the data that is of the service and that is included in the PDU session.

S1660. The target base station receives the handover confirm, and sends an N2 path switch request or a path switch request to an AMF.

An N2 path in the request may include N2 SM information, and may further include location information of the UE and the like. The N2 SM information includes QFIs (including the unicast QFI to which the multicast/broadcast QoS flow is mapped, where the QFI is encapsulated in the N2 SM information) of unicast QoS flows that are successfully handed over and that fail to be handed over in the PDU session, and further includes identification information of a PDU session tunnel allocated by the target base station.

Optionally, in an implementation, if the target base station supports multicast/broadcast, the target base station further adds multicast/broadcast capability information of the target base station to the N2 path switch request or the path switch request.

The multicast/broadcast capability information of the target base station may indicate whether the target base station supports multicast/broadcast. For example, the capability information may be an indication, or may be a tag, or may be an information element (IE).

It should be noted that, in this application, whether the target base station supports multicast/broadcast may alternatively be represented by using whether A specific information, a specific information element, or a specific tag is carried in S1660. For example, if the multicast/broadcast capability information of the target base station is carried, it represents that the target base station supports multicast/broadcast; if the multicast/broadcast capability information of the target base station is not carried, it represents that the target base station does not support multicast/broadcast.

For example, the capability information may be included in an N2 SM information element, or may be included in an information element newly added to the N2 path switch request or the path switch request.

The N2 SM information may be path switch request transfer.

For another example, the multicast/broadcast capability information of the target base station is carried, and represents whether the target base station supports multicast/broadcast, for example, in a Boolean manner (a value of 1 indicates support, and a value of 0 indicates no support).

S1670. The AMF sends a PDU session context update request to an SMF.

The PDU session context update request may be used to request a context of the PDU session, for example, a PDU session context update request (Nsmf_PDUSession_UpdateSMContext Request).

For example, if the multicast/broadcast capability information of the target base station may be carried in the PDU session context update request, it represents that the target base station supports multicast/broadcast; if the multicast/broadcast capability information of the target base station is not carried, it represents that the target base station does not support multicast/broadcast.

In an example, if the N2 path switch request or the path switch request in S1660 includes the multicast/broadcast capability information of the target base station, the PDU session context update request includes the multicast/broadcast capability information of the target base station.

For example, the PDU session context update request may include the N2 SM information in S1660, and the N2 SM information includes the multicast/broadcast capability information of the target base station.

For another example, if the multicast/broadcast capability information of the target base station is included in any information element other than the N2 SM information in the N2 path switch request or the path switch request in S1660, the PDU session context update request includes the N2 SM information, and further includes the multicast/broadcast capability information of the target base station.

The PDU session context update request may be an example of a "second message" in this application. The SMF determines, based on the PDU session context update request message, whether the target base station supports multicast/broadcast.

For example, if the multicast/broadcast capability information of the target base station may be carried in the PDU session context update request, it represents that the target base station supports multicast/broadcast; if the multicast/broadcast capability information of the target base station is not carried, it represents that the target base station does not support multicast/broadcast.

For another example, if the target base station supports multicast/broadcast, the SMF determines that a delivery mode of the multicast service is a multicast mode.

The multicast mode may include but is not limited to one or more of the following delivery modes:

a 5GC shared multicast/broadcast service traffic delivery mode (5GC Shared MBS traffic delivery method), a shared multicast/broadcast service traffic delivery mode (Shared MBS traffic delivery method), or a shared delivery mode (Shared delivery method)

For another example, if the target base station supports multicast/broadcast, and the UE also supports multicast/broadcast, the SMF determines that the delivery mode of the multicast service is the multicast mode.

For another example, if the target base station does not support multicast/broadcast, the SMF determines that the delivery mode of the multicast service is a unicast mode.

The SMF may determine, in the following manners, whether the target base station supports multicast/broadcast:

Manner 1: Whether the target base station supports multicast/broadcast is determined based on the multicast/broadcast capability information of the target base station carried in the PDU session context update request in S1670.

The multicast/broadcast capability information of the target base station may represent whether the target base station supports multicast/broadcast, for example, in a Boolean manner. When the multicast/broadcast capability information of the target base station is 1, it indicates that the target base station supports multicast/broadcast. When the multicast/broadcast capability information of the target base station is 0, it indicates that the target base station does not support multicast/broadcast.

Further, the SMF may determine, based on the multicast/broadcast capability information of the target base station, that the target base station supports multicast/broadcast.

The N2 SM information carried in the PDU session context update request may include the multicast/broadcast capability information of the target base station, or the multicast/broadcast capability information of the target base station may be carried in the PDU session context update request. This is not limited.

Manner 2: Whether the target base station supports multicast/broadcast is determined depending on whether the multicast/broadcast capability information of the target base station is carried in the PDU session context update request in S1670.

For example, if the PDU session context update request includes the information, information element, or tag (for example, the multicast/broadcast capability information of the target base station) mentioned in S1660, it is determined that the target base station supports multicast/broadcast.

The N2 SM information carried in the PDU session context update request may include the multicast/broadcast capability information of the target base station, or the multicast/broadcast capability information of the target base station may be carried in the PDU session context update request.

The unicast mode may include but is not limited to one or more of the following delivery modes:

a 5GC individual multicast/broadcast service traffic delivery mode (5GC Individual MBS (Multicast Broadcast Service) traffic delivery method), an individual multicast/broadcast service traffic delivery mode (Individual MBS traffic delivery method), or an individual delivery mode (Individual delivery method)

It should be understood that the scenarios shown in FIG. 11, FIG. 12, FIG. 14, FIG. 15, and FIG. 16 are examples for ease of describing embodiments of this application. In an actual case, an application scenario of this application is not limited to FIG. 11, FIG. 12, FIG. 14, FIG. 15, and FIG. 16. In other words, this application is further applicable to other scenarios that are not listed. The scenarios shown in FIG. 11, FIG. 12, FIG. 14, FIG. 15, and FIG. 16 and other scenarios that are not listed may include the following three features:

(1) For a PDU session of the handed-over UE, in a handover procedure, an SMF and an anchor UPF (namely, the UPF in FIG. 11, FIG. 12, and FIG. 16, and the PSA-UPF in FIG. 14 and FIG. 15) that serve the PDU session of the handed-over UE remain unchanged.

(2) Based on (1), for a multicast service associated with the PDU session of the handed-over UE in the source base station, assuming that multicast network elements serving the multicast service in the source base station are an MCF-1 (a control plane) and an MUF-1 (a user plane), the MUF-1 may be connected to an anchor UPF on which the PDU session of the UE is located (that is, the special scenarios shown in FIG. 11, FIG. 12, FIG. 14, FIG. 15, and FIG. 16). Optionally, the MUF-1 may alternatively be directly connected to the source base station. In addition, the MUF-1 may alternatively be connected to the source base station through another UPF (namely, an anchor UPF of a PDU session that is not of the UE). This is not limited in embodiments of this application.

(3) Based on (1) and (2), for the multicast service that is in the target base station and that is related to the PDU session of the handed-over UE, network elements serving the multicast service may be the MCF-1 and the MUF-1, or may be another MCF and another MUF. The MUF may be directly connected to the target base station, or may be connected to the anchor UPF of the PDU session of the handed-over UE, or may be connected to the target base station through another UPF (namely, an anchor UPF of a PDU session that is not of the UE). This is not limited in embodiments of this application.

It should be understood that, sequence numbers of the foregoing processes do not mean execution sequences. The execution sequences of the processes should be determined based on functions and internal logic of the processes, and should not be construed as any limitation on the implementation processes of embodiments of this application.

The foregoing describes in detail the multicast service transmission method according to embodiments of this application with reference to FIG. 1 to FIG. 16. The following describes in detail multicast service transmission apparatuses according to embodiments of this application with reference to FIG. 17 and FIG. 18.

An embodiment of this application provides a multicast service transmission apparatus. In an implementation, the apparatus is configured to implement the procedures and steps corresponding to the session management network element in the foregoing method embodiments. In another implementation, the apparatus is configured to implement the steps or procedures corresponding to the access and mobility management network element in the foregoing method embodiments. In another implementation, the apparatus is configured to implement the steps or procedures corresponding to the access network device in the foregoing method embodiments.

Figure 17:
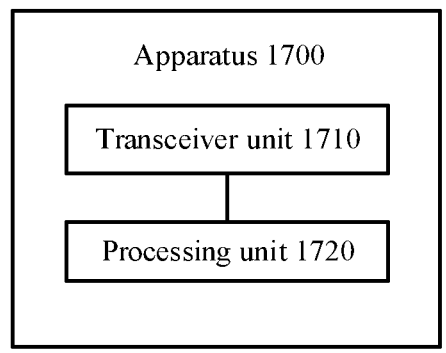
FIG. 17 is a diagram of a multicast service transmission apparatus according to an embodiment of this application.

FIG. 17 shows a multicast service transmission apparatus 1700 according to an embodiment of this application. The apparatus 1700 includes a transceiver unit 1710 and a processing unit 1720.

In an implementation, the apparatus 1700 may be the session management network element in the foregoing embodiment, or may be a chip in the session management network element. The apparatus 1700 may implement corresponding steps or procedures performed by the session management network element in the foregoing method embodiments. The transceiver unit 1710 is configured to perform operations related to sending and receiving of the session management network element in the foregoing method embodiments. The processing unit 1720 is configured to perform processing-related operations of the session management network element in the foregoing method embodiments.

For example, the transceiver unit 1710 is configured to receive a first message or a second message, where the first message is used to request to add a terminal device to a multicast service, the second message is used to update a protocol data unit PDU session of the terminal device, and the PDU session is associated with the multicast service; and the processing unit 1720 is configured to determine, based on multicast capability information of the terminal device and/or multicast capability information of an access network device, a delivery mode of the multicast service, where the multicast capability information of the terminal device indicates whether the terminal device supports multicast, the multicast capability information of the access network device indicates whether the access network device supports multicast, and the access network device is an access network device currently accessed by the terminal device or a target access network device of the terminal device.

Optionally, the processing unit 1720 is configured to: when the delivery mode is a unicast mode, the processing unit is configured to: determine, based on multicast quality of service QoS information of the multicast service, a unicast QoS flow corresponding to the multicast service; and add the unicast QoS flow to the protocol data unit PDU session of the terminal device, where the unicast QoS flow is used to deliver data of the multicast service.

Optionally, the processing unit 1720 is further configured to: when the delivery mode is a unicast mode, the processing unit is configured to select at least one unicast QoS flow from one or more unicast QoS flows of the PDU session of the terminal device based on QoS information of the multicast service, where the at least one unicast QoS flow is used to deliver data of the multicast service; and the transceiver unit 1710 is further configured to send a correspondence between a packet detection rule of the multicast service and an identifier of the at least one unicast QoS flow to a user plane function network element.

Optionally, the correspondence is carried in an eighth message, and the eighth message is an N4 session modification request message or a PFCP session modification request message.

Optionally, the transceiver unit 1710 is further configured to send information about the multicast service and a quality of service flow index QFI of the unicast QoS flow to a user plane network element. The processing unit 1720 is further configured to determine a QoS parameter of the unicast QoS flow based on a QoS parameter of the multicast QoS flow. The transceiver unit 1710 is further configured to send the QFI of the unicast QoS flow and the QoS parameter of the unicast QoS flow to the access network device.

Optionally, the processing unit 1720 is configured to: when the delivery mode is a multicast mode, the transceiver unit is further configured to send a service identifier of the multicast service to the access network device.

Optionally, the transceiver unit 1710 is further configured to send information about the multicast QoS flow of the multicast service to the access network device.

Optionally, the processing unit 1720 is further configured to: before sending a third message to the access network device, determining that the access network device has the multicast service.

Optionally, the transceiver unit 1710 is further configured to receive a fourth message from a unified data management network element, where the fourth message indicates that the access network device has the multicast service; and the processing unit 1720 is configured to determine, based on the fourth message, that the access network device has the multicast service.

Optionally, the processing unit 1720 is further configured to: before sending a third message to the access network device, determine that the access network device does not have the multicast service; and the transceiver unit 1710 is further configured to: send the information about the multicast QoS flow of the multicast service to the access network device; and receive, from the access network device, indication information indicating that a radio bearer corresponding to the multicast QoS flow is successfully created.

Optionally, the transceiver unit 1710 is further configured to send a fifth message to the unified data management network element based on the indication information, where the fifth message indicates that the access network device has the multicast service.

Optionally, the processing unit 1720 is further configured to determine the unicast QoS flow corresponding to the multicast QoS flow. The transceiver unit 1710 is further configured to send a first mapping relationship to the access network device, where the first mapping relationship indicates a correspondence between a QFI of the multicast QoS flow and the QFI of the unicast QoS flow.

Optionally, the transceiver unit 1710 is further configured to receive the multicast capability information of the terminal device and/or the multicast capability information of the access network device from an access and mobility management network element.

Optionally, the transceiver unit 1710 is further configured to: before receiving the multicast capability information of the terminal device and/or the multicast capability information of the access network device from the access and mobility management network element, send a request message to the access and mobility management network element, where the request message is used to request the multicast capability information of the terminal device and/or the multicast capability information of the access network device.

Optionally, the processing unit 1720 is further configured to: before sending the request message to the access and mobility management network element, determine that the PDU session of the terminal device supports multicast.

Optionally, the transceiver unit 1710 is further configured to send a subscription message to the access and mobility management network element, where the subscription message is used by the mobility management network element to send the multicast capability information of the terminal device and/or the multicast capability information of the access network device to the session management network element when a multicast capability of the terminal device changes and/or a multicast capability of the access network device changes.

Optionally, the transceiver unit 1710 is further configured to receive the first message from the access and mobility management network element, or receive the first message from the user plane network element.

In another implementation, the apparatus 1700 may be the access and mobility management network element in the foregoing embodiment, or may be a chip in the access and mobility management network element. The apparatus 1700 may implement corresponding steps or procedures performed by the access and mobility management network element in the foregoing method embodiments. The transceiver unit 1710 is configured to perform operations related to sending and receiving of the access and mobility management network element in the foregoing method embodiments. The processing unit 1720 is configured to perform processing-related operations of the access and mobility management network element in the foregoing method embodiments.

For example, the processing unit 1720 is configured to obtain multicast capability information of a terminal device and/or multicast capability information of an access network device, where the multicast capability information of the terminal device indicates whether the terminal device supports multicast, the multicast capability information of the access network device indicates whether the access network device supports multicast, and the access network device is an access network device currently accessed by the terminal device or a target access network device of the terminal device. The transceiver unit 1710 is configured to send the multicast capability information of the terminal device and/or the multicast capability information of the access network device to a session management network element.

Optionally, the processing unit is further configured to: before sending the multicast capability information of the terminal device and/or the multicast capability information of the access network device to the session management network element, determine that a protocol data unit PDU session of the terminal device supports multicast, so that the terminal device accesses the access network device.

Optionally, the transceiver unit 1710 is further configured to receive reference information of the PDU session from the terminal device, where the reference information includes one or more of indication information indicating whether the PDU session supports multicast, a data network name DNN of the PDU session, and single network slice selection assistance information S-NSSAI of the PDU session; and the processing unit 1720 is further configured to determine, based on the reference information, that the PDU session supports multicast.

Optionally, the transceiver unit 1710 is further configured to receive a request message from the session management network element, where the request message is used to request the multicast capability information of the terminal device and/or the multicast capability information of the access network device.

Optionally, the transceiver unit 1710 is further configured to receive a subscription message from the session management network element, where the subscription message is used by the mobility management network element to send the multicast capability information of the terminal device and/or the multicast capability information of the access network device to the session management network element when a multicast capability of the terminal device changes and/or a multicast capability of the access network device changes.

Optionally, the multicast capability information of the access network device is carried in a next-generation NG establishment request message.

Optionally, the multicast capability information of the terminal device is carried in a PDU session establishment/modification request message.

In another implementation, the apparatus 1700 may be the access network device in the foregoing embodiment, or may be a chip in the access network device. The apparatus 1700 may implement corresponding steps or procedures performed by the access network device in the foregoing method embodiments. The transceiver unit 1710 is configured to perform operations related to sending and receiving of the access network device in the foregoing method embodiments. The processing unit 1720 is configured to perform processing-related operations of the access network device in the foregoing method embodiments.

For example, the processing unit 1720 is configured to obtain multicast capability information of the access network device; and the transceiver unit 1710 is configured to send the multicast capability information of the access network device, where the multicast capability information indicates whether the apparatus supports multicast.

Optionally, the transceiver unit 1710 is configured to send the multicast capability information to an access and mobility management network element or a neighboring access network device of the access network device.

Optionally, the transceiver unit 1710 is further configured to: receive a handover request message from another access network device, where the handover request message includes an identifier of a protocol data unit PDU session of a terminal device, and the PDU session is associated with a multicast service; and send indication information to a core network device, where the indication information indicates whether the access network device has the multicast service.

It should be understood that the apparatus 1700 herein is embodied in the form of functional units. The term "unit" herein may refer to an application-specific integrated circuit (ASIC), an electronic circuit, a processor (for example, a shared processor, a special-purpose processor, or a group processor) configured to execute one or more software or firmware programs, a memory, a merged logic circuit, and/or another suitable component that supports the described function. In an optional example, a person skilled in the art may understand that the apparatus 1700 may be the session management network element in the foregoing embodiments, and may be configured to perform the procedures and/or steps corresponding to the session management network element in the foregoing method embodiments; or the apparatus 1700 may be the access and mobility management network element in the foregoing embodiments, and may be configured to perform the procedures and/or steps corresponding to the access and mobility management network element in the foregoing method embodiments; or the apparatus 1700 may be the access network device in the foregoing embodiments, and may be configured to perform the procedures and/or steps corresponding to the access network device in the foregoing method embodiments. To avoid repetition, details are not described herein again.

The apparatus 1700 in each of the foregoing solutions has a function of implementing a corresponding step performed by the session management network element in the foregoing method, or the apparatus 1700 in each of the foregoing solutions has a function of implementing a corresponding step performed by the access and mobility management network element in the foregoing method, or the apparatus 1700 in each of the foregoing solutions has a function of implementing a corresponding step performed by the access network device in the foregoing method. The function may be implemented by using hardware, or may be implemented by hardware executing corresponding software. The hardware or software includes one or more modules corresponding to the foregoing function. For example, a transceiver unit may be replaced with a transceiver (where for example, a sending unit in the transceiver unit may be replaced with a transmitter, and a receiving unit in the transceiver unit may be replaced with a receiver), and another unit such as a processing unit may be replaced with a processor, to separately perform receiving and sending operations and a related processing operation in the method embodiments.

In addition, the transceiver unit may alternatively be a transceiver circuit (where for example, the transceiver circuit may include a receiver circuit and a transmitter circuit), and the processing unit may be a processing circuit. In this embodiment of this application, the apparatus in FIG. 17 may be the network element or the device in the foregoing embodiment, or may be a chip or a chip system, for example, a system on chip (SoC). The transceiver unit may be an input/output circuit or a communication interface. The processing unit is a processor, a microprocessor, or an integrated circuit integrated on the chip. This is not limited herein.

Figure 18:
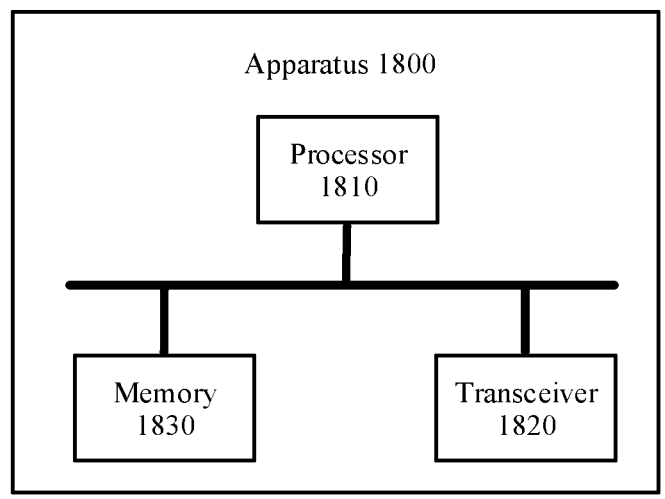
FIG. 18 is another diagram of a multicast service transmission apparatus according to an embodiment of this application.

FIG. 18 shows another multicast service transmission apparatus 1800 according to an embodiment of this application. The apparatus 1800 includes a processor 1810 and a transceiver 1820. The processor 1810 and the transceiver 1820 communicate with each other through an internal connection path, and the processor 1810 is configured to execute instructions, to control the transceiver 1820 to send a signal and/or receive a signal.

Optionally, the apparatus 1800 may further include a memory 1830. The memory 1830 communicates with the processor 1810 and the transceiver 1820 through an internal connection path. The memory 1830 is configured to store instructions, and the processor 1810 may execute the instructions stored in the memory 1830. In an implementation, the apparatus 1800 is configured to implement the procedures and steps corresponding to the session management network element in the foregoing method embodiments. In another implementation, the apparatus 1800 is configured to implement the procedures and steps corresponding to the access and mobility management network element in the foregoing method embodiments. In another implementation, the apparatus 1800 is configured to implement the procedures and steps corresponding to the access network device in the foregoing method embodiments.

It should be understood that the apparatus 1800 may be the session management network element, the access and mobility management network element, or the access network device in the foregoing embodiments, or may be a chip or a chip system. Correspondingly, the transceiver 1820 may be a transceiver circuit of the chip. This is not limited herein. The apparatus 1800 may be configured to perform the steps and/or procedures corresponding to the session management network element, the access and mobility management network element, or the access network device in the foregoing method embodiments. Optionally, the memory 1830 may include a read-only memory and a random access memory, and provide instructions and data to the processor. A part of the memory may further include a non-volatile random access memory. For example, the memory may further store information about a device type. The processor 1810 may be configured to execute the instructions stored in the memory. In addition, when the processor 1810 executes the instructions stored in the memory, the processor 1810 is configured to perform the steps and/or procedures corresponding to the session management network element, the access and mobility management network element, or the access network device in the foregoing method embodiments.

In an implementation process, the steps in the foregoing method may be implemented by using a hardware integrated logic circuit in the processor, or by using instructions in a form of software. The steps of the methods disclosed with reference to embodiments of this application may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the method in combination with hardware of the processor. To avoid repetition, details are not described herein again.

It should be noted that, the processor in embodiments of this application may be an integrated circuit chip, and has a signal processing capability. In an implementation process, the steps in the foregoing method embodiments may be implemented by using a hardware integrated logic circuit in the processor or instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in embodiments of this application. The general-purpose processor may be a microprocessor, or any conventional processor, or the like. The steps of the methods disclosed with reference to embodiments of this application may be directly performed by a hardware decoding processor, or may be performed by a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the method in combination with hardware of the processor.

It may be understood that, in embodiments of this application, the memory may be a volatile memory or a non-volatile memory, or may include both a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache. By way of example, and not limitation, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the system and method described in this specification includes but is not limited to these memories and any memory of another proper type.

According to the method provided in embodiments of this application, this application further provides a computer program product. The computer program product includes computer program code. When the computer program code is run on a computer, the computer is enabled to perform the steps or procedures performed by the session management network element, the access and mobility management network element, or the access network device in the embodiments shown in FIG. 5 to FIG. 16.

According to the method provided in embodiments of this application, this application further provides a computer-readable storage medium. The computer-readable storage medium stores program code. When the program code is run on a computer, the computer is enabled to perform the steps or procedures performed by the session management network element, the access and mobility management network element, or the access network device in the embodiments shown in FIG. 5 to FIG. 16.

According to the method provided in embodiments of this application, this application further provides a communication system, including the foregoing session management network element, access and mobility management network element, and access network device.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer instructions are loaded and executed on a computer, all or some of the procedures or functions according to embodiments of this application are generated. The computer may be a general-purpose computer, a dedicated computer, a computer network, or any other programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network device and the terminal device in the foregoing apparatus embodiments completely correspond to the network device and the terminal device in the method embodiments. A corresponding module or unit performs a corresponding step. For example, the transceiver unit (transceiver) performs a receiving or sending step in the method embodiments, and a step other than the sending step and the receiving step may be performed by the processing unit (processor). For a function of a specific unit, refer to a corresponding method embodiment. There may be one or more processors.

Terms such as "component", "module", and "system" used in this specification indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable storage media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

It should be understood that, in this specification, "at least one" means one or more, and "a plurality of" means two or more. The term "and/or" describes an association relationship between associated objects and represents that three relationships may exist. For example, A and/or B may represent the following three cases: Only A exists, both A and B exist, and only B exists. A and B may be in a singular or plural form. The character "/" usually indicates an "or" relationship between the associated objects. "At least one of the following items (pieces)" or a similar expression thereof means any combination of these items, including any combination of singular items (pieces) or plural items (pieces). For example, at least one of a, b, and c may indicate a, b, c, a and b, a and c, b and c, or a, b, and c, where a, b, or c may be singular or plural.

A person of ordinary skill in the art may be aware that illustrative logical blocks and steps described with reference to embodiments disclosed in this specification can be implemented by electronic hardware or a combination of computer software and electronic hardware. Whether the functions are performed by the hardware or the software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementations. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one place, or may be distributed on a plurality of network units. Some or all of the units may be selected based on an actual requirement to achieve the objectives of the solutions of embodiments.

In addition, functional units in embodiments of this application may be integrated into one processing unit, or each of the units may exist alone physically, or two or more units are integrated into one unit.

In the foregoing embodiments, all or some of functions of the functional units may be implemented by using software, hardware, firmware, or any combination thereof. When software is used to implement the embodiments, all or some of the embodiments may be implemented in a form of a computer program product. The computer program product includes one or more computer instructions (programs). When the computer program instructions (programs) are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A multicast/broadcast service transmission method, comprising:
   receiving, by a session management network element, a second message, the second message updating a protocol data unit (PDU) session of a terminal device, and the PDU session is associated with a multicast/broadcast service;
   determining, by the session management network element based on multicast/broadcast capability information of an access network device, a delivery mode of the multicast/broadcast service, the multicast/broadcast capability information of the access network device indicating whether the access network device supports multicast/broadcast, and the access network device is currently accessed by the terminal device or by a target access network device of the terminal device; and
   mapping, by the session management network element, a multicast/broadcast quality of service (QoS) flow of the multicast/broadcast service to a unicast QoS flow of the PDU session, the unicast QoS flow being used to transmit the multicast/broadcast data, the unicast QoS Flow Identifier (QFI) of the unicast QoS flow comprising an unused QFI of the PDU session.

2. The method according to claim 1, wherein the second message is a Nsmf_PDUSession_UpdateSMContext Request.

3. The method according to claim 1, wherein the delivery mode comprises a multicast/broadcast mode and/or a unicast mode.

4. The method according to claim 3, wherein the multicast/broadcast mode comprises a 5GC shared multicast broadcast service (MBS) traffic delivery method, and the unicast mode comprises a 5GC individual MBS traffic delivery method.

5. The method according to claim 3, wherein in the multicast/broadcast mode, a user plane function (UPF) delivers multicast/broadcast data of the multicast/broadcast service to the access network device using a multicast session tunnel, and the access network device delivers the multicast/broadcast data to the terminal device in a point to multi-point (PTM) manner; and
   the unicast mode delivers the multicast/broadcast data to the terminal device using a PDU session, the PDU session relating to the multicast/broadcast service.

6. The method according to claim 1, further comprising:
   determining, by the session management network element based on multicast/broadcast QoS information of the multicast/broadcast service, the unicast QoS flow corresponding to the multicast/broadcast service; and
   adding, by the session management network element, the unicast QoS flow to the PDU session of the terminal device, wherein the unicast QoS flow is used to deliver the multicast/broadcast data.

7. The method according to claim 1, further comprising:
   sending, by the session management network element, a correspondence between a multicast/broadcast QoS flow identifier (QFI) of the multicast/broadcast QoS flow and a unicast QFI of the unicast QoS flow to the access network device.

8. The method according to claim 1, further comprising:
   receiving, by the session management network element, the multicast/broadcast capability information of the access network device from an access and mobility management network element.

9. A multicast/broadcast service transmission system, comprising:
   an access network device; and
   a session management network element in communication with the access network device, the session management network element is configured to:
   receive a second message, the second message updating a protocol data unit (PDU) session of a terminal device, and the PDU session is associated with a multicast/broadcast service;
   determine, based on a multicast/broadcast capability information of the access network device, a delivery mode of the multicast/broadcast service, the multicast/broadcast capability information of the access network device indicating whether the access network device supports multicast/broadcast, and the access network device is currently accessed by the terminal device or by a target access network device of the terminal device; and
   map a multicast/broadcast quality of service (QOS) flow of the multicast/broadcast service to a unicast QoS flow of the PDU session, the unicast QoS flow being used to transmit the multicast/broadcast data, the unicast QoS Flow Identifier (QFI) of the unicast QoS flow comprising an unused QFI of the PDU session.

10. The system according to claim 9, further comprising an access and mobility management network element, wherein:
   the access network device is configured to send the multicast/broadcast capability information of the access network device to the access and mobility management network element; and
   the access and mobility management network element is configured to send the multicast/broadcast capability information of the access network device to the session management network element.

11. The system according to claim 9, wherein the second message is a Nsmf_PDUSession_UpdateSMContext Request.

12. The system according to claim 9, wherein the delivery mode comprises a multicast/broadcast mode and/or a unicast mode.

13. The system according to claim 12, wherein the multicast/broadcast mode comprises a 5GC shared multicast broadcast service (MBS) traffic delivery method, and the unicast mode comprises a 5GC individual MBS traffic delivery method.

14. The system according to claim 12, wherein in the multicast/broadcast mode, a user plane function (UPF) delivers multicast/broadcast data of the multicast/broadcast service to the access network device using a multicast session tunnel, and the access network device delivers the multicast/broadcast data to the terminal device in a point to multi-point (PTM) manner; and the unicast mode delivers the multicast/broadcast data to the terminal device using a PDU session, the PDU session relating to the multicast/broadcast service.

15. The system according to claim 9, wherein the session management network element is further configured to:

send a correspondence between a multicast/broadcast QoS flow identifier (QFI) of the multicast/broadcast QoS flow and a unicast QFI of the unicast QoS flow to the access network device.

16. A multicast service transmission apparatus comprising:

a memory, configured to store instructions; and at least one processor, configured to execute the instructions stored in the memory to perform the following steps:

receive a second message, the second message updating a protocol data unit (PDU) session of a terminal device, and the PDU session is associated with a multicast/broadcast service;

determine, based on multicast/broadcast capability information of an access network device, a delivery mode of the multicast/broadcast service, the multicast/broadcast capability information of the access network device indicating whether the access network device supports multicast/broadcast, and the access network device is currently accessed by the terminal device or by a target access network device of the terminal device; and mapping a multicast/broadcast quality of service (QOS) flow of the multicast/broadcast service to a unicast QoS flow of the PDU session, the unicast QoS flow being used to transmit the multicast/broadcast data, the unicast QoS Flow Identifier (QFI) of the unicast QoS flow comprising an unused QFI of the PDU session.

17. The apparatus according to claim 16, wherein the second message is a Nsmf_PDUSession_UpdateSMContext Request.

18. The apparatus according to claim 16, wherein the delivery mode comprises a multicast/broadcast mode and/or a unicast mode.

19. The apparatus according to claim 18, wherein the multicast/broadcast mode comprises a 5GC shared multicast broadcast service (MBS) traffic delivery method, and the unicast mode comprises a 5GC individual MBS traffic delivery method.

20. The apparatus according to claim 16, wherein the at least one processor is further configured to:

determine, based on multicast/broadcast QoS information of the multicast/broadcast service, the unicast QoS flow corresponding to the multicast/broadcast service; and add the unicast QoS flow to the PDU session of the terminal device, wherein the unicast QoS flow is used to deliver the multicast/broadcast data.

* * * * *